(12) United States Patent
Kawaguchi

(10) Patent No.: US 9,183,418 B2
(45) Date of Patent: Nov. 10, 2015

(54) HALF BIT CORRELATOR COMBINING FOR DATA DEMODULATION

(75) Inventor: Dean Kawaguchi, San Jose, CA (US)

(73) Assignee: Intelleflex Corporation, San Jose, CA (US)

( * ) Notice: Subject to any disclaimer, the term of this patent is extended or adjusted under 35 U.S.C. 154(b) by 585 days.

(21) Appl. No.: 13/165,734

(22) Filed: Jun. 21, 2011

(65) Prior Publication Data

US 2012/0002763 A1 Jan. 5, 2012

Related U.S. Application Data

(60) Provisional application No. 61/360,883, filed on Jul. 1, 2010.

(51) Int. Cl.
*H04L 27/06* (2006.01)
*G06K 7/00* (2006.01)
*G06K 19/07* (2006.01)

(52) U.S. Cl.
CPC .......... *G06K 7/0008* (2013.01); *G06K 19/0723* (2013.01); *H04Q 2213/13095* (2013.01)

(58) Field of Classification Search
CPC ....... G06F 15/31; G06F 17/14; G06K 7/0008; G06K 19/0723; H03D 11/00; H03D 3/00; H03K 9/06; H04J 13/00; H04Q 5/22; H04L 7/00; H04L 27/00; H04L 27/06; H04L 27/10; H04L 27/30
USPC .......... 329/304, 313, 319, 321, 349; 370/328, 370/338, 503; 375/148, 150, 219, 227, 239, 375/316, 324, 343, 345, 346, 362, 375; 455/63.1, 323, 337, 445, 502; 340/10.1, 10.4, 572.4; 708/404, 422, 708/813
See application file for complete search history.

(56) References Cited

U.S. PATENT DOCUMENTS

| | | | |
|---|---|---|---|
| 4,270,179 A * | 5/1981 | Sifford et al. | 708/422 |
| 4,596,024 A | 6/1986 | Thomson | |
| RE32,905 E | 4/1989 | Baran | |
| 5,025,251 A | 6/1991 | Mittel et al. | |
| 5,412,693 A | 5/1995 | Bolla et al. | |
| 5,654,657 A | 8/1997 | Pearce | |
| 5,758,277 A | 5/1998 | Hawkes | |
| 5,809,009 A | 9/1998 | Matsuoka et al. | |
| 5,970,105 A | 10/1999 | Dacus | |

(Continued)

OTHER PUBLICATIONS

U.S. Appl. No. 13/165,708, filed Jun. 21, 2011.

(Continued)

*Primary Examiner* — Sam K Ahn
*Assistant Examiner* — Shawkat M Ali
(74) *Attorney, Agent, or Firm* — Zilka-Kotab, PC

(57) ABSTRACT

A method for demodulating a data signal according to one embodiment includes processing baseband signals using multiple complex correlators each having a half-Tbit length; summing outputs of the complex correlators for a first data state; and differencing outputs of the complex correlators for a second data state. A system for demodulating a data signal according to one embodiment includes a correlator module having logic for: processing baseband signals using multiple complex correlators each having a half-Tbit length; summing outputs of the complex correlators for a first data state; and differencing outputs of the complex correlators for a second data state. Additional systems and methods are also presented.

21 Claims, 41 Drawing Sheets

(56) References Cited

U.S. PATENT DOCUMENTS

| | | | |
|---|---|---|---|
| 6,034,988 A | 3/2000 | VanderMey et al. | |
| 6,084,530 A | 7/2000 | Pidwerbetsky et al. | |
| 6,101,168 A * | 8/2000 | Chen et al. | 370/228 |
| 6,363,106 B1 * | 3/2002 | Popovic et al. | 375/150 |
| 6,507,603 B1 | 1/2003 | Haga et al. | |
| 6,625,222 B1 | 9/2003 | Bertonis et al. | |
| 6,704,344 B1 * | 3/2004 | Hu et al. | 375/130 |
| 6,828,853 B2 | 12/2004 | Rizzo | |
| 6,961,548 B2 | 11/2005 | Groeger et al. | |
| 7,088,955 B2 | 8/2006 | Challa et al. | |
| 7,215,723 B2 | 5/2007 | Rizzo et al. | |
| 7,388,497 B1 | 6/2008 | Corbett et al. | |
| 7,415,080 B2 | 8/2008 | Echavarri et al. | |
| 7,477,679 B2 * | 1/2009 | Mizuno | 375/150 |
| 7,971,794 B2 | 7/2011 | Leutgeb et al. | |
| 8,099,067 B2 | 1/2012 | Su | |
| 8,391,824 B2 | 3/2013 | Kawaguchi | |
| 8,509,689 B2 | 8/2013 | Nakamura et al. | |
| 8,723,651 B2 | 5/2014 | Kawaguchi | |
| 8,731,118 B2 | 5/2014 | Kawaguchi | |
| 8,774,329 B2 | 7/2014 | Kawaguchi | |
| 8,774,710 B2 | 7/2014 | Kawaguchi et al. | |
| 8,824,607 B2 | 9/2014 | Kawaguchi | |
| 2001/0050926 A1 | 12/2001 | Kumar | |
| 2002/0105599 A1 | 8/2002 | Hong et al. | |
| 2002/0127992 A1 | 9/2002 | Fransis | |
| 2003/0016770 A1 | 1/2003 | Trans et al. | |
| 2003/0141938 A1 * | 7/2003 | Poklemba et al. | 332/103 |
| 2004/0213342 A1 | 10/2004 | Ghosh | |
| 2005/0135529 A1 | 6/2005 | Upton et al. | |
| 2005/0146643 A1 | 7/2005 | Lee | |
| 2005/0278607 A1 * | 12/2005 | Garodnick | 714/774 |
| 2006/0039491 A1 | 2/2006 | Han | |
| 2006/0068745 A1 * | 3/2006 | Wei | 455/323 |
| 2006/0141974 A1 | 6/2006 | Campbell et al. | |
| 2007/0014384 A1 * | 1/2007 | Min et al. | 375/325 |
| 2007/0025475 A1 * | 2/2007 | Okunev | 375/343 |
| 2007/0075143 A1 | 4/2007 | Higashi | |
| 2007/0110126 A1 | 5/2007 | Sekiguchi et al. | |
| 2008/0106651 A1 | 5/2008 | Goyal et al. | |
| 2008/0118010 A1 | 5/2008 | Nakahara et al. | |
| 2008/0130604 A1 | 6/2008 | Boyd | |
| 2008/0161660 A1 | 7/2008 | Arneson et al. | |
| 2008/0197982 A1 * | 8/2008 | Sadr | 340/10.4 |
| 2008/0297324 A1 | 12/2008 | Tuttle | |
| 2009/0034587 A1 * | 2/2009 | Kobayashi et al. | 375/146 |
| 2009/0041167 A1 * | 2/2009 | Kadota et al. | 375/343 |
| 2009/0074117 A1 * | 3/2009 | Fujita et al. | 375/343 |
| 2009/0106341 A1 * | 4/2009 | Al Adnani | 708/404 |
| 2009/0174592 A1 | 7/2009 | Muellner | |
| 2009/0239569 A1 | 9/2009 | Dottling et al. | |
| 2009/0245390 A1 | 10/2009 | Kim et al. | |
| 2010/0034323 A1 * | 2/2010 | Stoye | 375/341 |
| 2010/0067551 A1 | 3/2010 | Wright | |
| 2010/0220819 A1 | 9/2010 | Li et al. | |
| 2011/0096875 A1 | 4/2011 | Amrutur et al. | |
| 2011/0187600 A1 | 8/2011 | Landt | |
| 2011/0309978 A1 * | 12/2011 | Matsumoto | 342/357.77 |
| 2012/0001732 A1 | 1/2012 | Kawaguchi | |
| 2012/0002758 A1 | 1/2012 | Kawaguchi | |
| 2012/0002760 A1 | 1/2012 | Kawaguchi | |
| 2012/0002762 A1 | 1/2012 | Kawaguchi | |
| 2012/0002765 A1 | 1/2012 | Kawaguchi | |
| 2012/0002766 A1 | 1/2012 | Kawaguchi | |
| 2012/0002772 A1 | 1/2012 | Kawaguchi | |
| 2012/0003938 A1 | 1/2012 | Kawaguchi | |
| 2012/0003951 A1 | 1/2012 | Kawaguchi | |

OTHER PUBLICATIONS

U.S. Appl. No. 13/165,720, filed Jun. 21, 2011.
U.S. Appl. No. 13/165,726, filed Jun. 21, 2011.
U.S. Appl. No. 13/165,740, filed Jun. 21, 2011.
U.S. Appl. No. 13/165,733, filed Jun. 21, 2011.
U.S. Appl. No. 13/165,739, filed Jun. 21, 2011.
U.S. Appl. No. 13/165,745, filed Jun. 21, 2011.
U.S. Appl. No. 13/165,750, filed Jun. 21, 2011.
U.S. Appl. No. 13/165,754, filed Jun. 21, 2011.
Notice of Allowance and Fee(s) Due from U.S. Appl. No. 13/165,745 dated Nov. 8, 2012.
International Search Report and Written Opinion from PCT Application No. PCT/US2011/041786 dated Feb. 14, 2012.
Non-Final Office Action from U.S. Appl. No. 13/165,708 dated Apr. 16, 2013.
Non-Final Office Action from U.S. Appl. No. 13/165,720 dated May 23, 2013.
Non-Final Office Action from U.S. Appl. No. 13/165,726 dated Apr. 25, 2013.
Non-Final Office Action from U.S. Appl. No. 13/165,740 dated May 2, 2013.
Non-Final Office Action from U.S. Appl. No. 13/165,733 dated May 24, 2013.
Non-Final Office Action from U.S. Appl. No. 13/165,750 dated Apr. 18, 2013.
Non-Final Office Action from U.S. Appl. No. 13/165,754 dated Mar. 27, 2013.
Final Office Action from U.S. Appl. No. 13/165,740 dated Oct. 24, 2013.
Non-Final Office Action from U.S. Appl. No. 13/165,754 dated Oct. 17, 2013.
Corrected Notice of Allowability from U.S. Appl. No. 13/165,720 dated Apr. 8, 2014.
Supplemental Notice of Allowability from U.S. Appl. No. 13/165,739 dated Apr. 2, 2014.
Notice of Allowance and Fee(s) Due from U.S. Appl. No. 13/165,726 dated Feb. 27, 2014.
Notice of Allowance and Fee(s) Due from U.S. Appl. No. 13/165,754 dated Feb. 24, 2014.
Non-Final Office Action from U.S. Appl. No. 13/165,733 dated Jan. 27, 2014.
Final Office Action from U.S. Appl. No. 13/165,726 dated Dec. 3, 2013.
Final Office Action from U.S. Appl. No. 13/165,750 dated Nov. 6, 2013.
Notice of Allowance and Fee(s) Due from U.S. Appl. No. 13/165,720 dated Jan. 6, 2014.
Notice of Allowance and Fee(s) Due from U.S. Appl. No. 13/165,739 dated Dec. 23, 2013.
Final Office Action from U.S. Appl. No. 13/165,733 dated Jun. 20, 2014.
Notice of Allowance and Fee(s) Due from U.S. Appl. No. 13/165,708 dated Apr. 28, 2014.
Advisory Action from U.S. Appl. No. 13/165,733, dated Mar. 4, 2015.
Ex Parte Quayle Action from U.S. Appl. No. 13/165,740, dated Mar. 11, 2015.
Corrected Notice of Allowance from U.S. Appl. No. 13/165,708, dated Jul. 25, 2014.
Corrected Notice of Allowance from U.S. Appl. No. 13/165,726, dated Jun. 4, 2014.
Non-Final Office Action from U.S. Appl. No. 13/165,740, dated Jul. 24, 2014.
Non-Final Office Action from U.S. Appl. No. 13/165,750, dated Jul. 25, 2014.

* cited by examiner

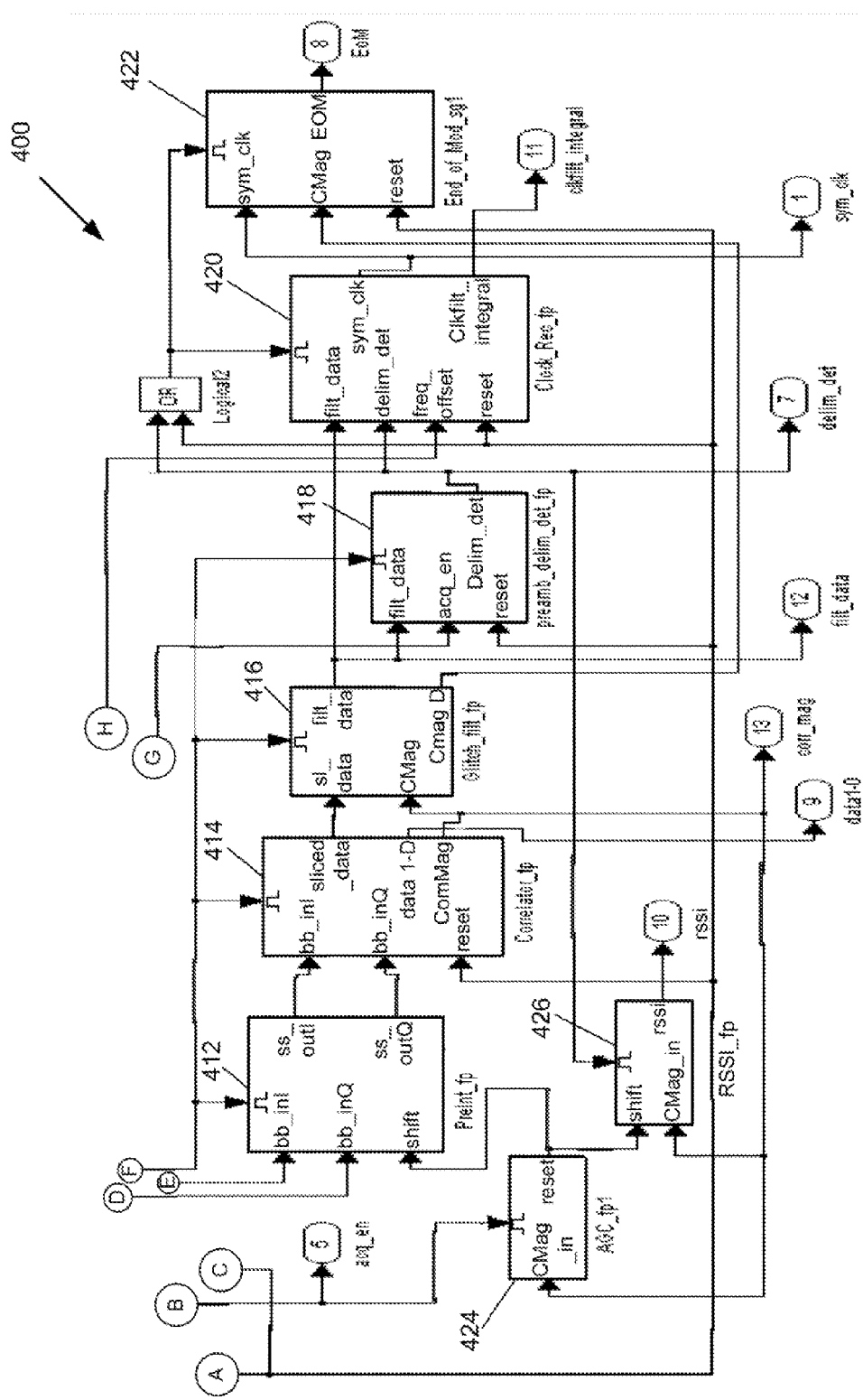
FIG. 4 (contd.)

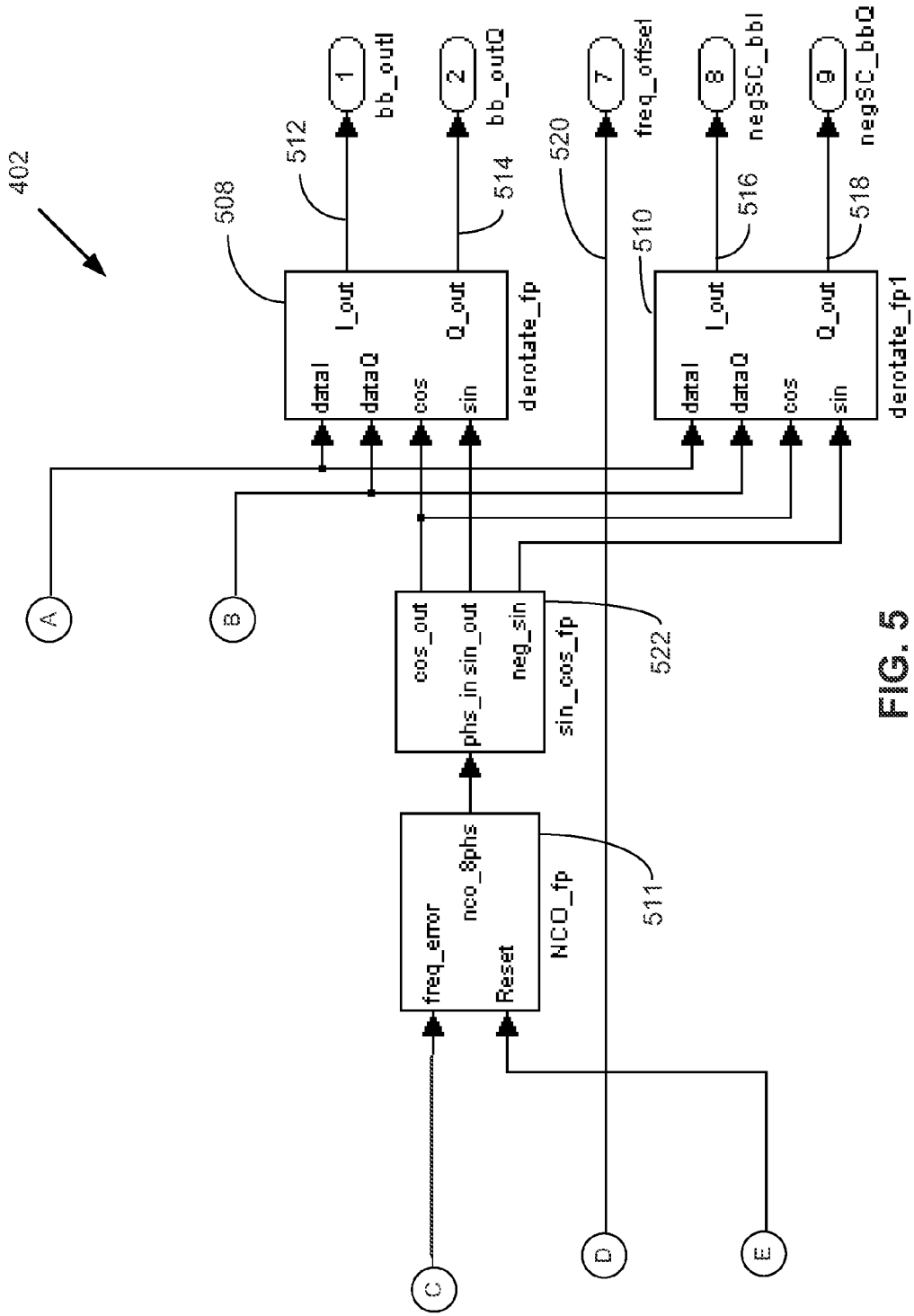
FIG. 5 (contd.)

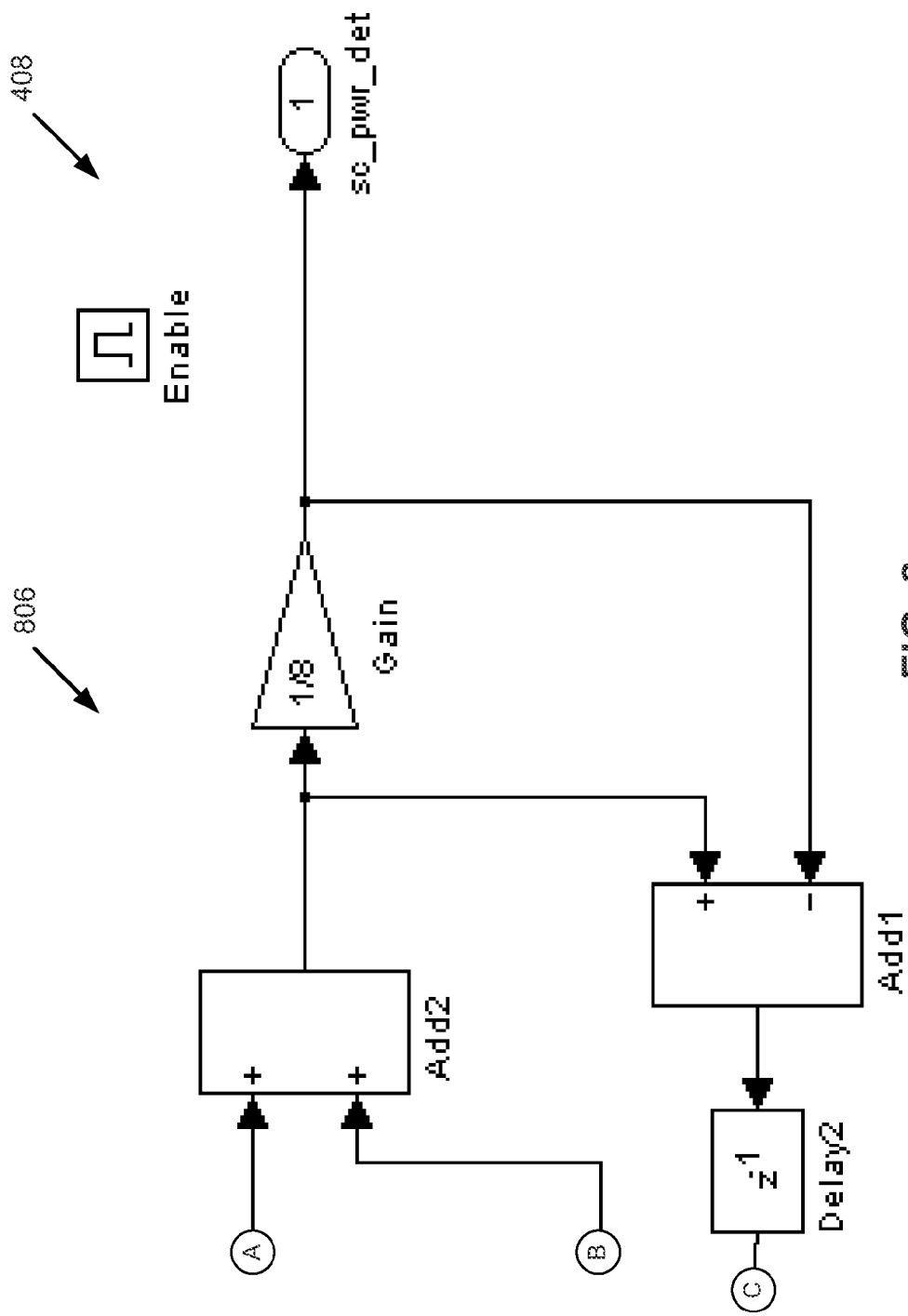

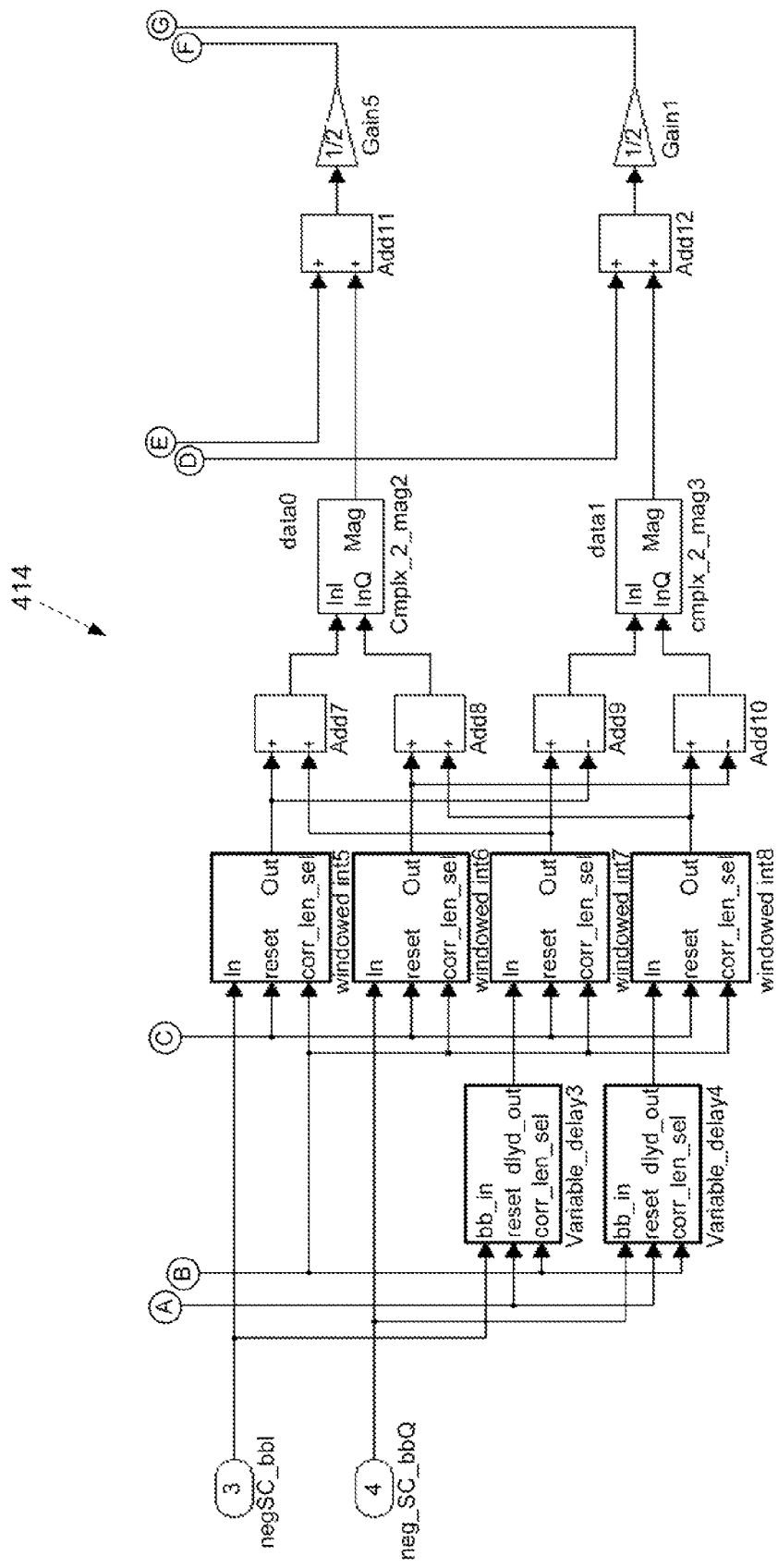
FIG. 14 (contd.)

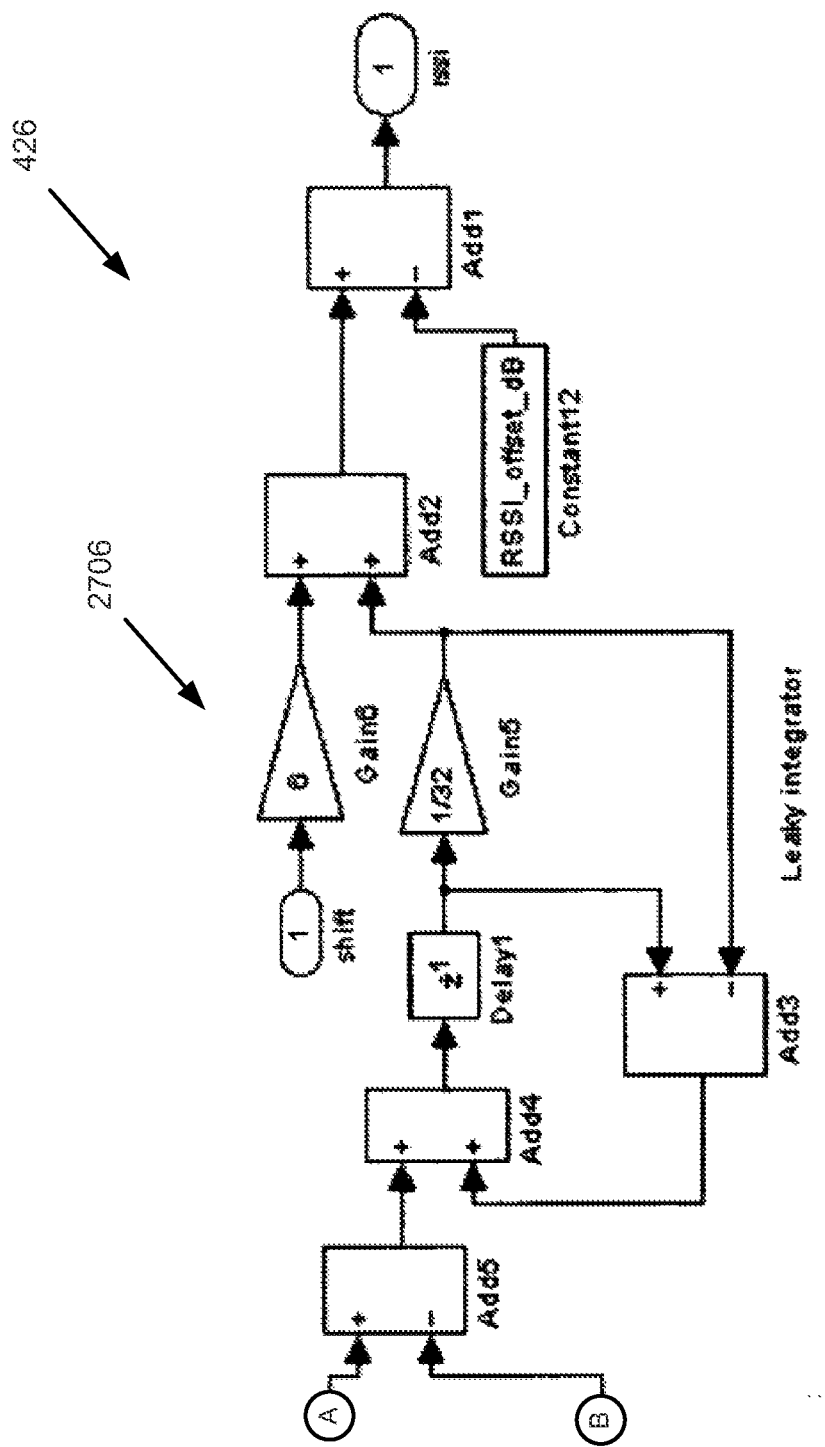
FIG. 27 (contd.)

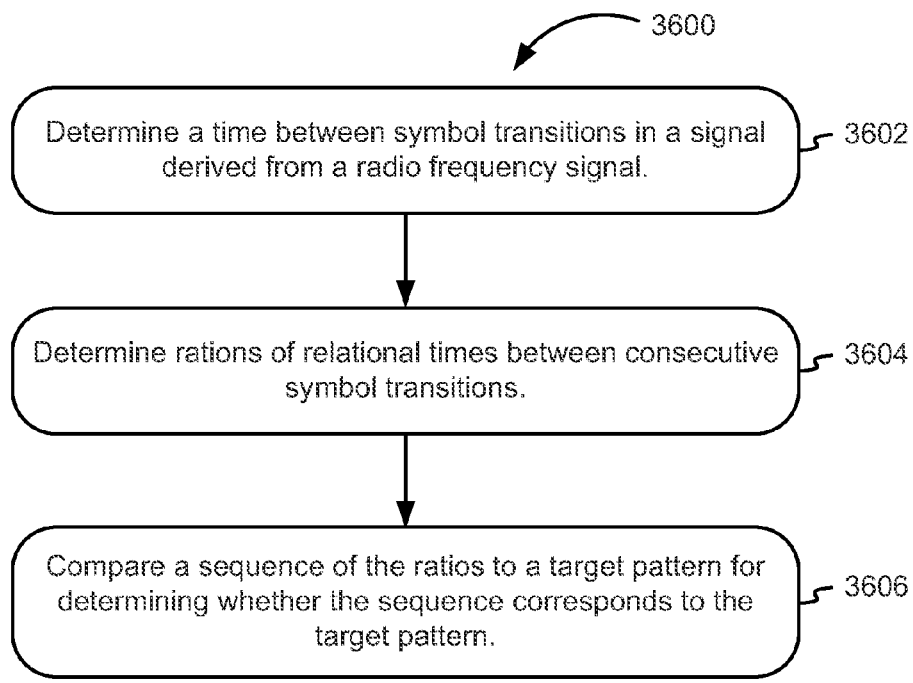
FIG. 36
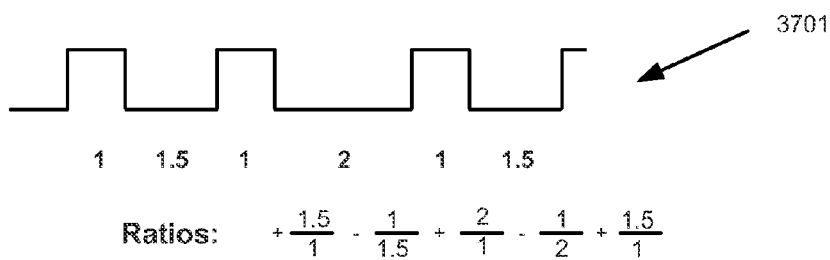
FIG. 37
| Value | Range |
|---|---|
| A | >1.75 |
| B | 1.25 – 1.75 |
| C | 0.83 – 1.25 |
| D | 0.57 – 0.83 |
| E | <0.57 |
FIG. 38

HALF BIT CORRELATOR COMBINING FOR DATA DEMODULATION

RELATED APPLICATIONS

This application claims priority to U.S. Provisional Patent Application No. 61/360,883, filed Jul. 1, 2010, and which is herein incorporated by reference.

BACKGROUND

The use of Radio Frequency Identification (RFID) tags are quickly gaining popularity for use in the monitoring and tracking of an item, RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

In some currently used passive and semi-passive RFID tags, during the 'read' cycle, the reader generally transmits a continuous unmodulated carrier signal. A distant RFID tag includes a RF switch connected to the tag's antenna, which repetitively alternates its state at a rate called the 'backscatter link frequency' (BLF). This RF switch effectively modulates the carrier signal in the tag received from the transmitter, creating sidebands surrounding the carrier frequency, and separated from the carrier frequency by the backscatter link frequency. For example, if the carrier frequency is 900 MHz and the tag backscatter modulation is at 160 KHz, side bands present in the return signal are about 900 MHz+~160 KHz and 900 MHz−~160 KHz. These sidebands are re-radiated by the tag's antenna, and are recovered by the reader, e.g., the reader detects and demodulates one or both of the side bands to obtain the data returned by the tag.

The above description is one typical way in which the tag communicates information to the reader. The tag does not create RF power, but instead modulates incoming RF power from the reader's transmitter, and in so doing, converts some of that incoming power to sideband frequencies which can be separately recovered by the reader. These backscatter sidebands only exist when (and because) the reader is transmitting.

The current RFID standard includes a wide range of reverse link parameters such as backscatter link frequency and data rates to provide flexibility in various applications. Most readers are designed to use specific parameter combinations at which the demodulator operates, i.e., the readers are designed to operate at a specific frequency and data rate. Such designs have traditionally been favored due to their simplicity, lower cost, and effectiveness at talking to particular tag designs. Moreover, in long distance communications with semi-passive and active tags, the low return signal strength urges towards settings directed to a specific frequency. However, such implementations are unable to cover a continuum of reverse link backscatter link frequencies and data rates.

SUMMARY OF THE INVENTION

A method for demodulating a data signal according to one embodiment includes processing baseband signals using multiple complex correlators each having a half-Tbit length; summing outputs of the complex correlators for a first data state; and differencing outputs of the complex correlators for a second data state.

A system for demodulating a data signal according to one embodiment includes a correlator module having logic for: processing baseband signals using multiple complex correlators each having half-Tbit length; summing outputs of the complex correlators for a first data state; and differencing outputs of the complex correlators for a second data state.

Any of these embodiments may be implemented in an RFID system, which may include an RFID tag and/or reader.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

FIG. 36 depicts a process flow for a method for detecting a pattern in a signal, according to one general embodiment.

FIG. 37 depicts a signal after slicing and filtering according to one embodiment.

FIG. 38 is a table of illustrative values according to one embodiment.

DETAILED DESCRIPTION

Figure 1:
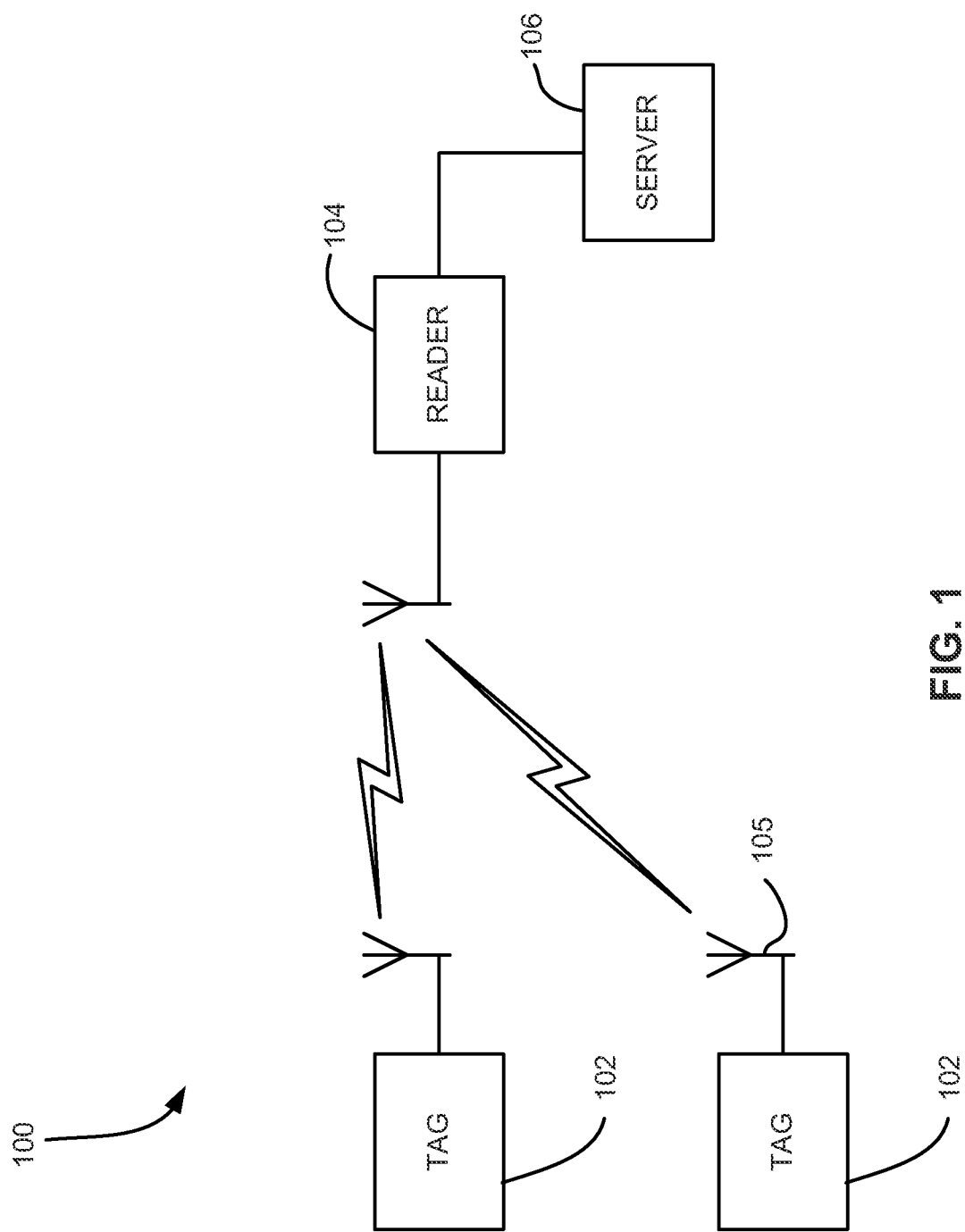
FIG. 1 is a system diagram of an RFID system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms (e.g., "a," "an" and "the") include plural referents unless otherwise specified.

In the drawings, like and equivalent elements are numbered the same throughout the various figures.

FIG. 1 depicts an RFID system 100 according to one of the various embodiments, which may include some or all of the following components and/or other components. As shown in FIG. 1, one or more RFID tags 102 are present. Each RFID tag 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID tags 102 will be described as including a chip. Each RFD tag 102 may further include or be coupled to an antenna 105.

An illustrative chip is disclosed below, though actual implementations may vary depending on how the tag is to be used. In general terms, a preferred chip includes one or more of a power supply circuit to extract and regulate power from the RF reader signal; a detector to decode signals from the reader; a backscatter modulator, an interface to a transmitter to send data back to the reader; anti-collision protocol circuits; and at least enough memory to store its unique identification code, e.g., Electronic Product Code (EPC).

While RFID tags 102, according to some embodiments, are functional RFID tags, other types of RFID tags 102 include merely a controller with on-board memory, a controller and external memory, etc.

Each of the RFID tags 102 may be coupled to an object or item, such as an article of manufacture, a container, a device, a person, etc.

With continued reference to FIG. 1, a remote device 104, such as an interrogator or "reader," communicates with the RFID tags 102 via an air interface, preferably using standard RFID protocols. An "air interface" refers to any type of wireless communications mechanism, such as the radio-frequency signal between the RFID tag and the remote device reader). The RFID tag 102 executes the computer commands that the RFID tag 102 receives from the reader 104.

The system 100 may also include an optional backend system such as a server 106, which may include databases containing information and/or instructions relating to RFID tags and/or tagged items.

As noted above, each RFID tag 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
  1. Header, which identifies the length, type, structure, version and generation of EPC;
  2. Manager Number, which identifies the company or company entity;
  3. Object Class, similar to a stock keeping unit or SKU; and
  4. Serial Number, which is the specific instance of the Object Class being tagged.

Additional fields may also be used as part of the EPC in order to properly encode and decode information from different numbering systems into their native (human-readable) forms.

Each RFID tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID tag 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the tag, no batteries are necessary. In systems where distance prevents powering a tag in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF to operate and respond, at a shorter distance up to 3 meters.

Active, semi-passive and passive RFD tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID tag and a remote device, e.g., reader, typically begins with the remote device, e.g., reader, sending out signals via radio wave to find a particular RFID tag via singulation or any other method known in the art. The radio wave hits the RFID tag, and the RFID tag recognizes the remote device's signal and may respond thereto. Such response may include exiting a hibernation state, sending a reply, storing data, etc.

Figure 2:
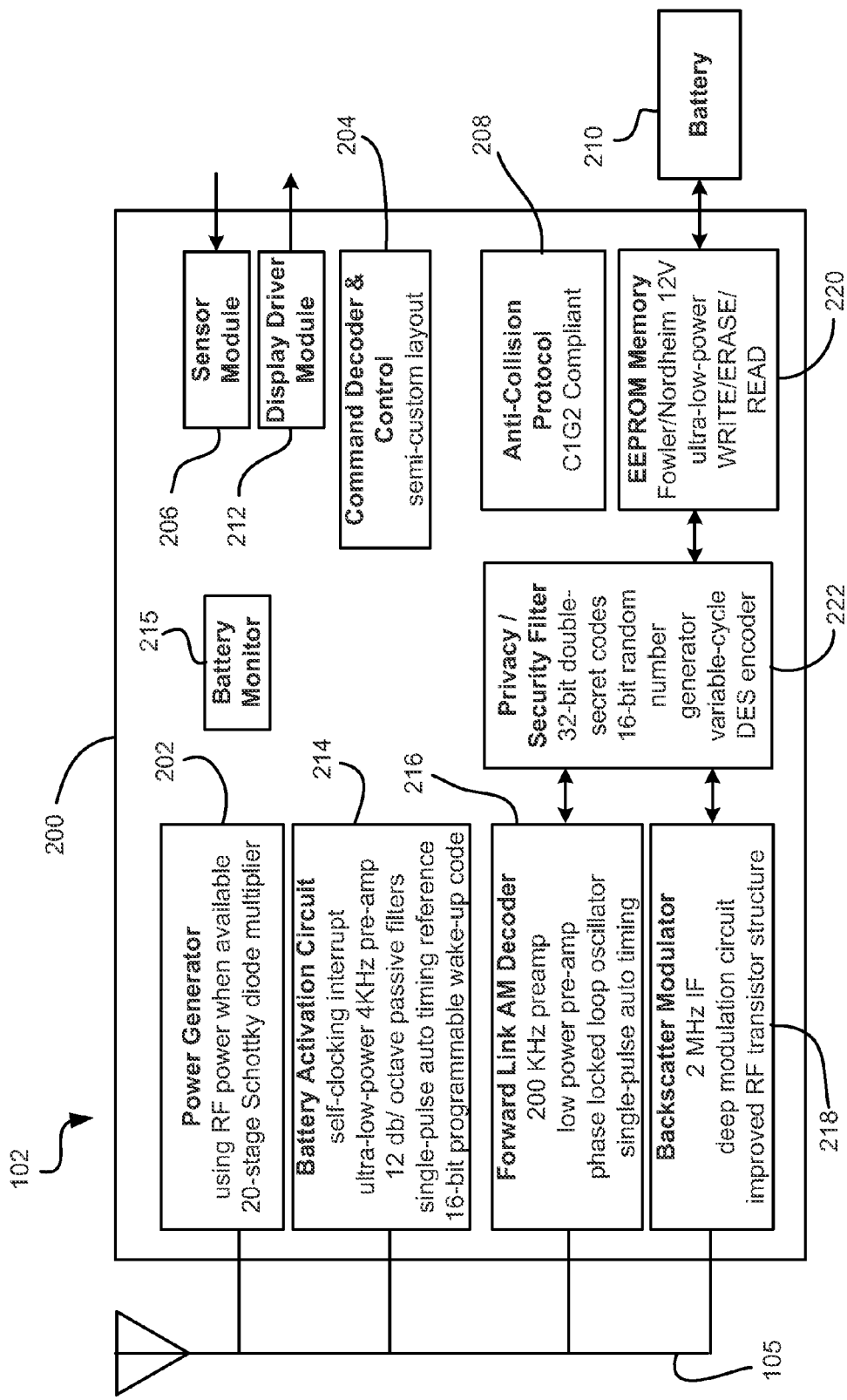
FIG. 2 is a diagram depicting a circuit layout of a n integrated circuit (IC) and various control circuitry according to an illustrative embodiment for implementation in an RFID tag.

Embodiments of the RFID tag are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an UM tag 102. It should be kept in mind that the present invention can be implemented using any type of RFID tag, and the circuit 200 is presented as only one possible implementation.

The Class-3 IC of FIG. 2 can form the core of RFID chips appropriate for many applications such as identification of pallets, cartons, containers, vehicles, or anything where orange of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device, e.g., reader.

The module 200 may also incorporate a security encryption circuit 222 for operating under one or more security schemes, secret handshakes with readers, etc.

The RFD tag may have a dedicated power supply, e.g. battery; may draw power from a power source of the electronic device (e.g., battery, AC adapter, etc.); or both. Further, the RFID tag may include a supplemental power source. Note that while the present description refers to a "supplemental" power source, the supplemental power source may indeed be the sole device that captures energy from outside the tag, be it from solar, RF, kinetic, etc. energy.

Figure 3:
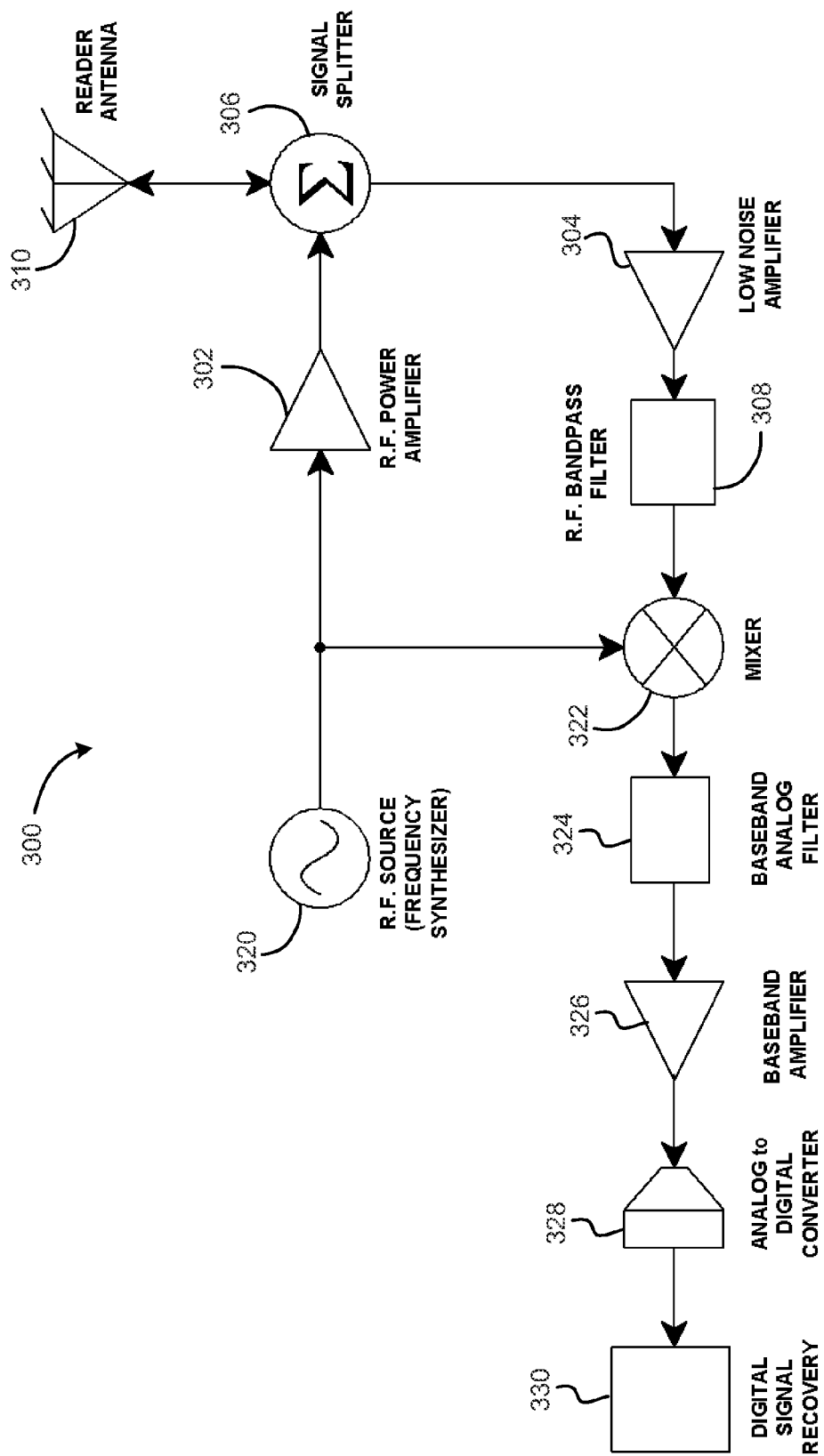
FIG. 3 is a diagram of an RFID reader circuit according to one embodiment.

FIG. 3 illustrates an RFID reader circuit 300 according to one embodiment. As shown, the circuit includes an RF source 320 that generate a carrier signal. Data may be added to the carrier wave via RF modulation, in a manner that is well known.

In some readers, such as the one shown in FIG. 3, the antenna configuration is 'monostatic' which means that the sidebands created by the distant tag are recovered via the same antenna that the reader's transmitter uses to transmit the carrier signal. In a monostatic reader, a power amplifier 302 is connected to a signal splitter 306, which is connected to an antenna 310 and a low noise amplifier 304 in the receive path. In some other readers, the antenna configuration is 'bistatic' which means that the sidebands created by the distant tag are recovered by the reader via a separate antenna. A bistatic reader differs from a monostatic reader in that each reader has a power amplifier, low noise amplifier, and antenna, but in the bistatic reader, the power amplifier is connected directly to a transmit antenna, a separate receive antenna connects directly to the low noise amplifier, and there may be no signal splitter.

In the receive path, the incoming signal is received by the antenna 310 and passes through the signal splitter 306 to the low noise amplifier. The signal is filtered by bandpass filter 308, and a sample of the carrier signal is combined with the incoming signal at a mixer 322 to provide carrier cancellation. Assuming the carrier cancellation is effective, the sideband signals remain and are filtered by a second filter 324, amplified by an amplifier 326, and converted to a digital signal by an analog to digital converter 328. The digital signal is then processed in a digital signal recovery section 330, which may include a digital signal processor (DSP) or other circuitry to process the digital signal.

Illustrative carrier signal frequencies correspond to those noted above in the description of the illustrative RFID tags. By way of example, assume a carrier signal produced by an RIM reader is about 900 MHz. Typically, the RFID tag signal is sent at an offset due to modulation, e.g., 320 KHz, rendering sidebands of 900 MHz±320 KHz. Thus, the RFID tag signal coming back is not the same as the signal being emitted by the RFID reader, and can be detected by the reader. However, the receiver is literally swamped with unwanted signals as well as noise generated by the reader itself, making it difficult to discern the modulations of the incoming RFID tag signal from the multitude of incoming signals and nose.

The following section describes various embodiments that may be embodied in the digital signal recovery section 330 of FIG. 3, or other type of reader design. It should be noted, however, that various embodiments of the inventive devices and methodologies described herein may be used in conjunction with any type of RF system, and is particularly adapted for use in long range RFID applications, such as in or as a reader communicating with semi-passive and active RFID tags. Illustrative readers in which the device may be implemented or embodied include fixed-location readers, portable readers, handheld "gun-type" readers, etc.

In particularly preferred embodiments, the device implements any of several new technologies to enable communication over a continuum of reverse link backscatter link frequencies and/or data rates. This enables a reader employing or embodying such device to be able to quickly and easily change modes for use in different applications, use with different types of tags, use in different jurisdictions, etc.

New technology implemented in various embodiments includes:
  Subcarrier frequency acquisition
  Data clock recovery loop jam set using subcarrier frequency estimate
  Variable length correlator
  Half bit correlator combining for Miller data demodulation
  Baseband preintegrator to reduce computation requirements at tower data rates
  Dual complex subcarrier downconversion
  Variable rate preamble detection using ratiometric methods
  End of modulation detection
  RSSI estimate on variable length correlator output
  Dynamic signal detection threshold Each of these technologies is described in turn. It should be understood that some embodiments may implement only one technology from the list, while other embodiments may implement more than one. Moreover, as discussed in more detail below, a technology may be implemented as a pure method; in hardware or software logic such as hardware (circuit, ASIC, processor, etc.), reconfigurable logic (e.g., FPGA), software, firmware, etc.; modules of such logic; and combinations thereof. In some approaches, the logic transforms a signal to another state, and/or effects a transformation of data into another usable form, any of which may be usable in a further operation and/or by other logic.

As will soon become apparent, some embodiments of devices implementing methodology presented herein may communicate with a variety of RFID tags and other RF devices over a broad spectrum of frequencies and data rates in a single device. To illustrate, and presented by way of example only, a reader according to one embodiment is able to communicate at substantially all bit rates in a range of about 2.5 Kbits/second to about 160 Kbits/second, and at all backscatter link frequencies in a range of about 25 KHz to about 640 KHz, where "about X" Kbits/second, "about X" KHz, etc. means "X±10%."

To place the methodologies in a context, a general system design of an illustrative demodulator is first presented to show one of the many possible implementations and permutations in which embodiments of the invention may be embodied. It is again stressed that the illustrative system design is presented by way of example only to show one of the many possible implementations and permutations that will become apparent to one skilled in the art upon reading this specification.

Figure 4:
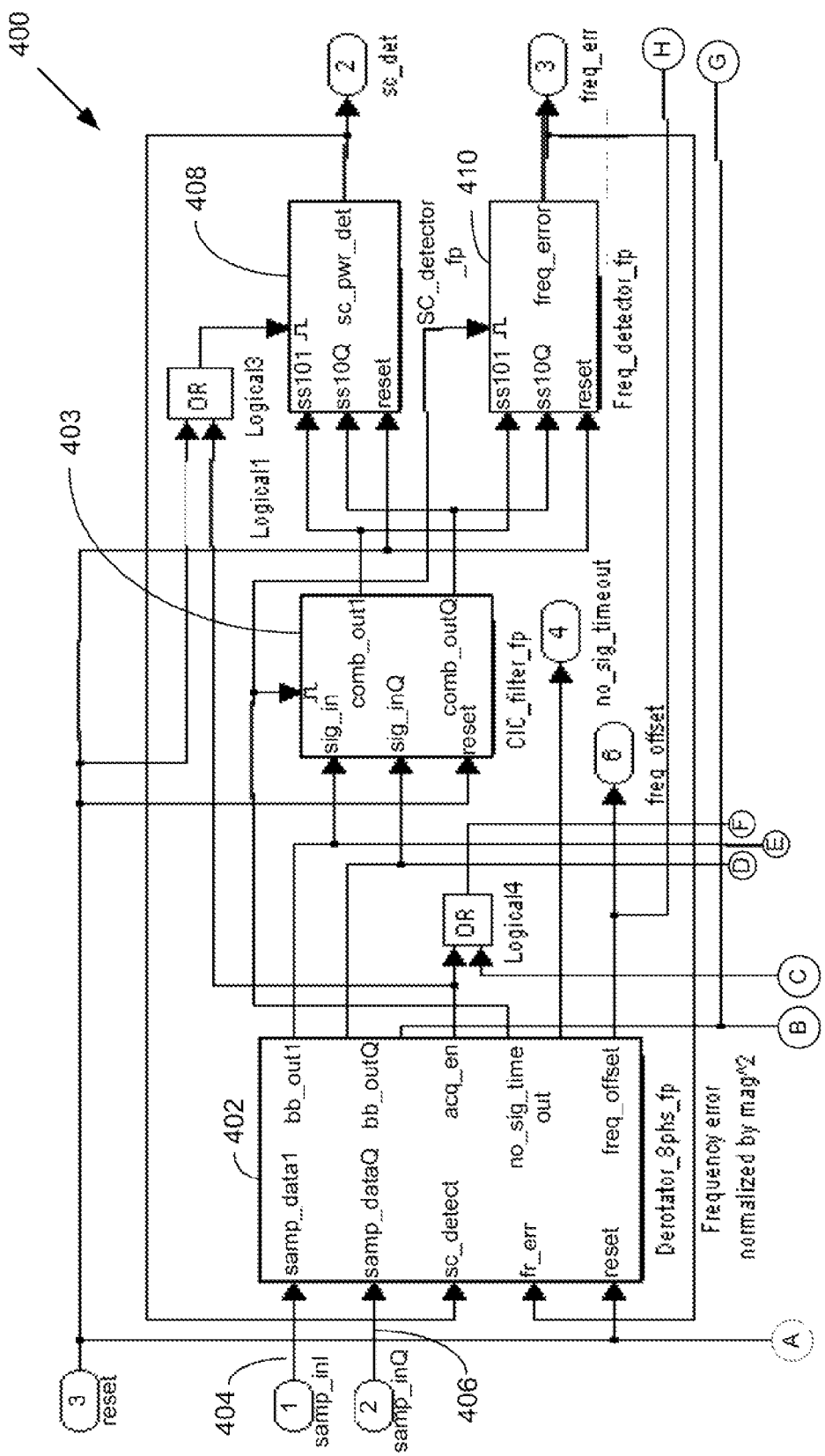
FIG. 4 is a system diagram of an illustrative demodulator according to one embodiment.

FIG. 4 is a system diagram of an illustrative demodulator 400 according to one embodiment. The demodulator 400 may form part of, or be, a gate array instantiation of a digital signal processing block, according to preferred embodiments. The illustrative demodulator 400 includes a derotator 402 having quadrature I and Q inputs 404, 406, respectively, from the complex RF downconverter of the host device receiver, which may be an RFID reader or other device. In the RFID reader implementation, the I and Q inputs are received at baseband from the receive path of the host device.

Figure 5:
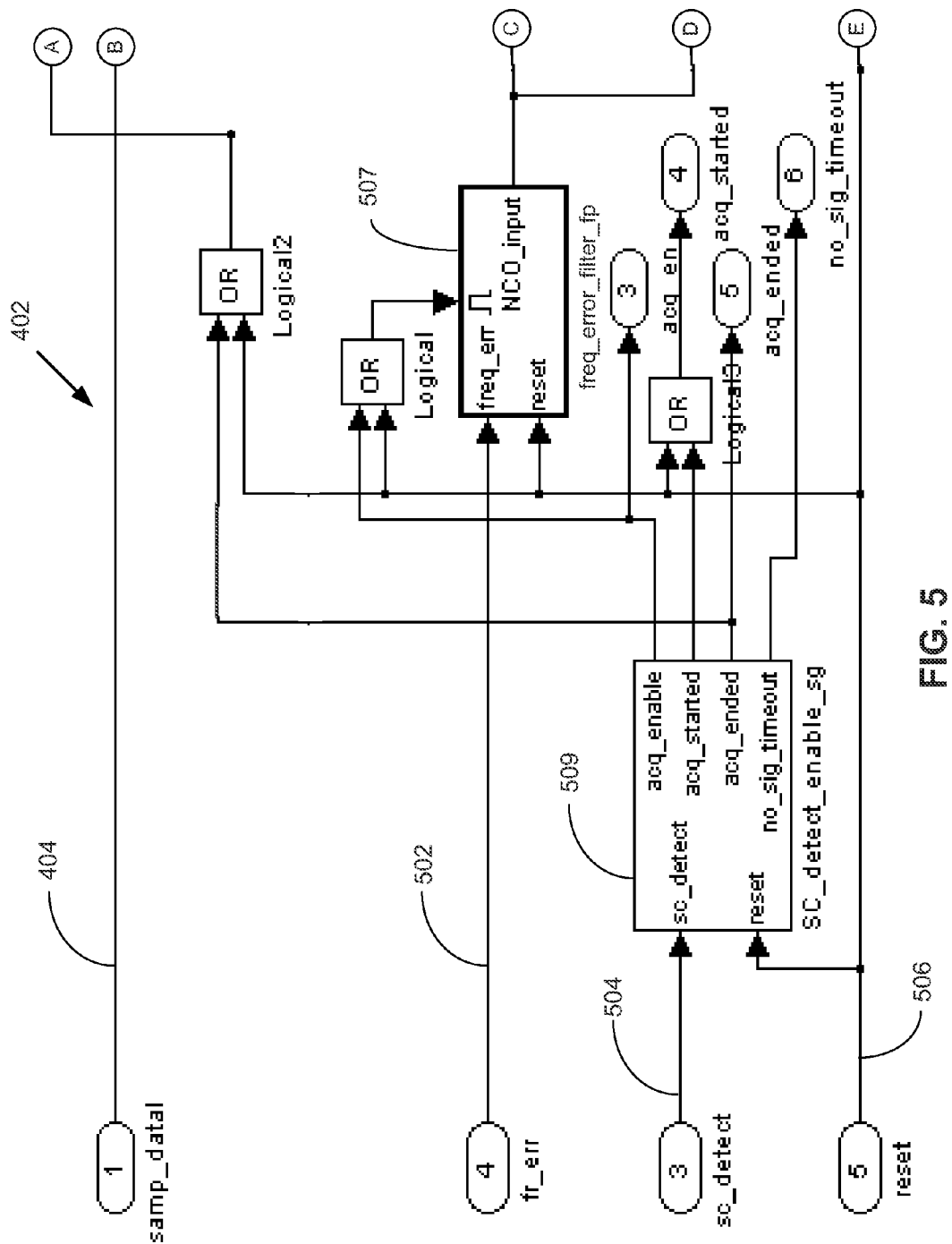
FIG. 5 is a system diagram of the derotator of FIG. 4.

FIG. 5 is a system diagram of the derotator 402 of FIG. 4. Note that any type of derotator known in the art may be used, and the circuit shown is presented by way of example only to show one possible implementation.

With continued reference to FIG. 5, an eight phase derotator is shown. Inputs include the I and Q inputs 404, 406; a frequency error signal input 502; a subcarrier detect signal input 504; and a reset signal input 506 which receives a reset signal. The signals and their origins are described in more detail below. A frequency error filter module 507 is coupled to the frequency error signal input 502. The frequency error filter module 507 is initiated by a signal from a subcarrier detect enable module 509, that is in turn coupled to the subcarrier detect signal input 504. The frequency error filter module 507, when enabled, generates a numerically controlled oscillator (NCO) input signal based on the frequency error signal. The NCO input signal is sent to an NCO 511, the output of which is used to generate cosine and sine signals for use by a positive subcarrier derotator 508 and a negative subcarrier derotator 510.

Outputs of the subcarrier derotators 508, 510 include baseband I and Q outputs 512, 514; negative baseband I and Q outputs 516, 518; and a frequency offset output 520.

Figure 6:
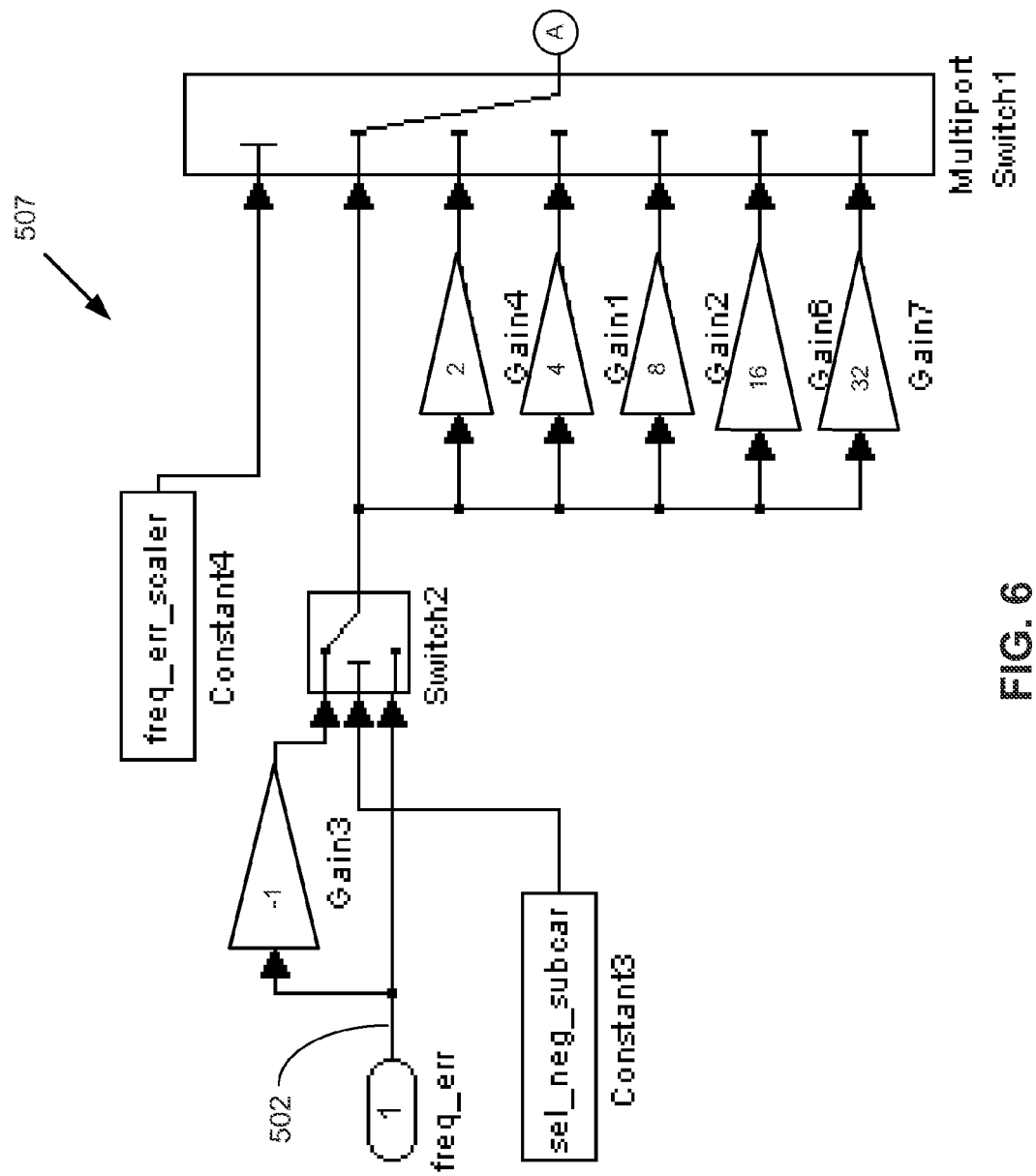
FIG. 6 is a system diagram of the frequency error filter module of FIG. 5.
Figure 6:
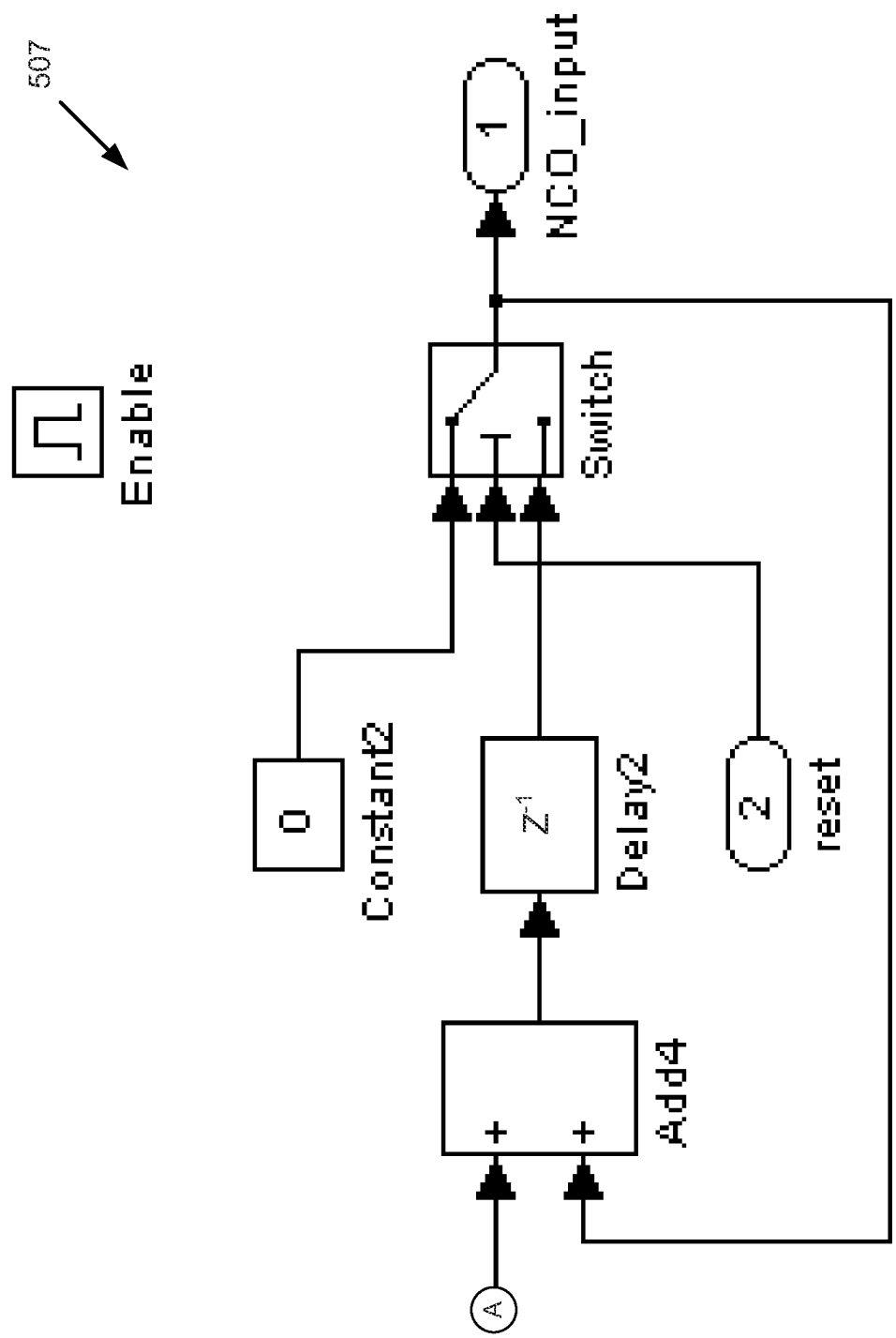

FIG. 6 is a system diagram of the frequency error filter module 507 of FIG. 5. Note that any type of frequency error filter module or suitable alternative known in the art may be used, and the circuit shown is presented by way of example only to show one possible implementation. With continued reference to FIG. 6, the frequency error is received and scaled to generate the NCO input signal.

Figure 7:
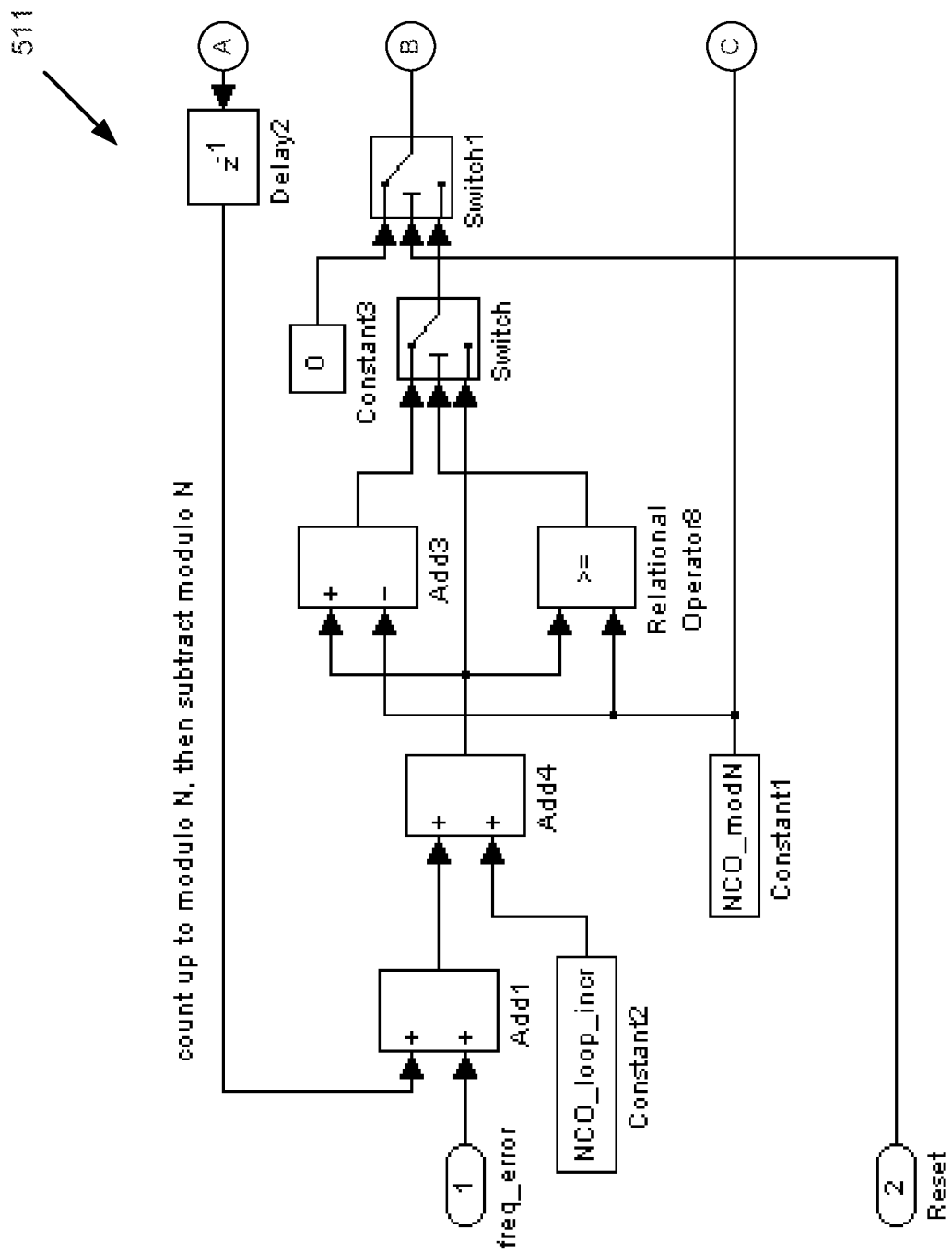
FIG. 7 is a system diagram of the NCO of FIG. 5.
Figure 7:
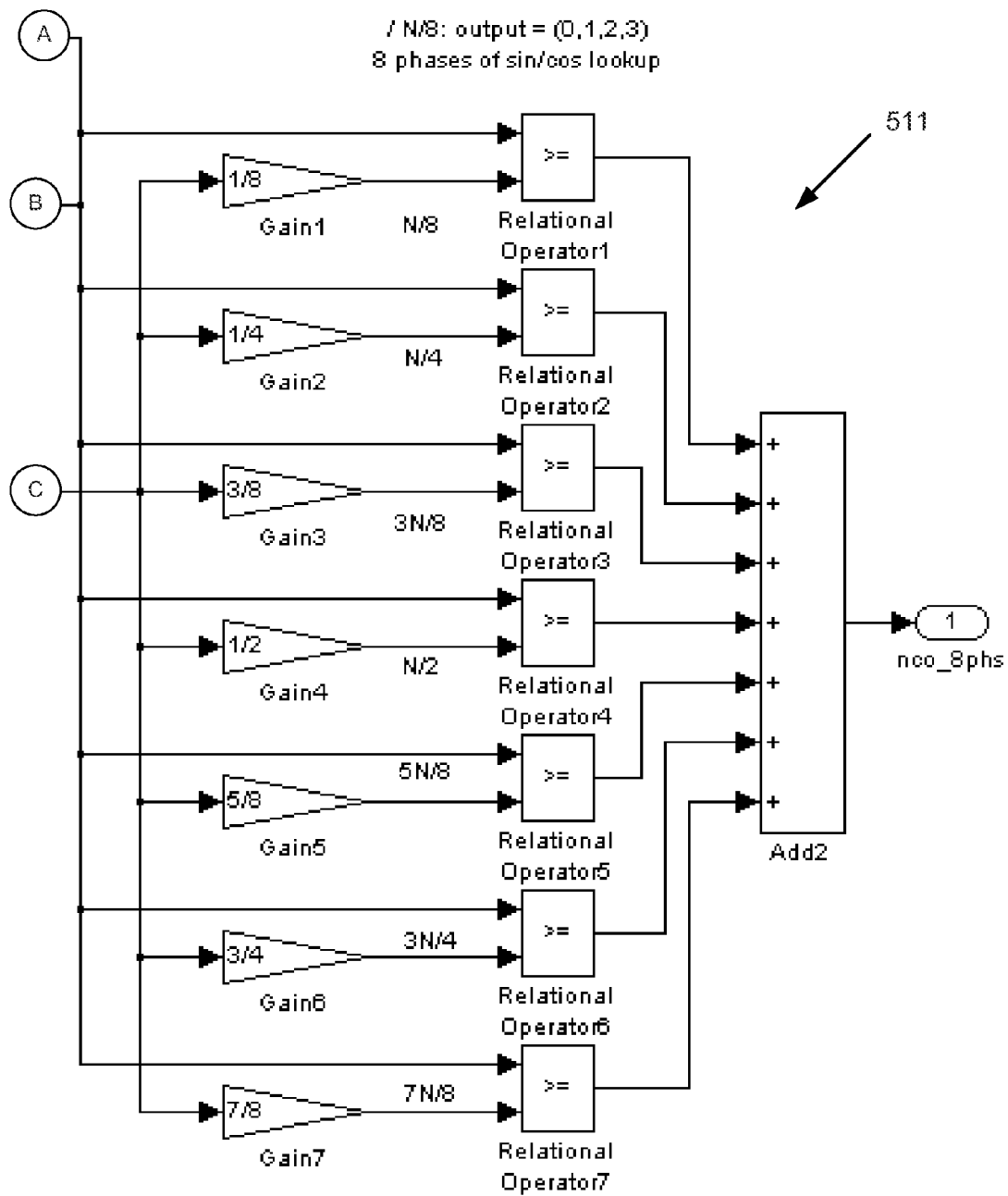

FIG. 7 is a system diagram of the NCO 511 of FIG. 5. Note that any type of NCO or suitable alternative known in the art may be used, and the circuit shown is presented by way of example only to show one possible implementation. With continued reference to FIG. 7, the NCO input signal, which is the processed frequency error signal, is received by the NCO, which in the implementation shown, includes a modulo N-counter (counts up to N), where N is set by the NCO_mod N parameter. As shown, a loop increment is applied, so in the absence of any error, the NCO operates at a predefined frequency that is defined by the two parameters NCO loop increment (NCO_loop_incr) and NCO_mod N.

Figure 8:
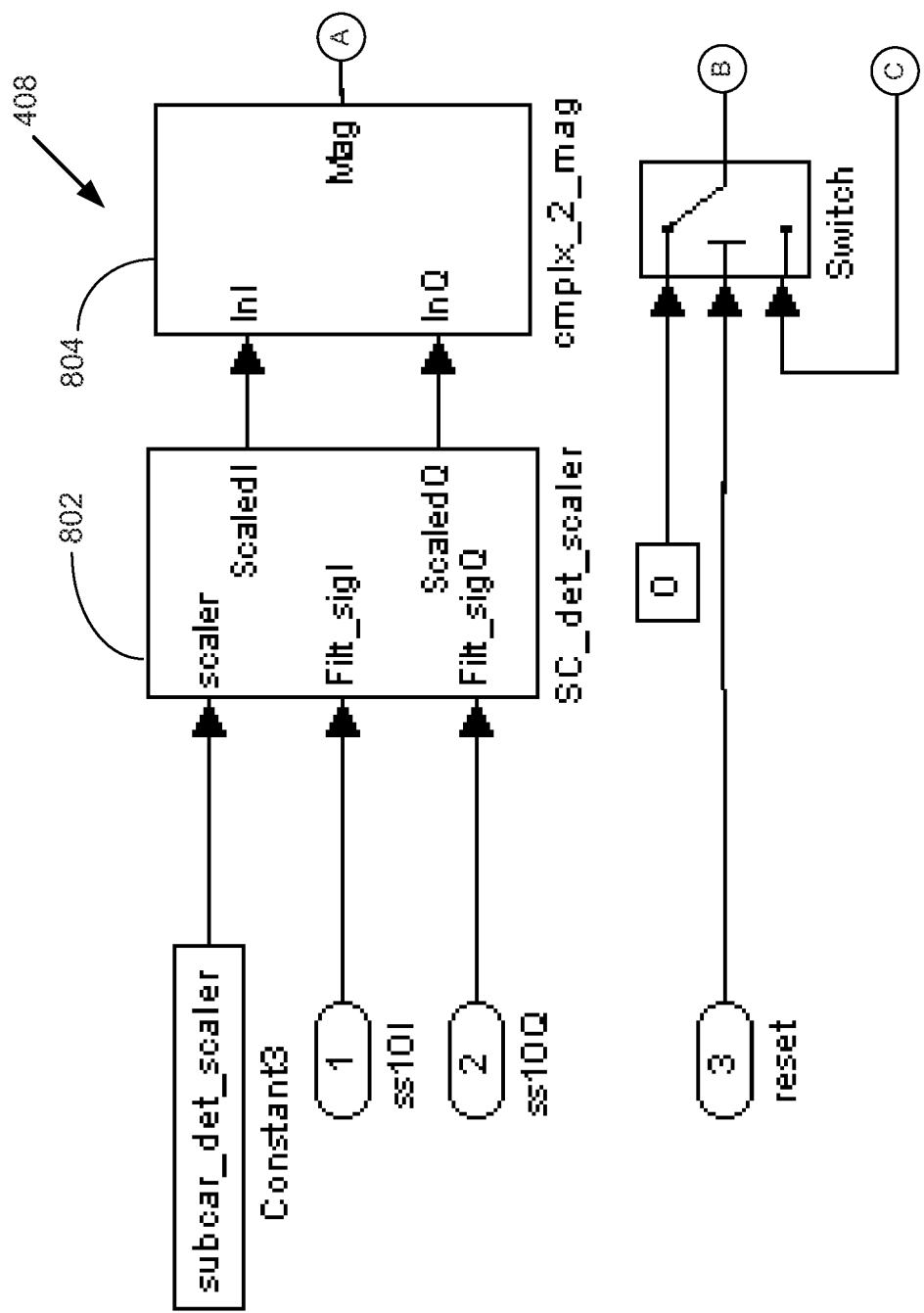
FIG. 8 is a system diagram of the subcarrier detector module of FIG. 4.

As noted in FIG. 4, the subcarrier detect signal is generated by a subcarrier detector module 408. FIG. 8 is a system diagram of the subcarrier detector module 408 of FIG. 4. Note that any type of subcarrier detector module or suitable alternative known in the art may be used, and the circuit shown is presented by way of example only to show one possible implementation. The subcarrier detector module 408 performs a scaling on filtered I and Q baseband signals (ss10I, ss10Q) output by the derotator (402, FIG. 4) using a scaler module 802. The scaler module 802 is programmable from configuration parameters applied during build, on the fly, etc. A complex to magnitude module 804 receives the output of the scaler module 802 and generates a magnitude (Mag) signal, which is input to a leaky integrator 806. The output of the leaky integrator 806 is a subcarrier power detect signal. This in turn is used to detect when the subcarrier signal level has exceeded a definable or predefined threshold set above a definable or predefined noise floor. When the subcarrier power detect signal (sc_pwr_det) exceeds the noise floor or some predetermined or dynamically determined threshold (e.g., a threshold slightly above the noise floor), the subcarrier detect signal (sc_detect, FIG. 4) indicates presence of the subcarrier and may be used by the derotator 402 (FIG. 4) as mentioned above.

Figure 9:
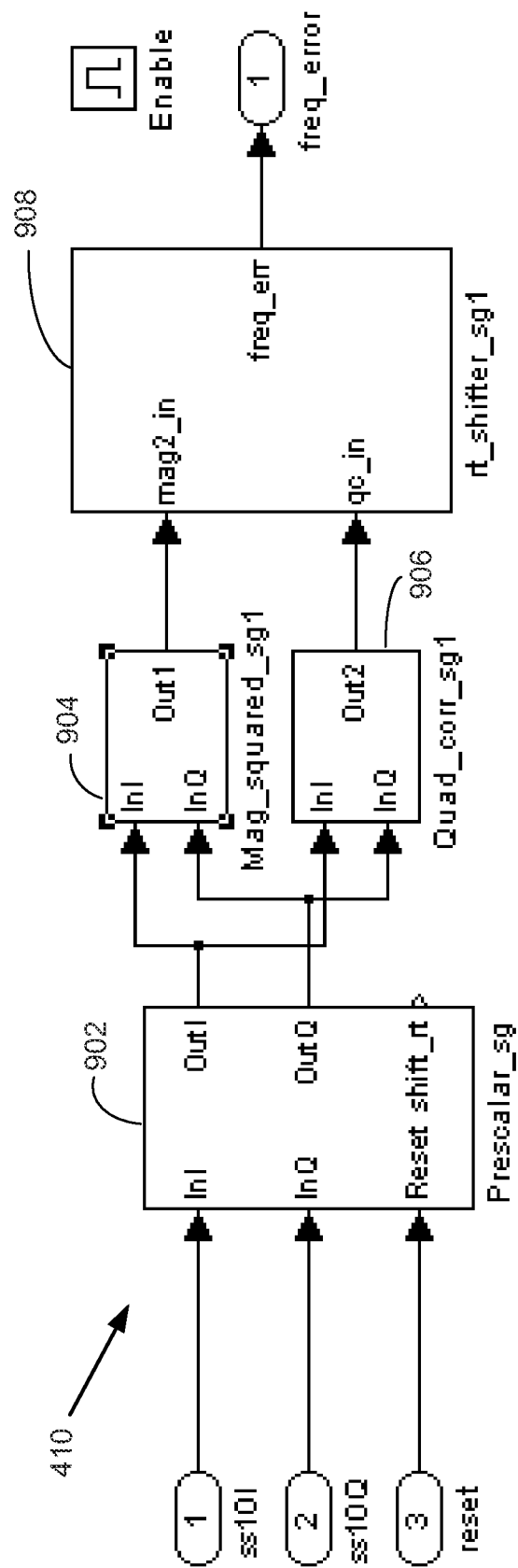
FIG. 9 is a system diagram of the frequency detector module of FIG. 4.

As noted in FIG. 4, the frequency error signal is generated by a frequency detector module 410. FIG. 9 is a system diagram of the frequency detector module 410 of FIG. 4. Note that any type of frequency detector module or suitable alternative known in the art may be used, and the circuit shown is presented by way of example only to show one possible implementation. A prescaler module 902 receives the filtered I and Q baseband signals (ss10I, ss10Q) and outputs scaled versions thereof to a magnitude normalization module 904 and a quadrature correlator 906. The prescaler may be configurable from configuration parameters applied during build, on the fly, etc.

Figure 10:
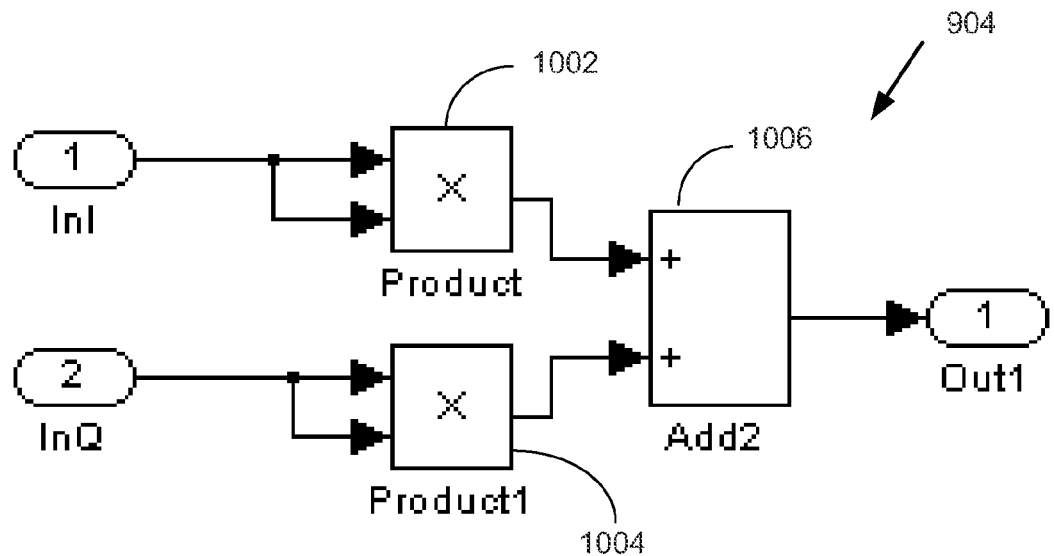
FIG. 10 is a system diagram of the magnitude normalization module of FIG. 9.

FIG. 10 is a system diagram of the magnitude normalization module 904 of FIG. 9. Note that any type of magnitude normalization module or suitable alternative known in the art may be used, and the circuit shown is presented by way of example only to show one possible implementation. As shown, the illustrative magnitude normalization module 904 includes multipliers 1002, 1004 for each of the scaled I and Q signals, and an adder 1006.

Figure 11:
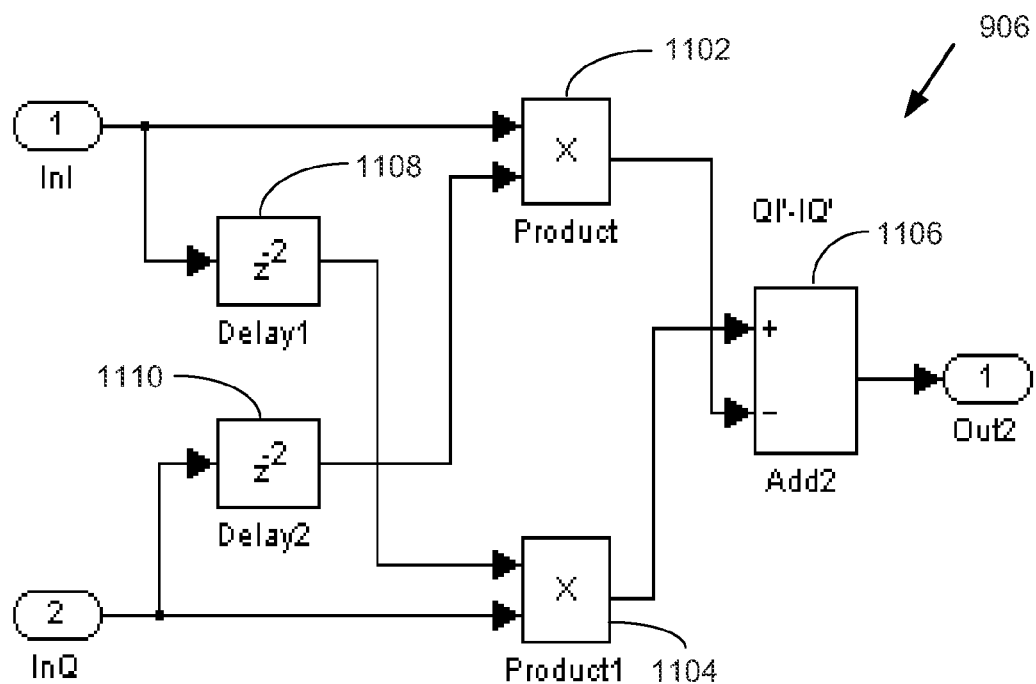
FIG. 11 is a system diagram of the quadrature correlator FM demodulator of FIG. 9

FIG. 11 is a system diagram of the quadrature correlator FM demodulator 906 of FIG. 9, also referred to herein as a quadrature correlator FM discriminator. Note that any type of quadrature correlator FM demodulator or suitable alternative known in the art may be used, and the circuit shown is presented by way of example only to show one possible implementation. As shown, the illustrative quadrature correlator FM demodulator 906 includes multipliers 1102, 1104, and delay modules 1108, 1110, where the delay modules shown have a 2 sample delay, but other approaches may have a 1, 3, 5, etc. sample delay. An adder 1106 receiving outputs of the multipliers 1102, 1104. In the embodiment shown, the adder adds: QI'-IQ', where ' (prime) denotes a delayed version of the signal. Particularly, the signals are multiplied and subtracted to produce an output that is proportional to the frequency error.

If the incoming signal is large, the frequency error appears large because it is proportional to the signal amplitude. But if this is normalized by the amplitude of the signal, the frequency error does not appear large. Thus, referring again to FIG. 9, the magnitude normalization module 904 provides the scaling that ultimately is used to generate a proper frequency error signal. This design acts as a quadrature correlator frequency modulation (FM) discriminator with magnitude normalization. Moreover, because tags typically do not have a good clock frequency reference, this approach allows reading of the signal no matter what state the subcarrier is in, and in spite of noise.

Referring again to FIG. 9, a frequency error generator module 908 receives the outputs from the magnitude normalization module 904 and the quadrature correlator FM demodulator 906 and generates a frequency error signal. In the example shown, the frequency error generator module 908 includes a right shifter which normalizes the data. The quadrature correlator 906 in the configuration shown in FIG. 11 is a frequency discriminator whose output is proportional to the frequency error, and is normalized by magnitude squared in the frequency error generator module 908. The result is that the output (freq_error) of the frequency error generator module 908 is not a function of magnitude, but rather of frequency error regardless of whether the incoming signal is small or large. The output of the frequency detector module 410 or derivative thereof may be used by the derotator 402 (FIG. 4) as described above.

Figure 12:
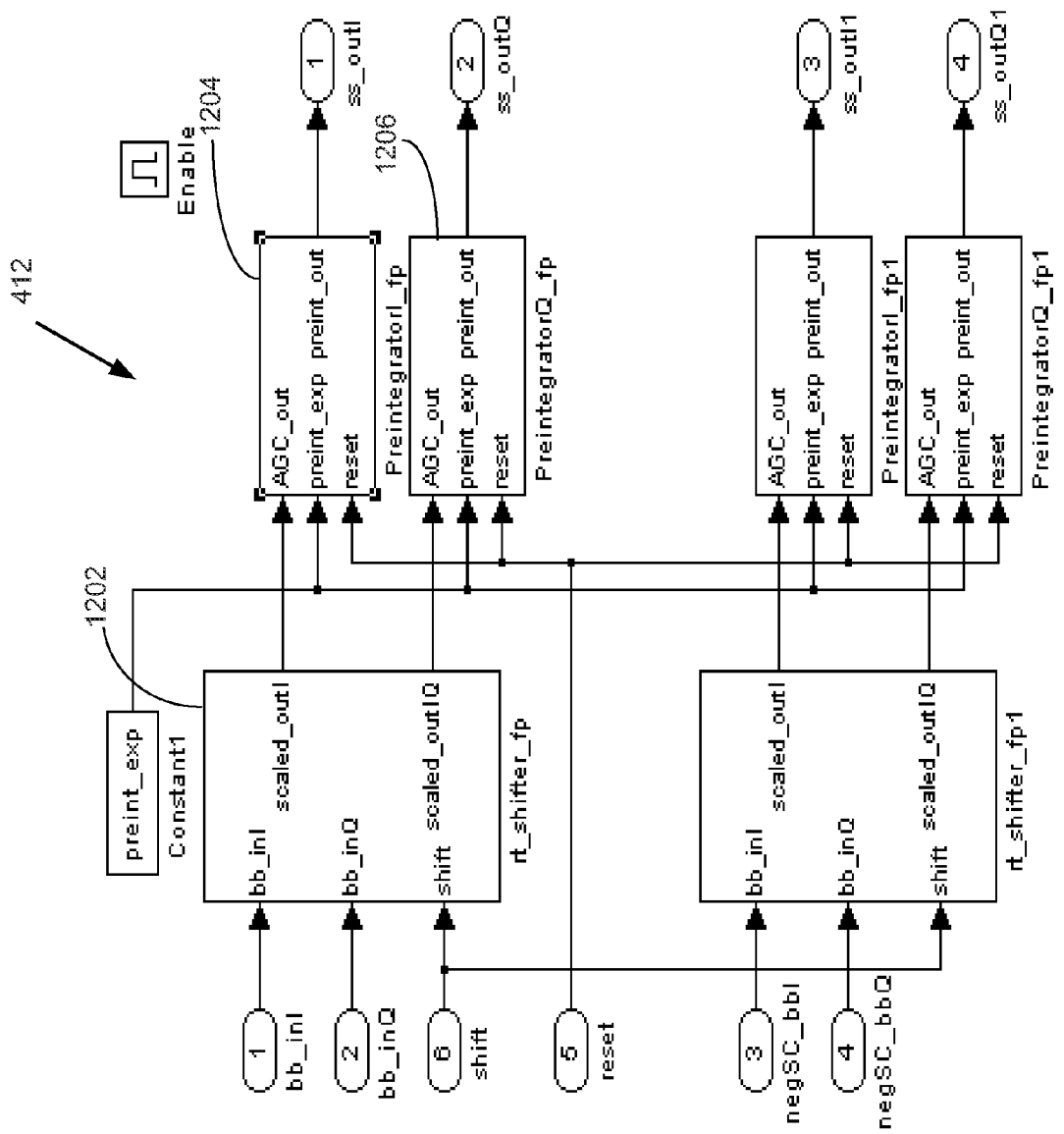
FIG. 12 is a system diagram of the preintegrator module of FIG. 4.

Referring again to FIG. 4, the baseband I and Q outputs from the derotator are received by a preintegrator module 412. FIG. 12 is a system diagram of the preintegrator module 412 of FIG. 4. Note that any type of preintegrator module or suitable alternative known in the art may be used, and the circuit shown is presented by way of example only to show one possible implementation. As shown, the illustrative preintegrator module 412 includes a top section having an automatic gain control (AGC) section 1202, which may be a right shifter acting as an automatic gain control, and two preintegrators 1204, 1206, one for I and one for Q. In some embodiments, only this section may be present. In other embodiments, and as shown, two processing paths may be provided for the positive and negative baseband signals, e.g., the top section is used for the positive subcarrier signal, and the AGC and preintegrator are duplicated for the negative subcarrier signal in the lower section.

The preintegrator module 412 selectively reduces the number of samples in the baseband signals being processed by the device. At lower data rates, when there are more than enough samples per symbol, the samples may be preintegrated so that the system does not have to process significantly more samples than are needed for accurate data recovery. When to reduce the number of samples may be dependent upon a predefined threshold corresponding, e.g., to a data rate; may be derived from a table; input from another module or controller; etc.

Figure 13:
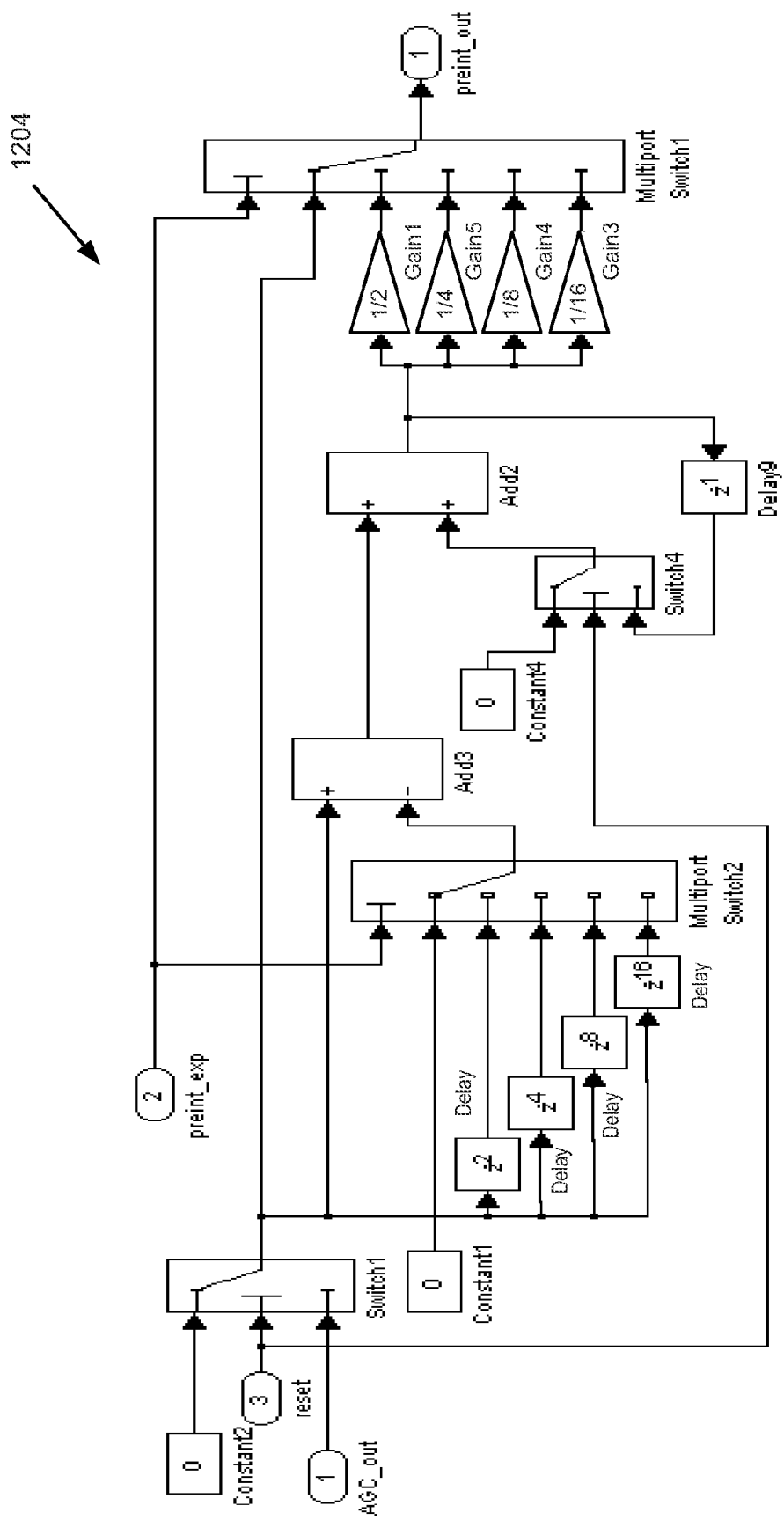
FIG. 13 is a system diagram of one preintegrator of FIG. 12.

FIG. 13 is a system diagram of one preintegrator 1204 of FIG. 12. Note that any type of preintegrator or suitable alternative known in the art may be used, and the circuit shown is presented by way of example only to show one possible implementation.

Figure 14:
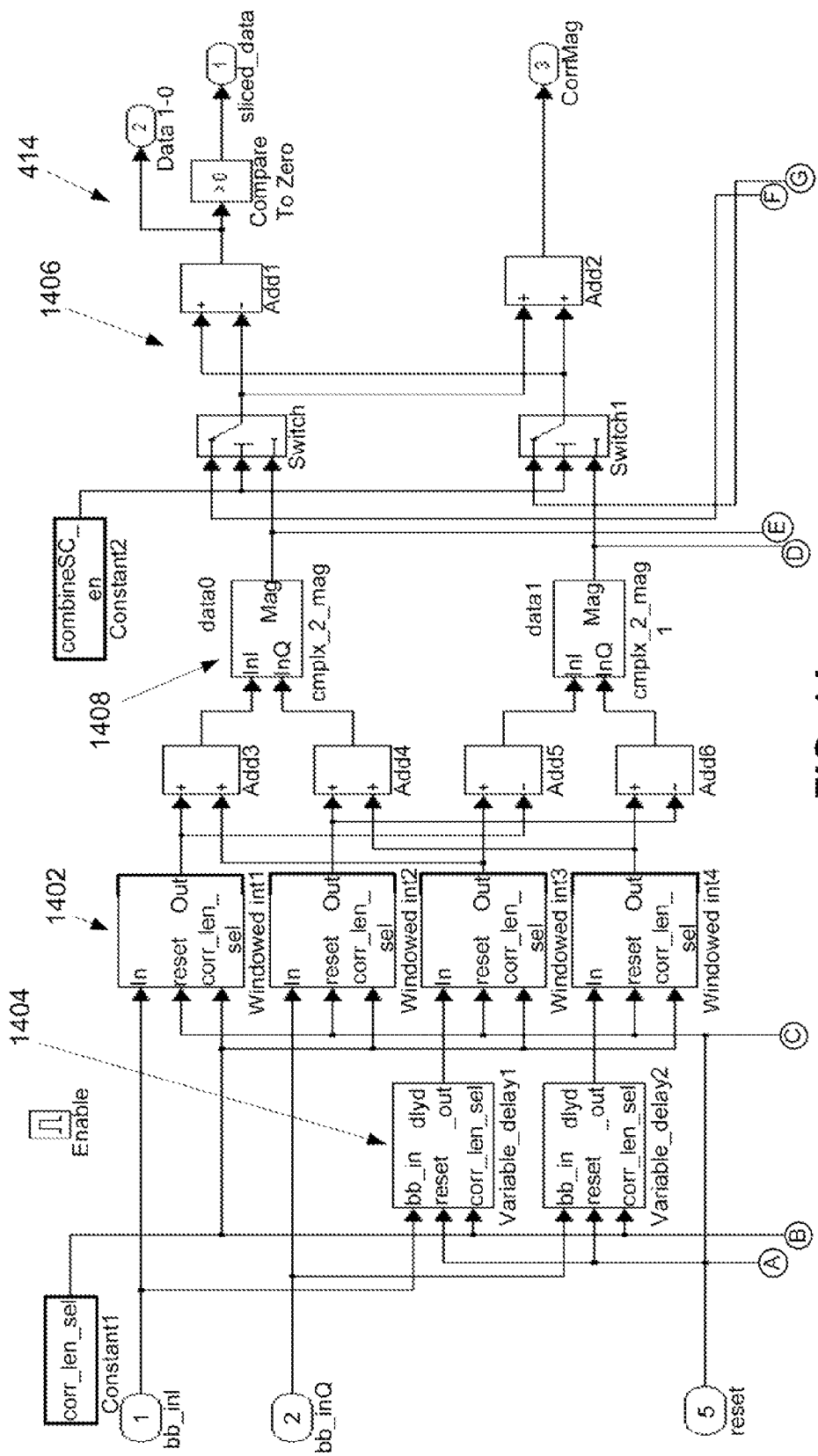
FIG. 14 is a system diagram of the correlator module of FIG. 4.

Referring again to FIG. 4, the outputs from the preintegrator module 412 are received by a correlator module 414. FIG. 14 is a system diagram of the correlator module 414 of FIG. 4. Note that any type of correlator module or suitable alternative known in the art may be used, and the circuit shown is presented by way of example only to show one possible implementation. As shown, the illustrative correlator module 414 has one section (upper sideband section) for the positive subcarrier signals, and another section (lower sideband section) for the negative subcarrier signals. In the embodiment shown, both sections may be used to coherently combine both subcarrier sideband signals. In another embodiment, the upper or lower sideband sections may be used at a given time to avoid interference. In yet another embodiment, the system may select to use the output of the upper sideband section, the lower sideband section, or both sideband sections for a given operation. Which section or section to choose may be determined based on interference in the signal, whether a stronger signal is desired, e.g. to improve downconversion, to avoid zero beat distortion caused by Doppler frequency shifts from moving tags, etc.

Referring to FIG. 14, the correlator module 414 employs a series of correlator blocks 1402, which in some embodiments may be windowed integrators that are each a half hit, half symbol integrator correlator, and are each configurable for different lengths thereby allowing the system to handle a large variety of data lengths. A correlator length select signal may be used to set the length configuration of the correlator blocks 1402. Pairs of correlator variable delay modules 1404 provide a half of a symbol delay into two of the correlator blocks 1402 (I and Q) in each section. The result is that each section has two nondelayed integrators and two delayed integrators.

The subcarrier combine section 1406 in the embodiment shown is particularly advantageous in that the signals are kept separate until the output of the complex to magnitude modules 1408 so that any Doppler shift due to fast moving tags does not cause any beat note problems. Moreover, combining the sideband signal after the correlators allows improved demodulation performance, e.g., by up to 3 dB.

Figure 15:
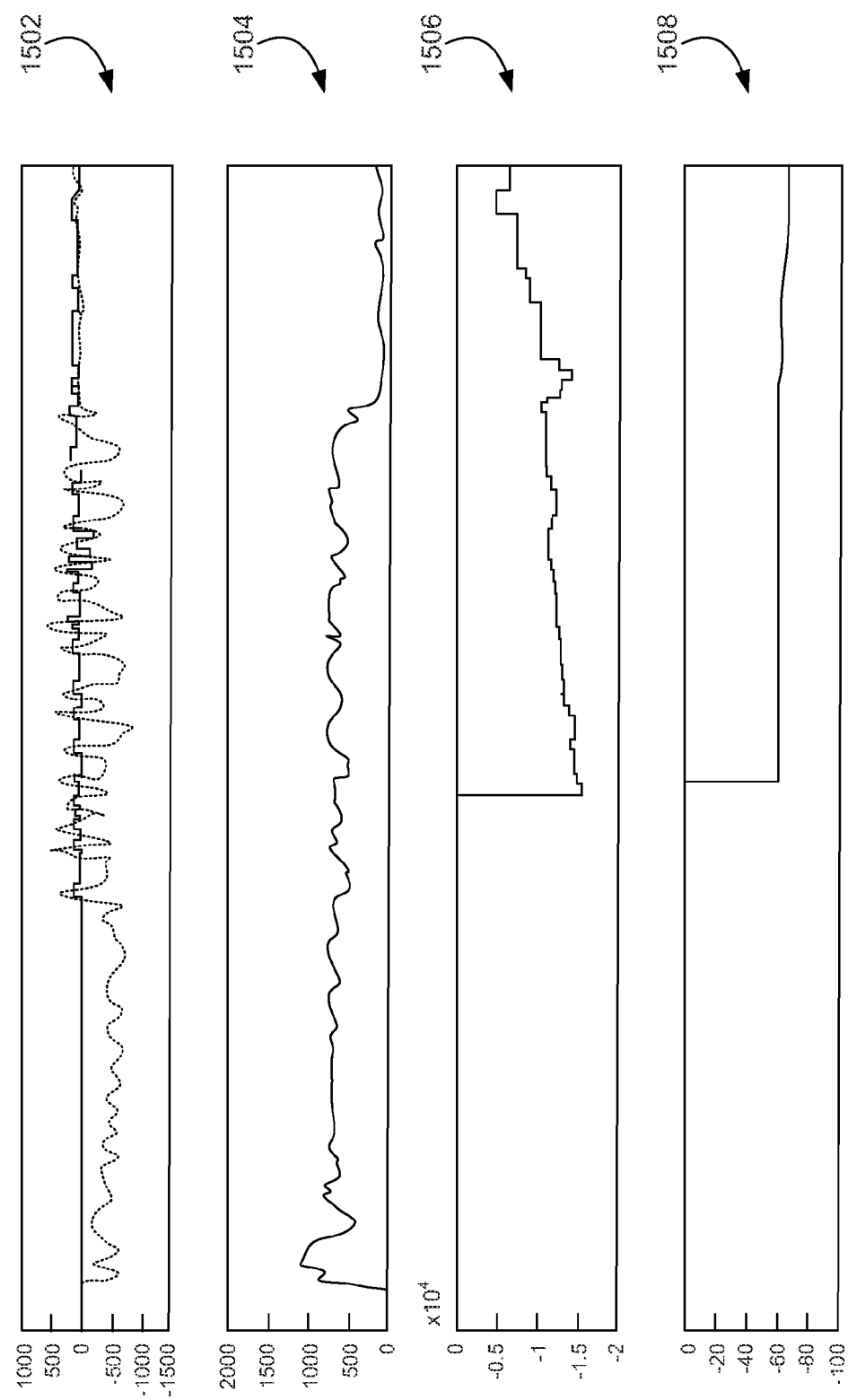
FIG. 15 is a series of charts depicting illustrative outputs of the correlator.

FIG. 15 shows illustrative outputs of the correlator. Particularly, the top chart 1502 is an overlay of the higher-amplitude analog correlator output (data 1-0), and the lower-amplitude line represents the binary version. The second chart 1504 is of an exemplary correlator magnitude signal.

Figure 16:
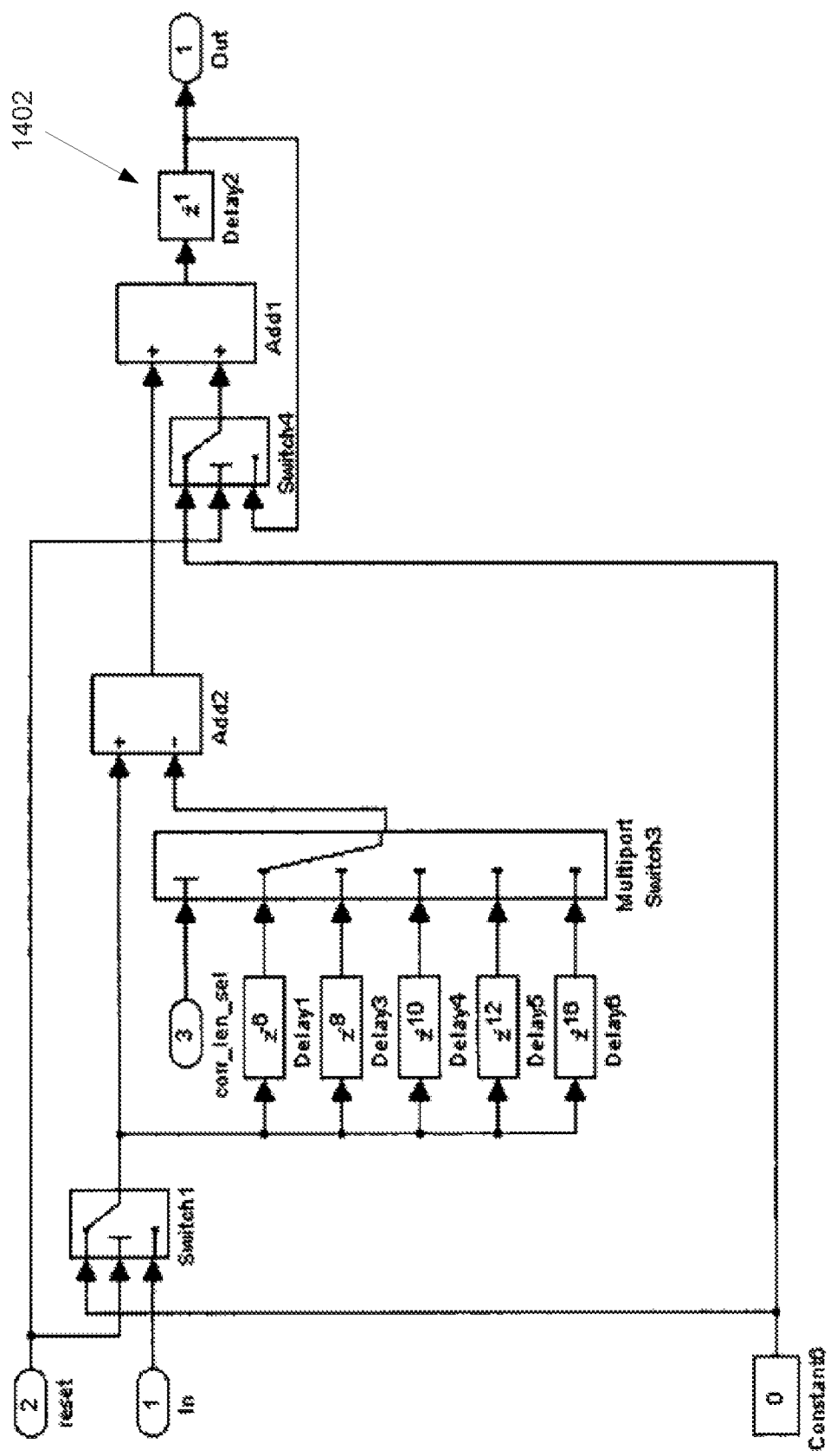
FIG. 16 is a system diagram of one windowed integrator of FIG. 14.

FIG. 16 is a system diagram of one windowed integrator 1402 of FIG. 14. Note that any type of windowed integrator or suitable alternative known in the art may be used, and the circuit shown is presented by way of example only to show one possible implementation.

Figure 17:
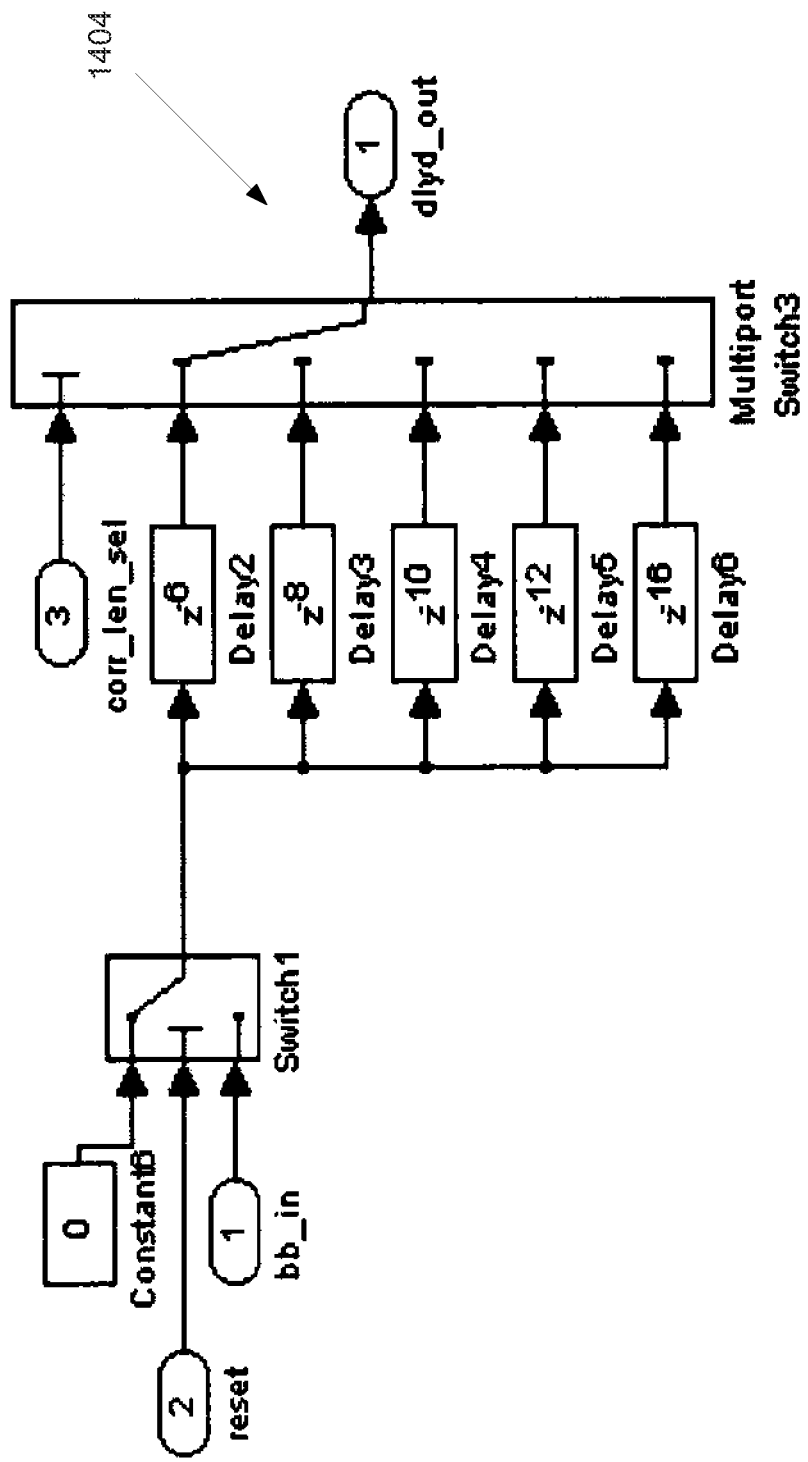
FIG. 17 is a system diagram of one variable delay module of FIG. 14.

FIG. 17 is a system diagram of one variable delay module 1404 of FIG. 14. Note that any type of variable delay module or suitable alternative known in the art may be used, and the circuit shown is presented by way of example only to show one possible implementation.

Figure 18:
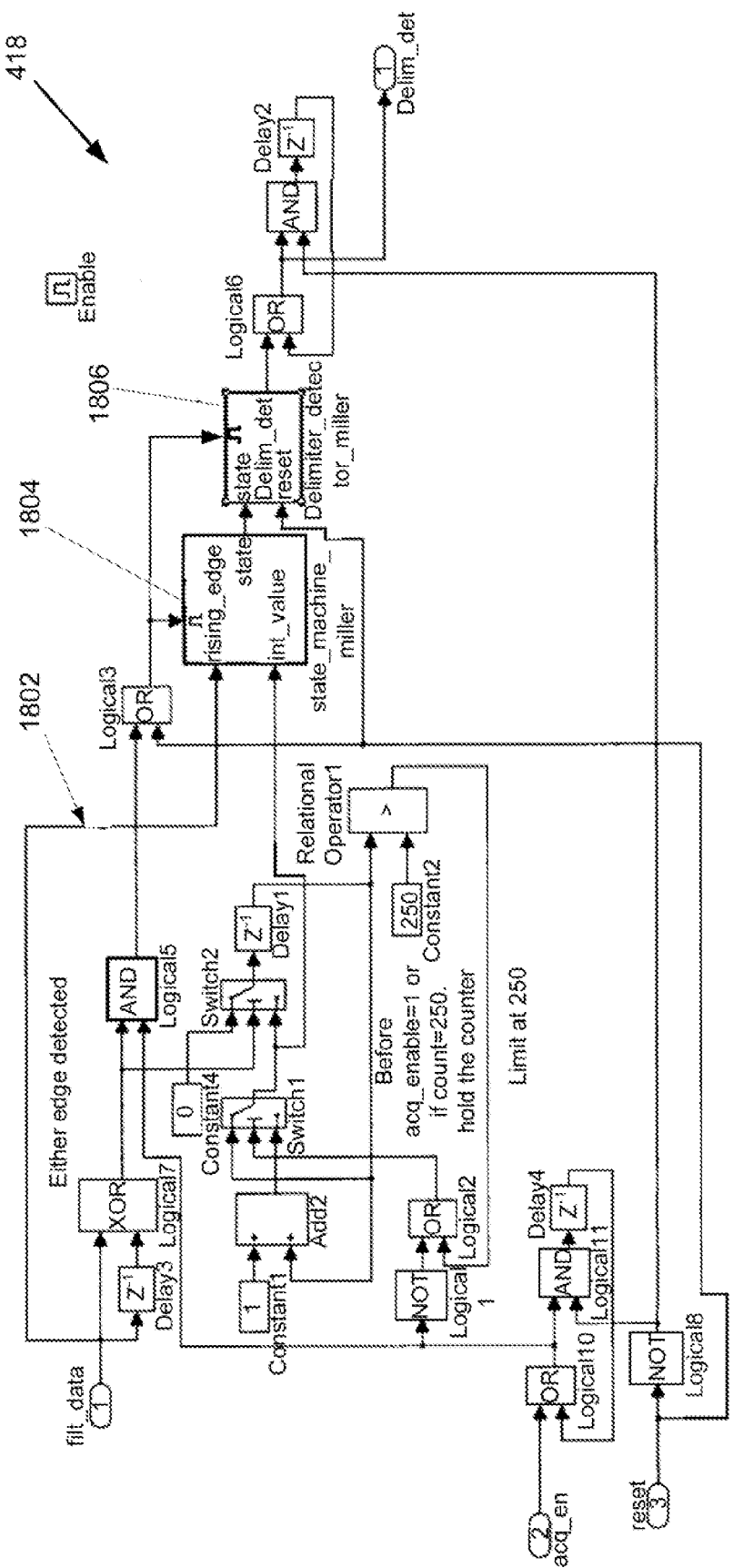
FIG. 18 is a system diagram of the preamble delimiter detection module of FIG. 4.

Referring again to FIG. 4, the sliced data output from the correlator module 414 may be filtered by a filter module 416, the output of which is received by a preamble delimiter detection module 418. FIG. 18 is a system diagram of the preamble delimiter detection module 418 of FIG. 4. Note that any type of preamble delimiter detection module or suitable alternative known in the art may be used, and the circuit shown is presented by way of example only to show one possible implementation. When processing the incoming signal, the carrier wave is received during the carrier preamble period. Then, the preamble delimiter detection module 418 detects a delimiter, e.g., 1-0-1-1-1, which denotes the start of a frame. As shown, the illustrative preamble delimiter detection module 418 includes a section 1802 that counts the time between transitions, the output of which is received by a state machine 1804, which is triggered at each transition. The output of the state machine 1804 is received by a state sequence recognition module 1806. The state sequence recognition module 1806 generates a preamble delimiter detection signal, which may be further processed before leaving the preamble delimiter detection module 418.

As an option, the preamble delimiter detection module 418 may be activated by an acquisition enable signal (acq_en) output by the derotator 402, as shown in FIG. 4.

Figure 19:
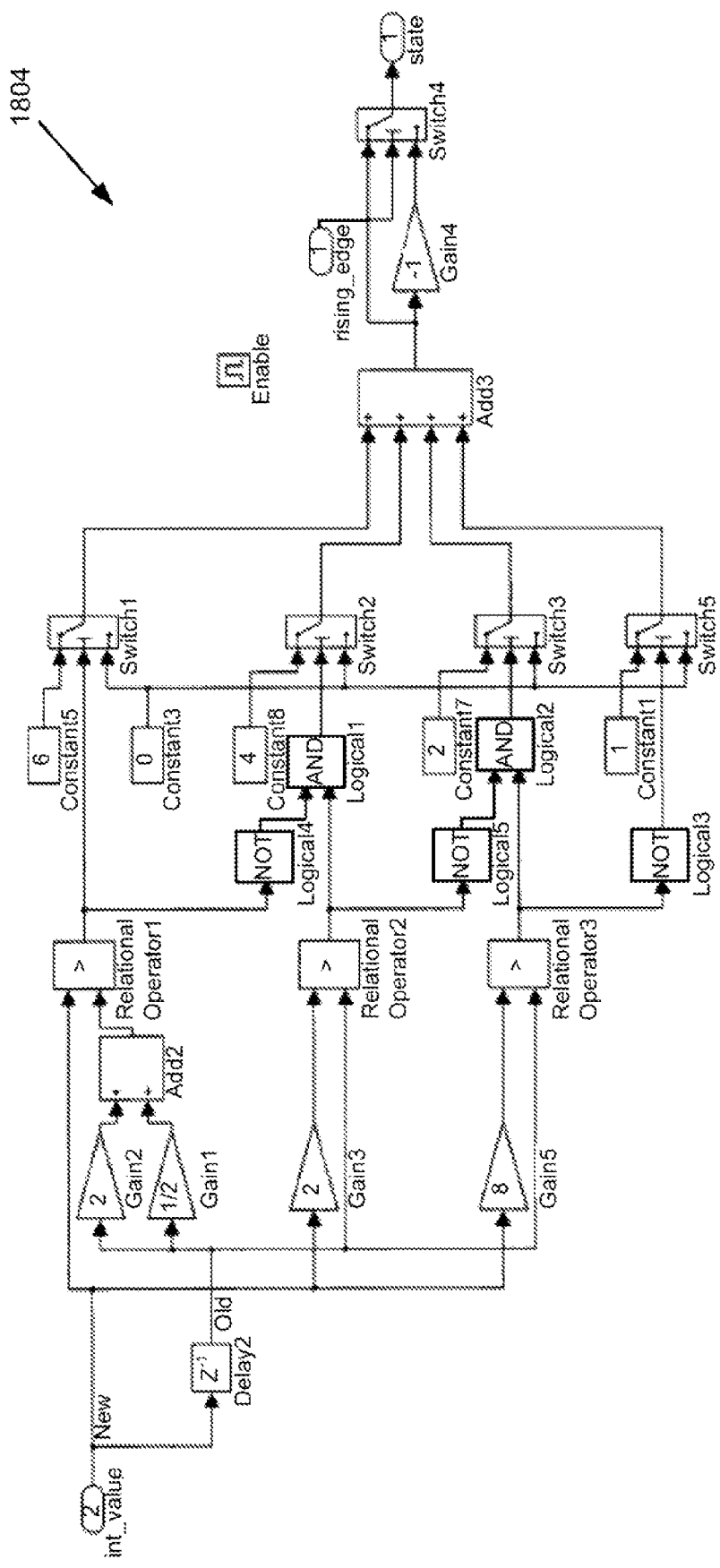
FIG. 19 is a system diagram of the state machine of FIG. 18.

FIG. 19 is a system diagram of the state machine 1804 of FIG. 18. Note that any type of state machine or suitable alternative known in the art may be used, and the circuit shown is presented by way of example only to show one possible implementation.

Figure 20:
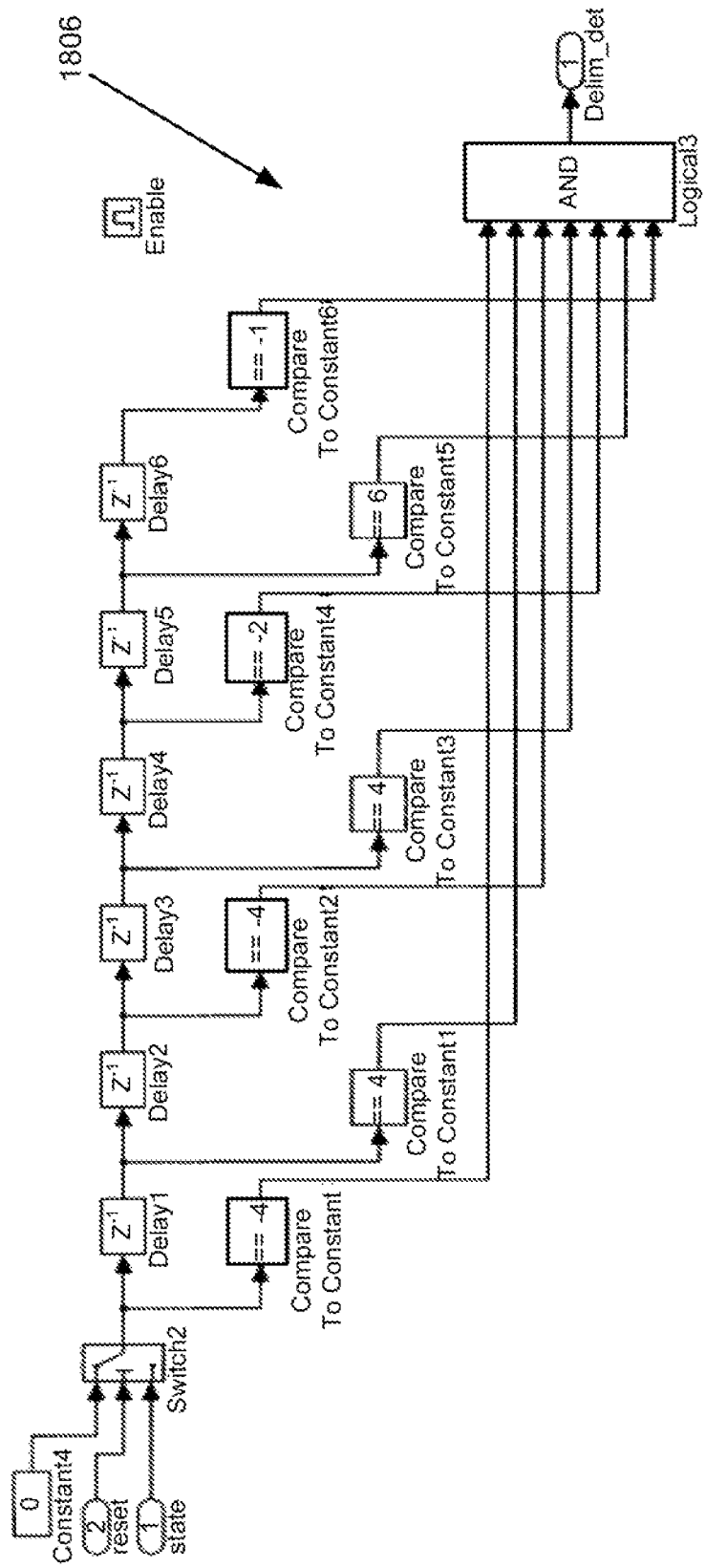
FIG. 20 is a system diagram of the state sequence recognition module of FIG. 18.

FIG. 20 is a system diagram of the state sequence recognition module 1806 of FIG. 18. Note that any type of state sequence recognition module or suitable alternative known in the art may be used, and the circuit shown is presented by way of example only to show one possible implementation.

Figure 21:
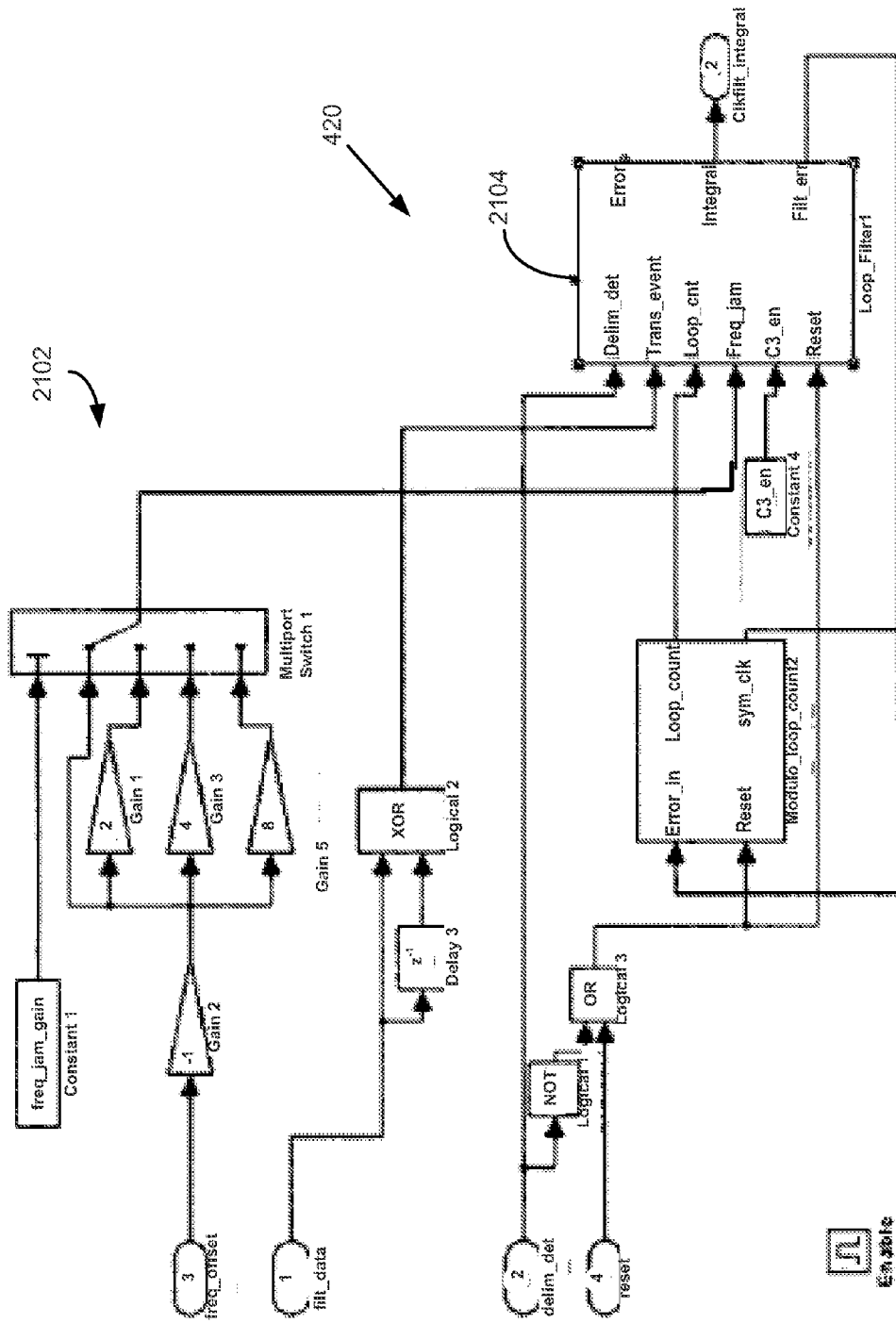
FIG. 21 is a system diagram of the clock recovery module of FIG. 4.

FIG. 21 is a system diagram of the clock recovery module 420 of FIG. 4. Note that any type of clock recovery module or suitable alternative known in the art may be used, and the circuit shown is presented by way of example only to show one possible implementation. As shown in FIGS. 4 and 21, the illustrative clock recovery module 420 receives as input the filtered baseband data from the filter 416, the preamble delimiter signal from the preamble delimiter detection module 418, and the frequency offset signal from the derotator 402. A frequency jam signal is generated by the jam set section 2102, which converts the estimated subcarrier frequency offset signal generated in the correlator 402 (FIG. 4, 5) into a scaled version for the clock frequency jam set.

The frequency jam signal is input to a loop filter 2104 as the initial data clock frequency error.

FIG. 15 shows an illustrative output 1506 of the clock recovery module 420. Particularly, in the clock recovery loop, there is a term called the clock filter integral. When the preamble delimiter is detected, the delimiter detect signal is set high, a frequency jam set value derived from the subcarrier recovery section is loaded into the clock filter integral register, and the clock recovery loop then tracks the clock timing until the end of the signal, then starts to diverge again.

Figure 22:
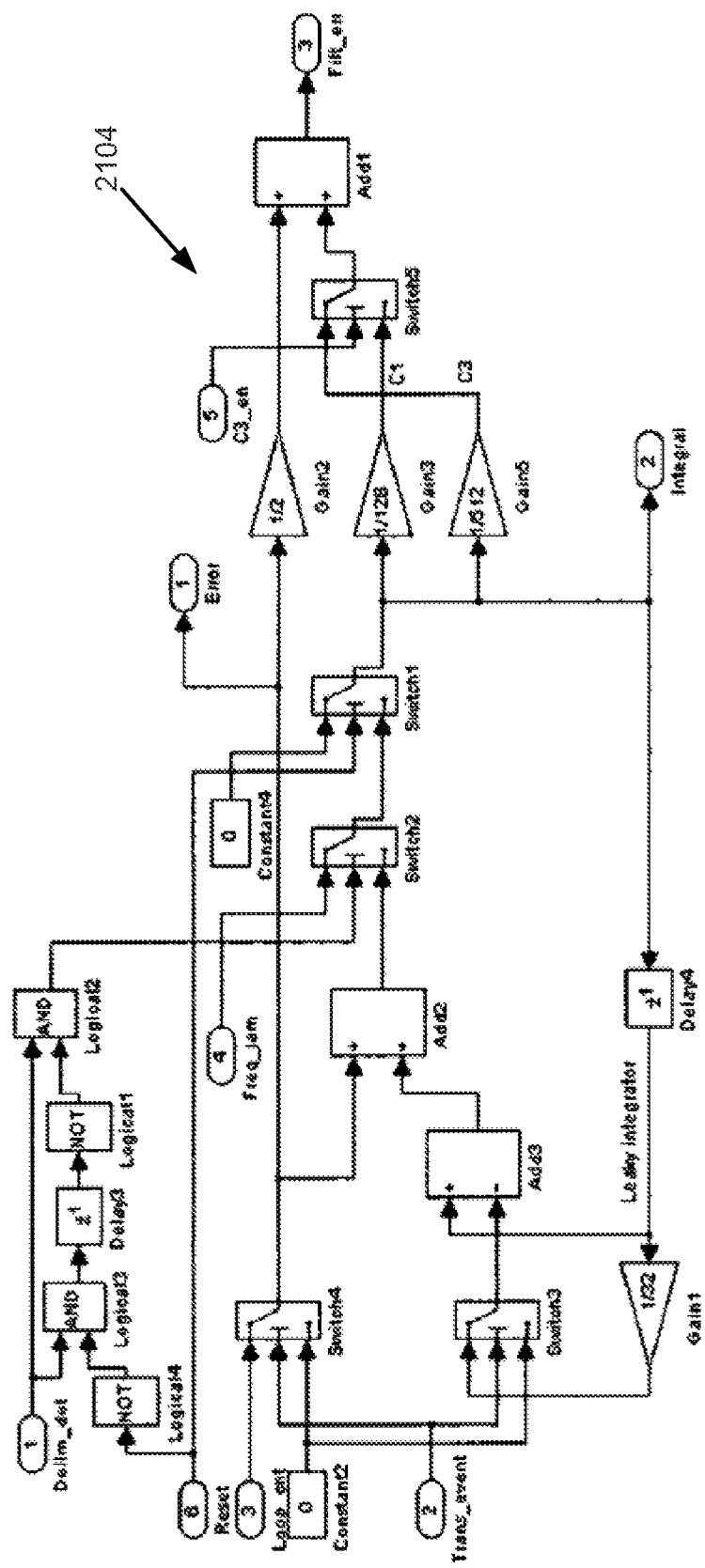
FIG. 22 is a system diagram of the loop filter of FIG. 21.

FIG. 22 is a system diagram of the loop filter 2104 of FIG. 21. Note that any type of loop filter or suitable alternative known in the art may be used, and the circuit shown is presented by way of example only to show one possible implementation.

Figure 23:
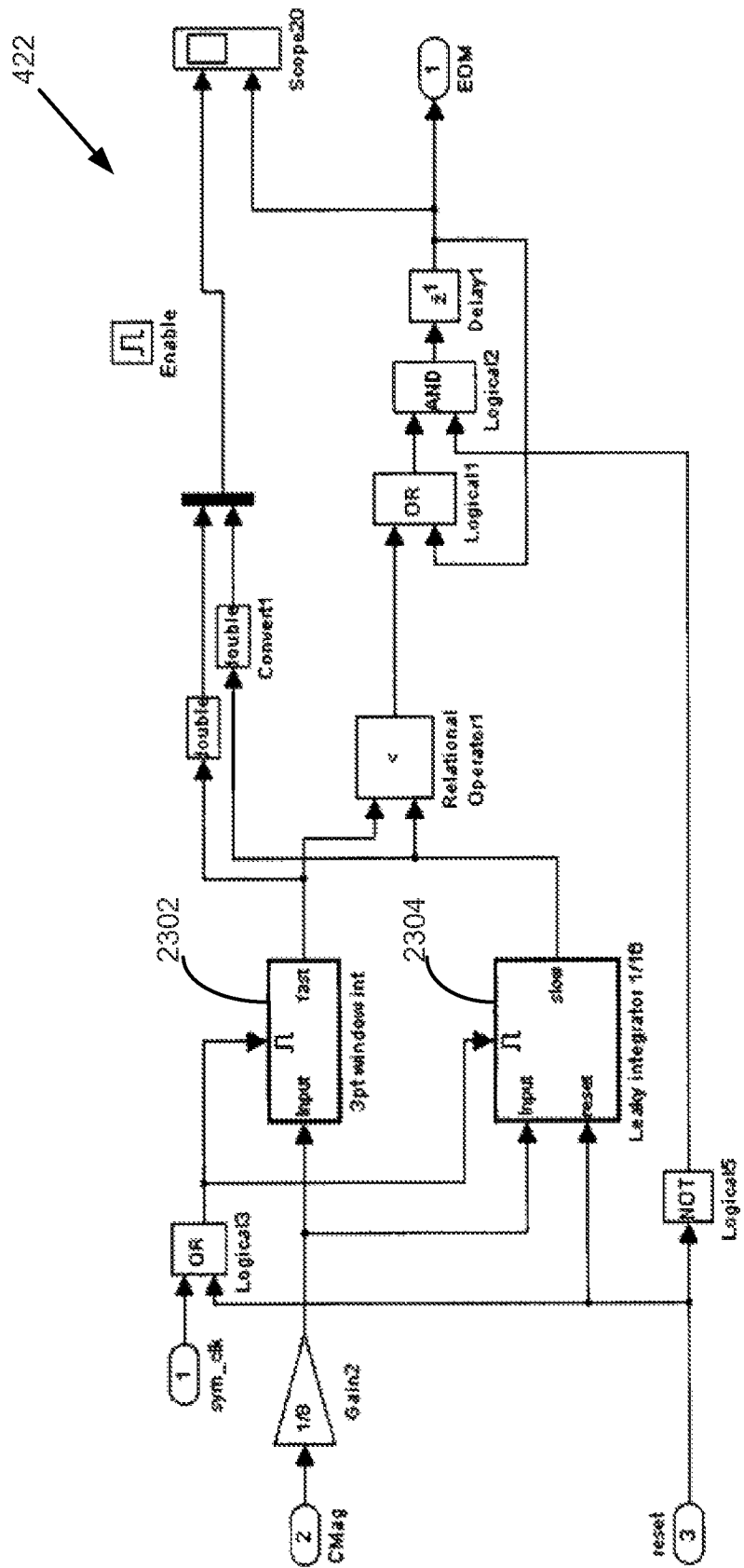
FIG. 23 is a system diagram of the end of modulation detection module of FIG. 4.

Referring again to FIG. 4, an end of modulation detection module 422 may be used to determine when the modulated signal has ended. FIG. 23 is a system diagram of the end of modulation detection module 422 of FIG. 4. Note that any type of end of modulation detection module or suitable alternative known in the art may be used, and the circuit shown is presented by way of example only to show one possible implementation. The end of modulation signal is derived from the correlator magnitude output of the correlator.

The end of modulation signal output from the end of modulation detection module 422 is used to indicate the end of modulation. This is particularly useful in situations where the amount of data is unknown, such as where a reader tells a tag to backscatter all contents of its data up to the end of a bank, and the reader does not know how many bits the tag has. This module 422 provides a way for the system to know when to stop reading and when it can go on to next operation, e.g., start sending data again. In the end of modulation detection circuit 422, the fast averager 2302 may be a 3-point window integrator and the slow averager 2304 may be a leaky integrator.

Figure 24:
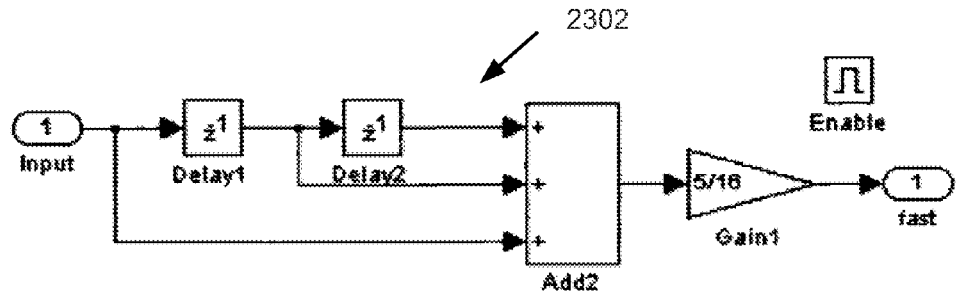
FIG. 24 is a system diagram of a 3-point window integrator of FIG. 23.

FIG. 24 is a system diagram of a 3-point window integrator 2302 of FIG. 23. Note that any type of a fast averager or suitable alternative known in the art may be used, and the circuit shown is presented by way of example only to show one possible implementation.

Figure 25:
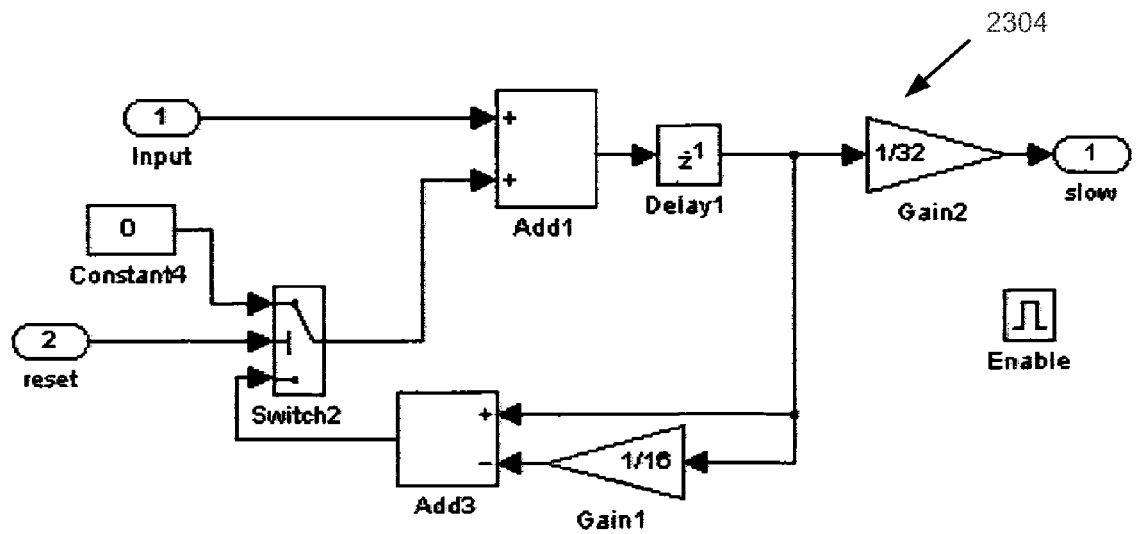
FIG. 25 is a system diagram of the leaky integrator of FIG. 23.

FIG. 25 is a system diagram of the leaky integrator 2304 of FIG. 23. Note that any type of a slow averager or suitable alternative known in the art may be used, and the circuit shown is presented by way of example only to show one possible implementation.

Figure 26:
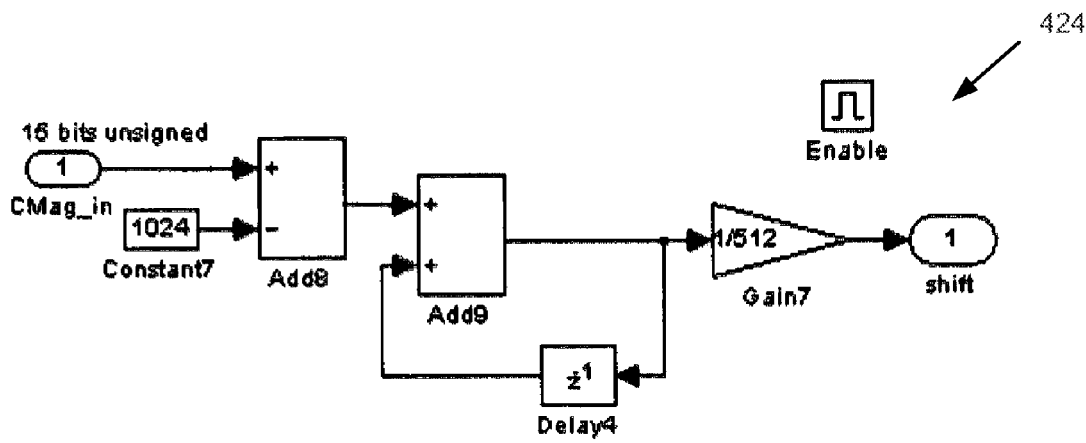
FIG. 26 is a system diagram of the automatic gain control (AGC) module of FIG. 4.

FIG. 26 is a system diagram of the automatic gain control (AGC) module 424 of FIG. 4. Note that any type of AGC or suitable alternative known in the art may be used, and the circuit shown is presented by way of example only to show one possible implementation. The AGC forms part of a loop that attempts to get to the closest coarse gain setting as it can in the preamble period. Once the AGC finishes at the end of preamble period, the shift value that the AGC calculates is frozen, which creates again setting for the signal.

Figure 27:
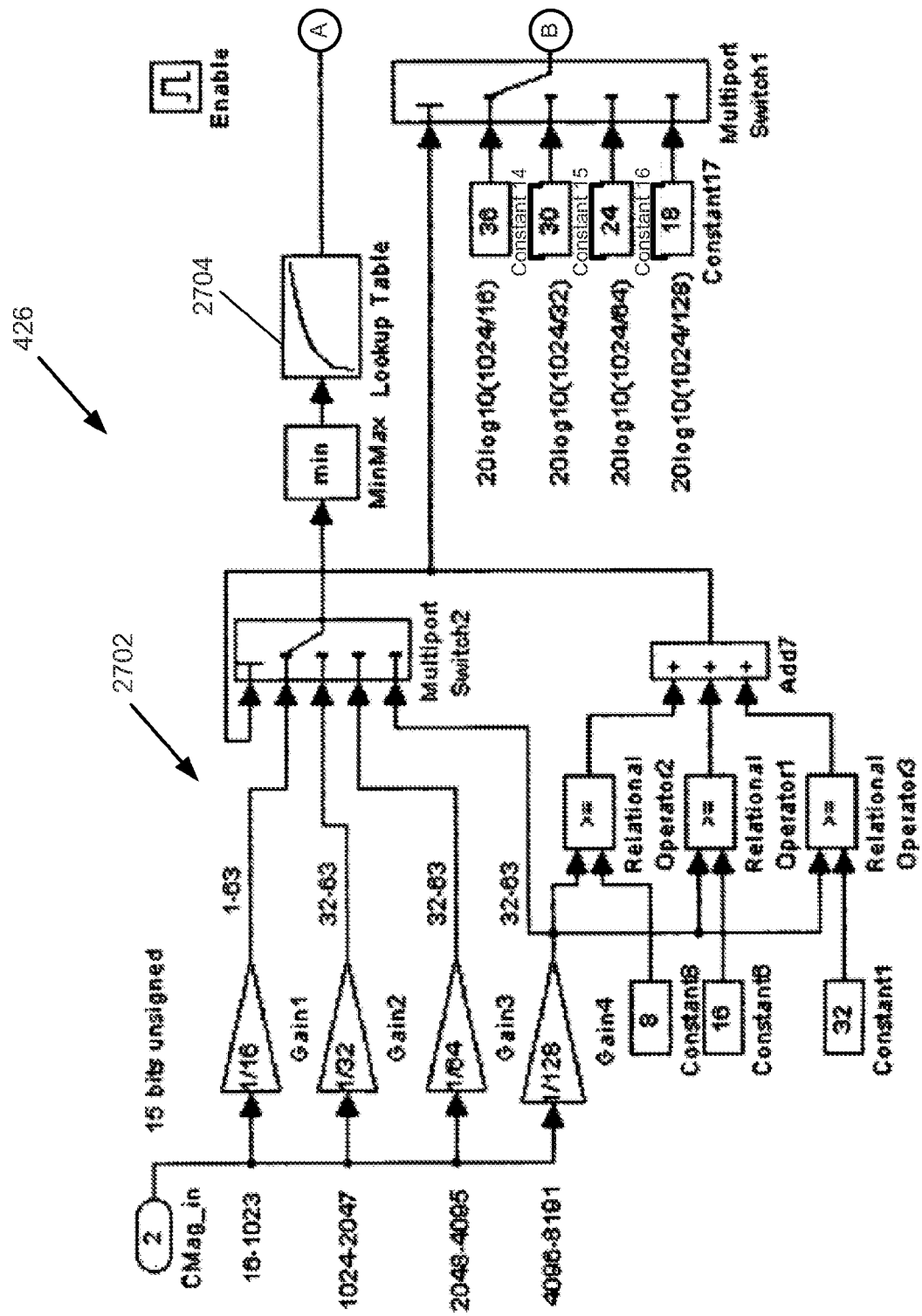
FIG. 27 is a system diagram of the received signal strength indicator (RSSI) module of FIG. 4.

FIG. 27 is a system diagram of the received signal strength indicator (RSSI) module 426 of FIG. 4. Note that any type of RSSI circuit or suitable alternative known in the art may be used, and the circuit shown is presented by way of example only to show one possible implementation. The shift signal from the AGC is received by the RSSI module 426. For every bit of this shift, a certain amount of gain is applied. For example, the range of shift values may be from 1 to 15, and for every bit of shift, there is a 6 dB difference in signal level. To that coarse RSSI value is added a line RSSI value derived from the correlator magnitude.

There has thus been described a demodulator circuit according to various embodiments of the present invention. Again, this has been done by way of example only. The following aspects may be implemented in the demodulator circuit described, or a different circuit without straying from the spirit and scope of the present invention.

Any of the modules or portions thereof may be implemented in an FPGA in alternate embodiments.

Moreover, the various signals may be filtered, amplified, etc. and appropriate hardware may be provided for the same.

Subcarrier Frequency Acquisition and Complex Derotation to Baseband

Figure 28:
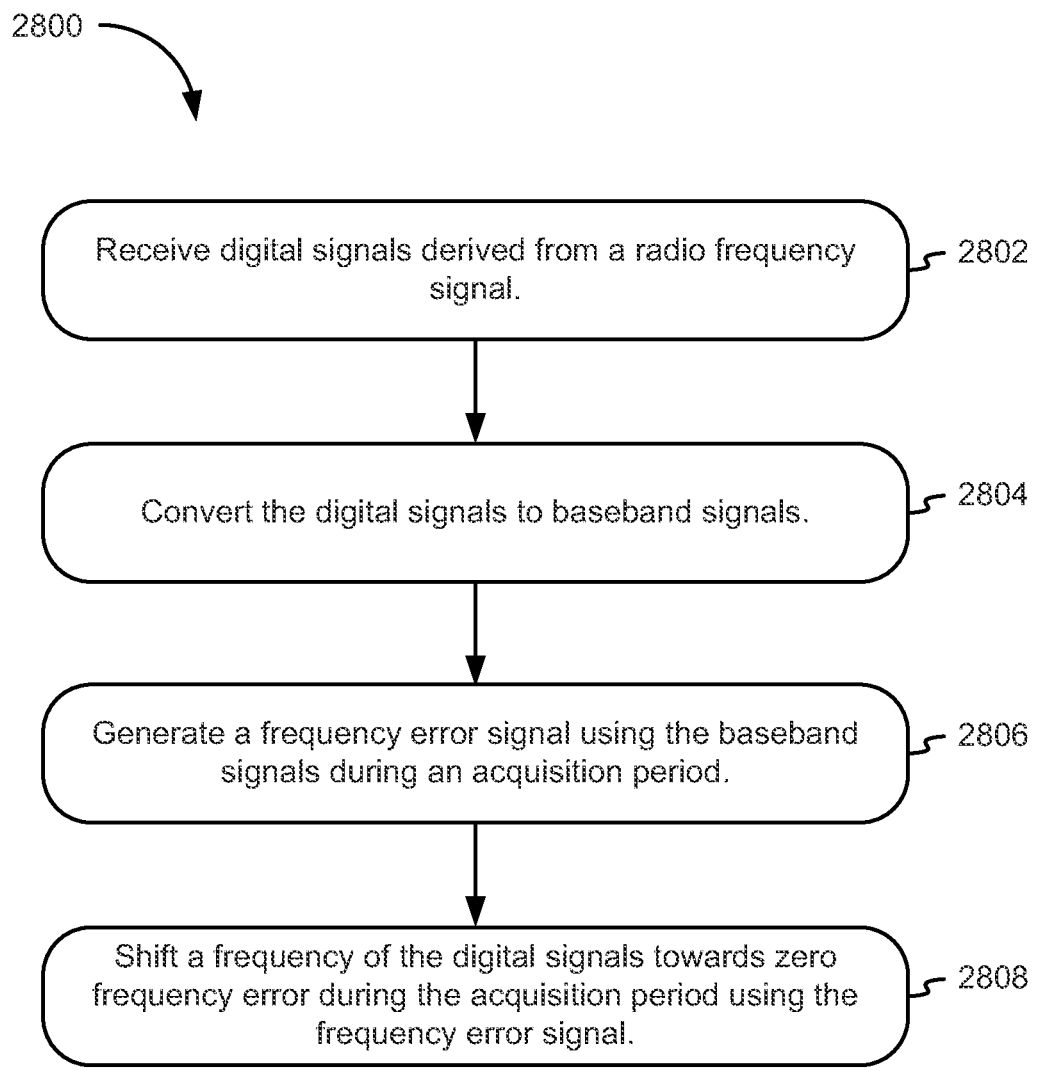
FIG. 28 depicts a process flow for a method for demodulating a radio frequency signal, according to one general embodiment.

FIG. 28 depicts a process flow for a method 2800 for demodulating a radio frequency signal, according to one general embodiment. Such methodology 2800 may be implemented logic such as hardware, software, combinations thereof, etc. Moreover, the method 2800 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 28, digital signals derived from a radio frequency signal are received in operation 2802. The radio frequency signal may be a backscattered signal. An analog to digital converter may be used in the circuitry for converting analog signals from the antenna into the digital signals.

In operation 2804, the digital signals are converted to baseband signals.

In operation 2806, a frequency error signal is generated using the baseband signals during an acquisition period. In one approach, the frequency error signal is generated using outputs of a quadrature correlator frequency modulation discriminator and a magnitude normalization module. In some embodiments, the frequency error accumulates in a frequency error filter.

In embodiments where the digital signals include sideband signals, logic for generating the frequency error signal may be initiated after the sideband signals are detected by a subcarrier detection module.

The acquisition period in one approach is the period during a preamble period of an incoming radio frequency signal. The frequency of the digital signals may be frozen at an end of the acquisition period.

In operation 2808, a frequency of the digital signals is shifted towards zero frequency error during the acquisition period using the frequency error signal, optionally with the proviso that the digital signals are not phase locked during the shifting.

In one approach, a frequency offset corresponding to the shifted frequency of the digital signals may be used to jam set a data clock recovery loop. In another approach, the frequency error signal may be used to control a numerically controlled oscillator, and using an output of the numerically controlled oscillator to determine multipliers for a derotator that outputs the baseband signals.

A system according to one embodiment includes a multiplier coupled to signal inputs, the multiplier being for outputting baseband signals derived from subcarrier signals received via the signal inputs; and a frequency error detector module coupled to baseband signal outputs of the multiplier, the frequency detector being for generating a frequency error signal using the baseband signals from the multiplier, wherein an output for the frequency error signal is coupled to an NCO, wherein an output of the NCO is used as a reference input for the multiplier, thereby creating a frequency acquisition loop, also referred to as a frequency error loop.

The system may further include at least one antenna and an analog to digital converter for converting analog signals from the antenna into the digital signals. In one approach, the frequency detector module includes a quadrature correlator frequency modulation discriminator and a magnitude normalization module.

Referring again to the illustrative embodiment described above with respect to FIG. 4, the reverse link backscatter link frequency (BIT) in some approaches may vary from 25 Hz to 640 KHz and above. In addition, there is a large frequency error allowed by some RFID standards that ranges from 4% to >20% of the BLF. C1G2-compliant passive applications, the reverse link signal is assumed to be very strong, so a common technique in the industry is to look for zero crossings in the I or Q quadrature arms of the demodulator. They either count the zero crossings or use a simple correlator at the nominal frequency with shortened length to accommodate frequency error.

In one embodiment of the present invention, the system includes a quadrature correlator FM discriminator with magnitude normalization during the preamble period to acquire close frequency acquisition. The preamble period generally corresponds to the period of time before the start of a frame, which may be denoted by a preamble delimiter. FIGS. 9 and 11, illustrate a quadrature correlator FM discriminator 906 according to one embodiment, the output of which is proportional to the frequency error and can thus be used to generate a frequency error (freq_error) signal which goes into a frequency error loop.

As noted above, if the incoming signal is large, the frequency error appears large because it is proportional to the signal amplitude. But if the incoming signal is normalized by the amplitude of the signal, the frequency error does not appear large. Thus, referring again to FIG. 9, the magnitude normalization module 904 provides the scaling that ultimately is used along with the output of the quadrature correlator 906 to generate a proper frequency error signal. This design acts as a quadrature correlator FM discriminator with magnitude normalization. Moreover, because tags typically do not have a good clock, this approach allows reading of the signal no matter what state the subcarrier is in, and in spite of noise.

The frequency estimate that is obtained during the preamble period is used, e.g., in the correlator 402 (FIG. 5), to downconvert the subcarrier to a complex baseband (near zero) where the signal matched filtering is performed. Exact frequency acquisition is advantageously not required because the complex correlator can handle relatively small residual frequency error.

Referring to FIG. 5, the frequency error signal is used by the frequency error filter module 507 to generate an NCO input signal that adjusts the frequency of the NCO 511. The NCO 511 in one approach may be a module accumulator that counts up to a certain number and when it hits that module (number), it resets back to 0. In a preferred approach, rather than reset to 0, the NCO subtracts out the modules. Particularly, assume there is a certain target frequency, say 160 Khz (8 microseconds). If there is 1 megasample per second (1 sample per microsecond), the NCO counts 0 to 7, then back to 0. The result is a basic frequency that is determined by counting 8 clocks (1 megasample gets the NCO close to 160 KHz). The frequency error is used to adjust the frequency. For example, say the frequency error is 0. Then the loop operates on a nominal frequency determined by the NCO loop increment. If there is no error, then the loop will have exactly this frequency. However, if there is an error, the frequency of the loop is adjusted. For most applications, only 8 phases are needed to get sufficient accuracy for downconversion, especially where the illustrative embodiment shown in FIG. 4 is used. Thus, the NCO only needs to determine when it crosses 1/8, 2/8, 3/8, etc. and then it rolls back around to 0. Thus, referring to FIG. 7, the NCO may determine a phase and divide it into 8 equal increments. Referring again to FIG. 5, the output of the NCO goes into a sin/cosine lookup module 522, which may use a sin/cosine lookup table to derive values based on the NCO output. The 8 phases thus become multipliers for the derotators 508, 510. Each derotator 508, 510 does a full complex downconversion using the sin/cos values coming out of sin/cosine lookup module 522.

As the system gets closer to the correct frequency, the frequency error will approach 0.

The foregoing allows the system to demodulate signals that are very close to the noise floor by using a full length correlator baseband (near zero) frequency, where a Tbit is the length of data bit (e.g., if data rate is 4 Kbits/s, one Tbit is 250 microseconds long).

This also allows the demodulator to tune to a continuous range of BLF's. Using a fraction of the frequency reduces signal power, so by using the full symbol time, the maximum possible signal is utilized, resulting in about the highest signal to noise ratio possible. Moreover, if more than one symbol is integrated, error from next symbol is introduced, so one symbol length is preferred. The foregoing approach allows use of full Tbit length with minimal degradation due to residual frequency error.

To demonstrate, consider the following example. Prior to or during a read period, the DSP (which includes the demodulator) is turned on. The incoming and digitized sideband signals go into the derotator, e.g., derotator 402 of FIG. 4. Subcarrier detection with wideband filtering is initiated, e.g., using the subcarrier detector module 408 of FIG. 4. Outputs of the derotator go into a filter 403 and into a downsampler. The output of the filter 403 is received by a subcarrier detection module 408 and a frequency detector module 410. The subcarrier detection module 408 looks for energy in a wider band. Upon detecting the subcarrier signal, the frequency is modified as appropriate to minimize the frequency error.

As shown in FIG. 5, in one approach, the subcarrier detect signal output by the subcarrier detection module 408 is received by the subcarrier detect enable module 509. When the subcarrier detect signal is greater than a threshold, frequency acquisition is initiated using an acquisition enable signal (acq_en) for a deterministic length, e.g., the preamble period. For example, the frequency detector module 410 of FIG. 4 may be initiated. A frequency lock loop (frequency error loop) is turned on, and the filtered frequency error is used to drive the frequency error towards zero during an acquisition period, which may correspond to the preamble period. In other words, the frequency of the incoming signal is shifted to minimize the frequency error. In one approach, the frequency error slowly accumulates in the frequency lock loop during the preamble period. Preferably, average values are used to keep the error correction moving in the right direction, even in the presence of noise. The frequency of the signals is frozen at the end of the acquisition period, which in some approaches corresponds to the end of the preamble period.

Figure 29:
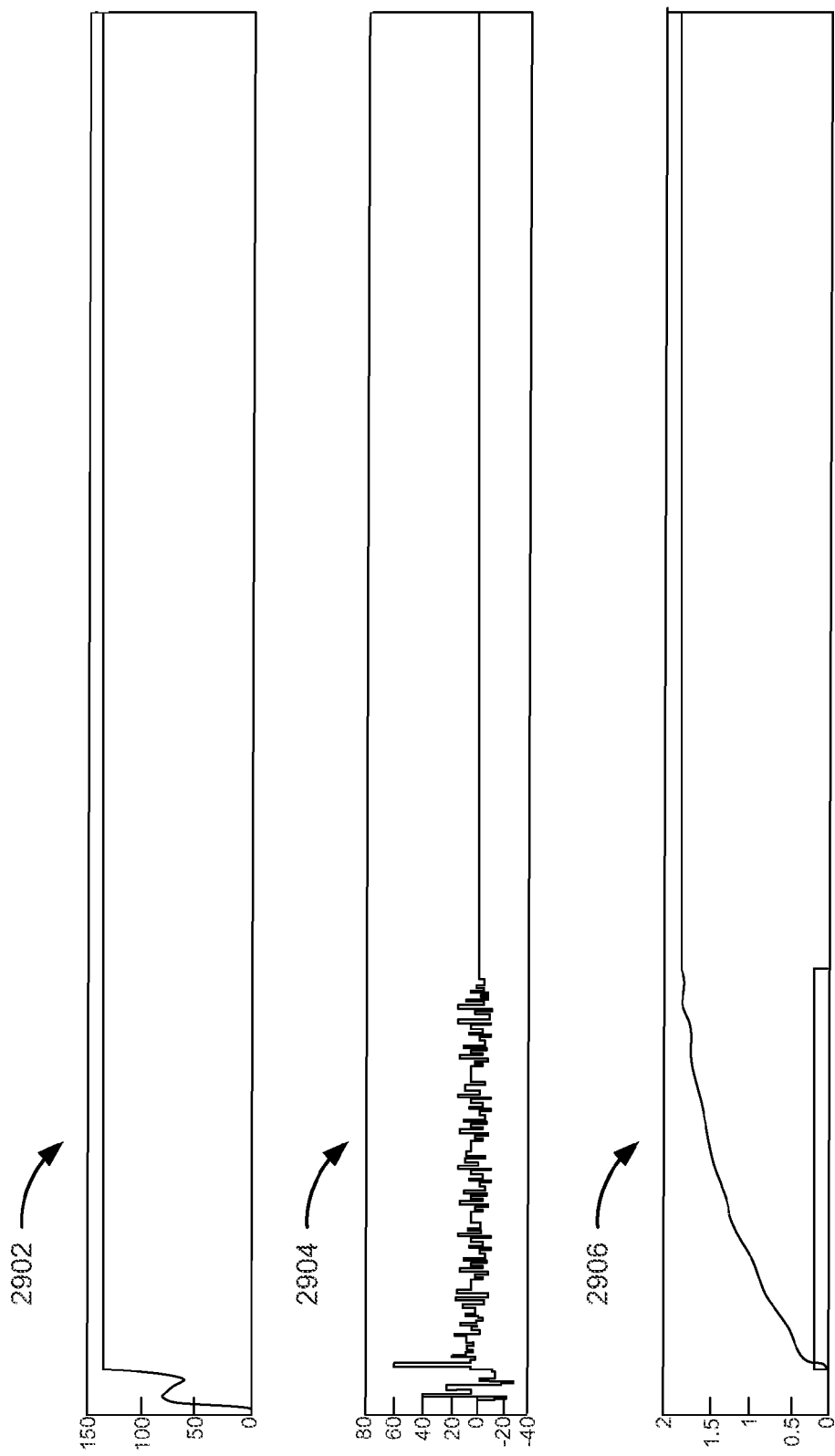
FIG. 29 is a series of charts showing signals according to one embodiment.

FIG. 29 is a series of charts showing signals according to one embodiment. The top chart 2902 depicts a subcarrier detect signal. Once it goes above a threshold (120 in the chart), it stops. The middle chart depicts the frequency error, which is used to drive the frequency acquisition. The tower chart shows the acquisition enable signal, which is a binary signal that goes high when the subcarrier detect signal exceeds the threshold, and stays high for a period of time just short of the preamble period to allow the frequency acquisition loop to pull in. The second line is the resulting frequency that the loop is trying to settle to. As shown, the second line settles out just before the acquisition enable signal goes low.

As noted above, a quadrature downconverter may be used to downconvert the incoming sideband signals (subcarrier signals) to baseband during recovery of the tag's modulation. Previously, devices picked the rail with the strongest signal, then looked for zero crossings on that signal to determine frequency cycles. A problem with this approach, however, is that if there was any Doppler in the incoming signal, a beat frequency develops when the two sidebands the selected rail are combined. In other words, a precess through the phase on the I and Q develops because the carrier used for the downconversion is no longer as sent out, i.e., the frequency changes due to the movement of the tag. The result is the decoding is less reliable. Diverging from the conventional approach, in one embodiment, the DSP receives the signals from both incoming rails and processes both signals, i.e., performs a complex downconversion on signals from both rails.

The corresponding frequency error may also be used to jam set the clock timing loop, as described below.

Data Clock Recover Loop Jam Set Using Subcarrier Frequency Estimate

Figure 30:
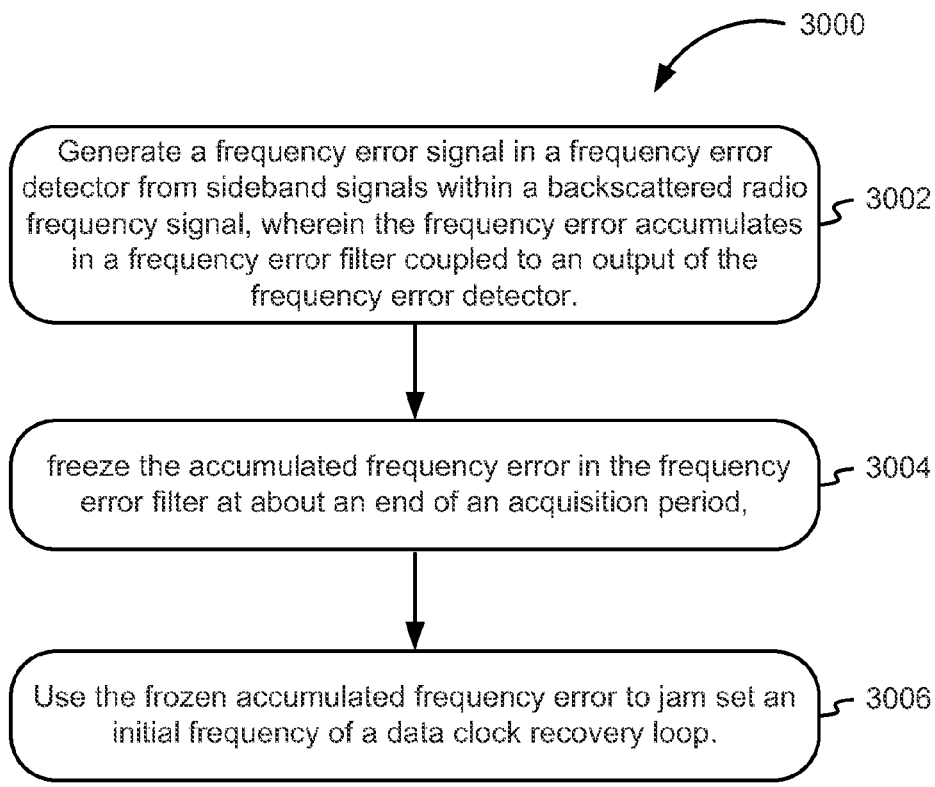
FIG. 30 depicts a process flow for a method for jam setting an initial frequency of a data clock recovery loop, according to one general embodiment.

FIG. 30 depicts a process flow for a method 3000 for jam setting an initial frequency of a data clock recovery loop, according to one general embodiment. Such methodology 3000 may be implemented in logic such as hardware, software, combinations thereof, etc. Moreover, the method 3000 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 30, a frequency error signal is generated in a frequency error detector from sideband signals within a backscattered radio frequency signal. The frequency error accumulates in a frequency error filter coupled to an output of the frequency error detector. See operation 3002. In one approach, the frequency error is detected at the baseband output of a complex multiplier in a subcarrier derotator. The subcarrier derotator may include the frequency error detector and/or the frequency error filter. Complex outputs of an RF to baseband downconverter may be digitized and input to the complex multiplier. For example, the frequency error signal may be generated using outputs of a quadrature correlator frequency modulation discriminator and a magnitude normalization module. As an option, the logic for generating the frequency error signal is initiated after the sideband signals are detected by a subcarrier detection module.

In operation 3004, at about an end of an acquisition period, the accumulated frequency error in the frequency error filter is frozen. The acquisition period may be during a preamble period of the backscattered radio frequency signal.

In operation 3006, the frozen accumulated frequency error is used to jam set an initial frequency of a data clock recovery loop. In one approach, the data clock recovery loop is jam set upon detection of a preamble delimiter in the backscattered radio frequency signal. In one embodiment, a scaled version of the frozen accumulated frequency error is used as an initial "jam set" value of an integral term of a data clock recovery loop filter.

A system according to one illustrative embodiment includes one or more of a multiplier coupled to signal inputs, the multiplier being for outputting baseband signals derived from received signals; a frequency error detector module coupled to baseband signal outputs of the multiplier, the frequency error detector being for generating a frequency error signal using the baseband signals from the multiplier, wherein an output for the frequency error signal is coupled to the multiplier thereby creating a frequency error loop; a data clock recovery loop coupled to the frequency error loop, the data clock recovery loop having logic for receiving a frequency offset signal corresponding to a subcarrier frequency offset; and a preamble delimiter detection module that outputs a preamble delimiter detect signal upon detecting a preamble delimiter in the received signals, wherein the data clock recovery loop is jam set upon output of the preamble delimiter detect signal. At least one antenna may be present for receiving the sideband signals. The system may further include logic for digitizing complex outputs of an RF to baseband downconverter, the digitized outputs being input to the multiplier.

The frequency detector module may include a quadrature correlator frequency modulation discriminator and a magnitude normalization module.

In one embodiment, the frequency offset is determined in the frequency error loop by shifting a frequency of the digital signals towards zero frequency error during the acquisition period using the frequency error signal.

In one approach, a scaled version of an accumulated frequency error is used as an initial "jam set" value of an integral term of a loop filter in the data clock recovery loop.

Referring again to the illustrative embodiment described above with respect to FIG. 4, the data clock recovery loop used in one embodiment tracks both phase and frequency errors. In C1G2 and C3 (and other) tags, both subcarrier frequencies and data clock frequencies are derived off of a single tuned circuit, so the frequency errors in the backscattered signal are proportional. This proportionality is true at any combination of BLF and data rate, which allows the demodulator of various embodiments of the present invention to tune to a continuous range of data rates.

In one illustrative embodiment, the input to the clock recovery module comes from the correlator module, where the correlator module outputs data pulses corresponding to the baseband. Again, if the baseband signal is sampled at the appropriate time, its character as a one or a zero can be determined. The clock recovery module provides the timing. Once the preamble delimiter is detected, though the clock loop has not been running, the preamble is a waveform shape such that the start timing of the first data bit can be derived therefrom and used to derive an error estimate that can in turn be used to jam set the clock. Once the clock loop is running, it can begin tracking the error in the clock timing.

If the clock recovery module were not jam-set, a few cycles would have to occur until enough information has been accumulated to provide a correct frequency offset. However, the knowledge of the approximate frequency of the particular tag being communicated with is leveraged to estimate that the clock is off in a proportional amount to the subcarrier offset.

In one embodiment of the present invention, the data clock recovery loop is a full second order loop that tracks both phase and frequency to obtain a more accurate clock recovery. See, e.g., the data clock recovery loop in the clock recovery module 420 of FIG. 21. The phase may be set using the delimiter timing, and the frequency can be set because the system has already done a frequency acquisition of the subcarrier, e.g., in module 410 of FIG. 4.

In some approaches, the clock recovery module 420 uses a scaled version of the frequency error estimate from the subcarrier frequency acquisition section as the initial data clock frequency error. In other words, the frequency error derived from the frequency detector may be used to jam set the data clock recovery loop. Because the system has determined the frequency error, the data clock recovery loop can be initiated with the same knowledge because the correct frequency information may have been determined even before the clock timing has started. By using a good estimate of the correct offset to start with, the system is more quickly able to track each bit in the incoming signal.

Referring again to FIG. 4, in one embodiment, the preamble delimiter detect signal output from the preamble delimiter detection module 418 is received by a clock recovery module 420. As mentioned above, when processing the incoming signal, after the preamble period, the system detects a delimiter, e.g., 1-0-1-1-1, which denotes the start of a frame. Preferably, the clock recovery module 420 does not turn on until the delimiter detect module 418 outputs a detection signal. When the delimiter detect signal is output, the clock is jam set. Then, an integrator may be used to generate the clock sync signal. The data clock frequency is determined and divided to get the data rate.

Thus, the frequency error signal can be used to shift both the data clock as well as the subcarrier frequency.

Variable Length Correlator

Figure 31:
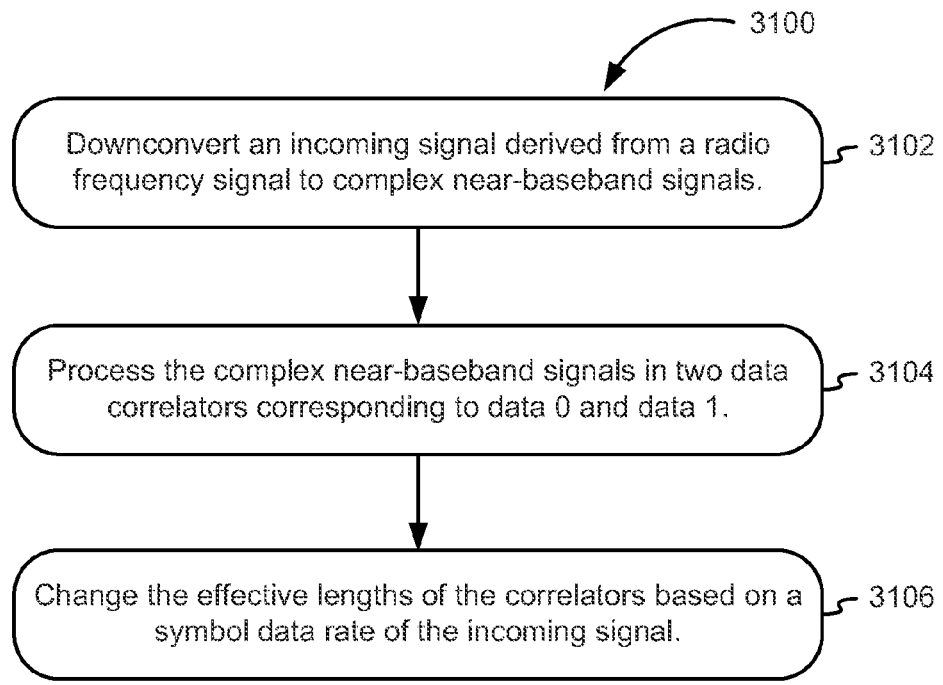
FIG. 31 depicts a process flow for a method for processing a signal derived from a radio frequency signal at some rate in a range of allowable data rates, according to one general embodiment.

FIG. 31 depicts a process flow for a method 3100 for processing a signal derived from a radio frequency signal at some rate in a range of allowable data rates, according to one general embodiment. Such methodology 3100 may be implemented in logic such as hardware, software, combinations thereof, etc. Moreover, the method 3100 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 31, an incoming signal derived from a radio frequency signal is downconverted to complex near-baseband signals. See operation 3102.

In operation 3104, the complex near-baseband signals are processed in two data correlators, one correlator corresponding to data 0 and the other corresponding to a data 1. In a preferred embodiment, each correlator is a Tbit windowed integrator, wherein Tbit is a duration of a data symbol and is variable over a predetermined range, and where a residual subcarrier frequency on the near-baseband signal input to the correlator is small relative to the data rate, e.g., less than about 10% of the data rate.

In another embodiment, each correlator includes a series of windowed integrators that are configurable for different lengths. In one approach outputs of the windowed integrators of each correlator may be added in one path and subtracted in another path and processed by complex-to-magnitude modules to generate the data signals, where the data signals are kept separate until after outputs of the complex-to-magnitude modules. In another approach, each of the windowed integrators of each correlator is a half symbol integrator correlator, where correlator variable delay modules provide a delay into two of the windowed integrators, wherein no delay is introduced into another two of the windowed integrators.

In operation 3106, the effective lengths of the correlators are changed based on a symbol data rate of the incoming signal.

In one embodiment, the correlator outputs are combined to create a combined correlator magnitude signal, and the combined correlator magnitude signal is used to determine an end of a signal modulation.

Referring again to the illustrative embodiment described above with respect to FIG. 4, signal matched filtering in some embodiments may be accomplished by first downconverting to complex baseband (near zero), then using a Tbit windowed integrator for the data correlator. This allows simple tuning for different data rates, i.e., data bit lengths in time, by changing the length of the correlator to the appropriate number of samples based on the data rate of the baseband signal.

In particularly preferred embodiments, the correlator acts as a square windowed integrator in which if the number of samples being integrated change, the data time also changes, thereby allowing the system to tune to different data lengths.

Particularly, after the system acquires a certain number of samples per symbol, no more are needed. But as data rate gets lower, the sample rate stays the same, but bit data times get longer. Thus, the system can ignore several of the samples, using only those it needs, e.g., ignores 4 out of 8 samples, ignores 7 out of 8 samples, etc.

As shown in FIG. 4, output signals from the derotator 402, in addition to going to the frequency detector module 410 and subcarrier detector module 408, also goes to the correlator module 414. Referring to FIG. 14, the correlator module 414 includes a series of correlator blocks 1402 for positive baseband signals and another series for negative baseband signals. In the embodiment shown, the correlator blocks 1402 are windowed integrators As noted above, the windowed integrators may each be configurable for different lengths thereby allowing the system to handle a large variety of data lengths.

Half Bit Correlator Combining for Data Demodulation

Figure 32:
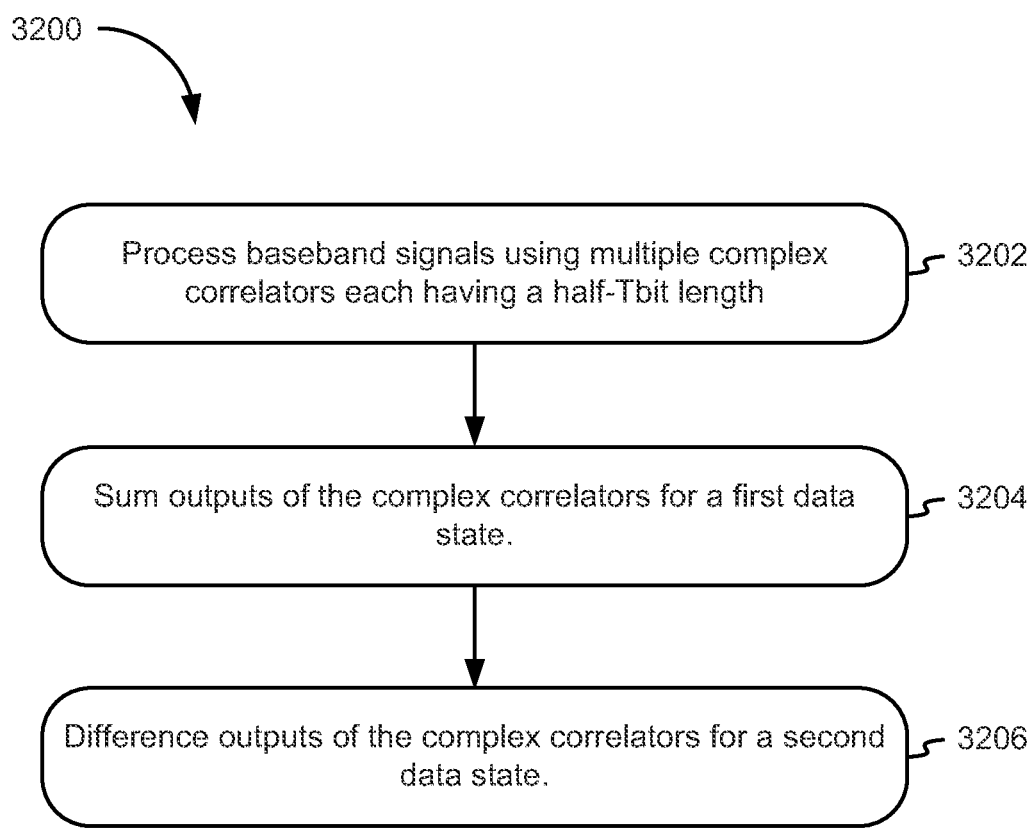
FIG. 32 depicts a process flow for a method for demodulating a data signal, according to one general embodiment.

FIG. 32 depicts a process flow for a method 3200 for demodulating a data signal, according to one general embodiment. Such methodology 3200 may be implemented logic such as hardware, software, combinations thereof etc. Moreover, the method 3200 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 32, baseband signals are processed using multiple complex correlators each having a half-Tbit length. See operation 3202. In one approach, each of the complex correlators includes a delayed integrator and a nondelayed integrator. In another approach, each of the complex correlators includes a series of windowed integrators that are configurable for different lengths. The baseband signals may be derived from a Miller modulated signal or an FM0 modulated signal in some approaches.

In operation 3204, outputs of the complex correlators are summed for a first data state. In one approach, the summed outputs are kept separate until after outputs of complex-to-magnitude modules In operation 3206, outputs of the complex correlators are differenced for a second data state.

The method may further include generating a correlator magnitude signal, and using the correlator magnitude signal to determine an end of a signal modulation. In another variation, the method may further include generating a correlator magnitude signal, and using the correlator magnitude signal to adjust an automatic gain control setting. In yet another embodiment, the method may include generating a correlator magnitude signal, and using the correlator magnitude signal to derive a received signal strength indicator (RSSI) estimate.

Referring again to the illustrative embodiment described above with respect to FIG. 4, two half Tbit correlators may be used to provide both data 0 and data 1 correlators with half the logic and using sum and difference combining at the output of the half Tbit correlators.

Figure 33:
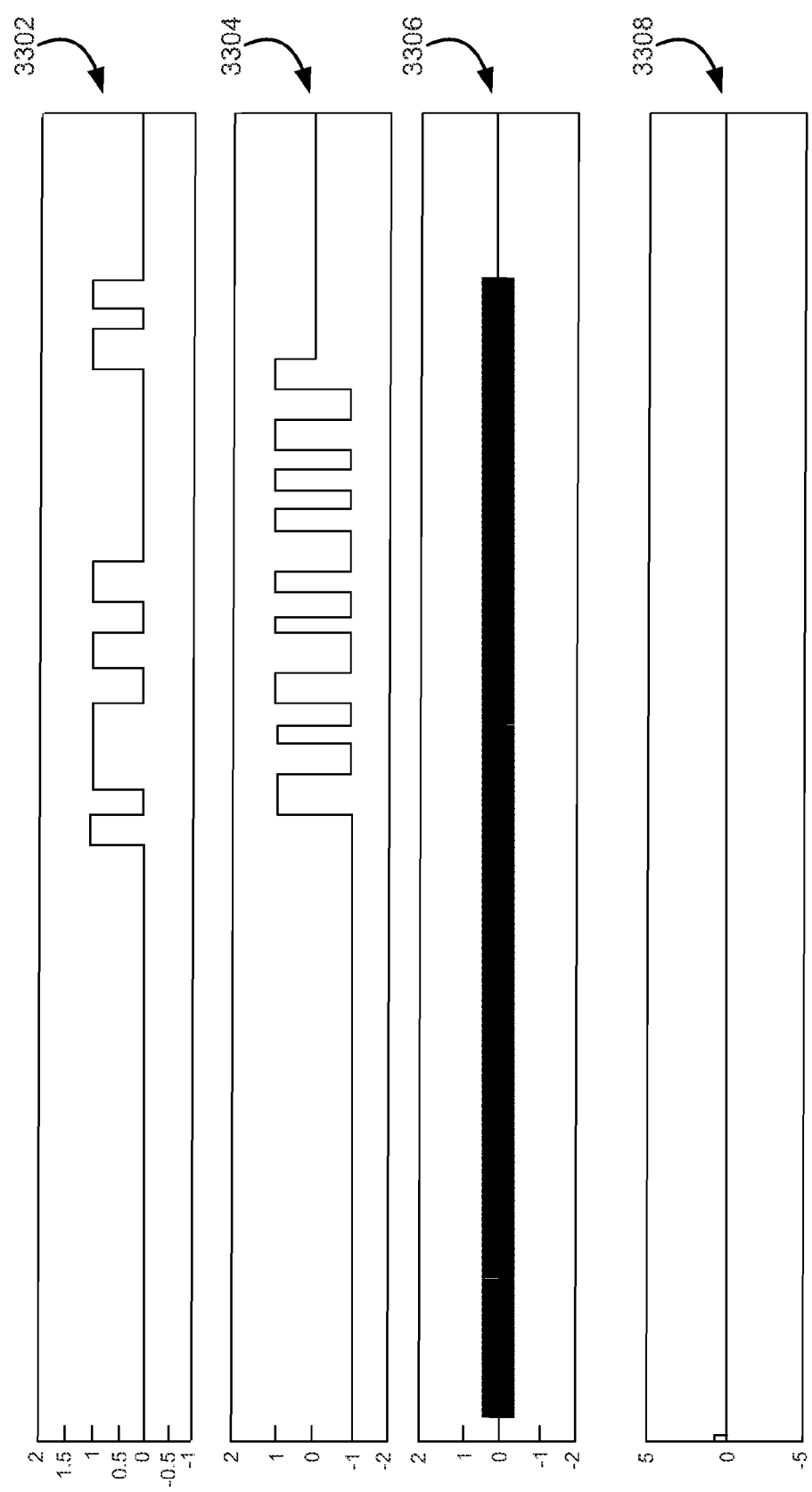
FIG. 33 is a series of charts showing signals according to one embodiment.

The underlying encoding for Miller modulated signals is a data zero which does not have a mid-symbol transition and a data one which has a mid-symbol transition. FIG. 33 illustrates exemplary data 3302 received from the tag, and the Miller basis modulation 3304 for the data 3302. The Miller basis modulation from the tag is based on the subcarrier with modulation on it, where the modulation is generated by output from a Miller generator combined with a BLF frequency generator output. Also shown in FIG. 33 is an exemplary carrier wave signal 3306 and an exemplary reset signal 3308. The preamble period of the carrier wave generally runs between the time the reset signal goes low and the start of the Miller encoded signal, which may include a preamble delimiter.

To perform the highest performance correlation for both data possibilities with the least computation, two complex correlators with half-Tbit lengths may be used. The outputs of each are combined with a sum for a data state corresponding to zero and a difference for a data state corresponding to one (or vice versa, e.g., for FM0 encoding). This allows the system to do both correlations with a single Tbit length correlator and a complex add and subtract. In other words, the correlation for both a data 0 and 1 can be performed using one set of correlators, as opposed to using different sets of correlators for each state.

For example, assume the correlator 414 of FIG. 14 is being used. In the windowed integrator 1402, a sample is received, but also delay by a number of samples (e.g., 6, 8, 10, 12, 16, etc.). See FIG. 16. The signal is integrated, e.g., added. The signal stays in the windowed integrator for e.g. 6 (or 8 or 10 or 12 or 16) samples. Then after the 6th time it is subtracted out or flushed from the windowed integrator. For example, assume a 1 followed by five 0's comes in. The value will be 1 until the 7th cycle, where it becomes a −1. In another example, assume all 1's coming in. The value will be 6. In the 7th cycle, assume another 1 comes in, and a −1 is applied, so the value stays at 6. The result is the same as if a 6 bit register were used, but with not near as much complexity as those approaches using a shift register, though these may be used in some approaches.

Figure 34:
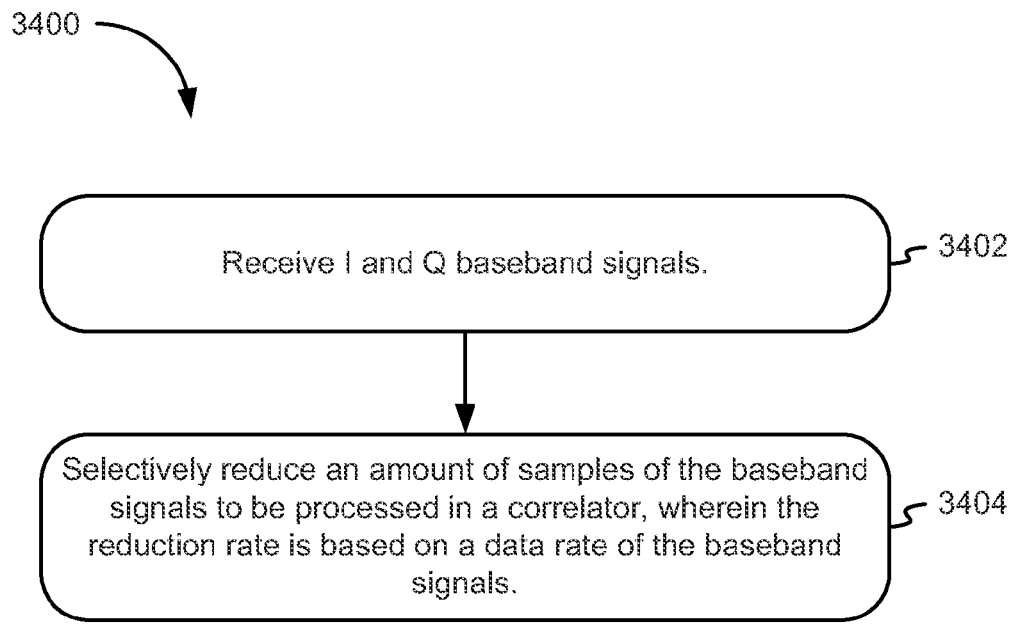
FIG. 34 depicts a process flow for a method for processing baseband signals by reducing the number of samples required to be processed, according to one general embodiment.

Automatic Gain Control and/or Baseband Preintegrator to Reduce Computation Requirements at Lower Data Rates FIG. 34 depicts a process flow for a method 3400 for processing baseband signals, according to one general embodiment. Such methodology 3400 may be implemented in logic such as hardware, software, combinations thereof, etc. Moreover, the method 3400 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 34, I and Q baseband signals are received in operation 3402.

In operation 3404, an amount of samples of the baseband signals to be processed in a correlator is selectively reduced, where the reduction rate is based on a data rate of the baseband signals (e.g., 2 to 1, 4 to 1, 8 to 1, etc.). For example, the amount of samples may not be reduced until a data rate of the baseband signals falls below a threshold. The amount of output samples may be reduced using any type of scheme. In one approach, the amount of output samples is reduced by preintegrating input samples by adding a selectable number of the input samples together.

In an optional operation, an automatic gain control may be performed prior to reducing the amount of samples to reduce a number of bits processed in the reducing step.

A preintegrator module according to one embodiment includes an automatic gain control section for performing automatic gain control on I and Q baseband signals. A first preintegrator is coupled to an output of the automatic gain control section, the first preintegrator being for selectively reducing an amount of samples in the I baseband signal based on a data rate of the baseband signal. A second preintegrator is also coupled to an output of the automatic gain control section, the second preintegrator being for selectively reducing an amount of samples in the Q baseband signal based on a data rate of the Q baseband signal.

The demodulator in some embodiments uses a variable preintegrator to reduce an amount of samples when the data rate drops below a threshold rate. At the highest data rates, there is minimal oversampling. As the data rates drop, the amount of oversampling increases, which improves clock recovery and demodulation. However, above a certain threshold of oversampling which corresponds to lower data rates, there is no improvement to performance; rather the correlator delays get longer which would require more area and more computation. Thus, an amount of samples in the baseband signals may be selectively reduced based on the data rate of the baseband signals. Using a preintegrator prior to the correlator to limit the amount of oversampling and delay lengths constrains processing resources required while still allowing the demodulation of a wide range of data rates.

Referring again to the illustrative embodiment described above with respect to FIG. 4, as noted previously, after a certain number of samples are received, it generally does not help to process more samples, and moreover could require a larger number of registers or the like in the design. Thus, when a certain number of samples is reached, the system may preintegrate by 2, 4, 8, 16, etc. samples. The preintegrator module 412 shown in FIG. 12 adds a selectable number of samples together. This acts a filtering mechanism. The preintegrator module 412 also does a scaling to get back to a regular value. The preintegrator allows the system to handle a wide variety of data rates, e.g., 1.25 Kbits/s to 160 Kbits/s.

In one approach, the amount of samples is not reduced until a data rate of the baseband signals falls below a threshold.

Single or Dual Complex Subcarrier Downconversion and Data Detection

Figure 35:
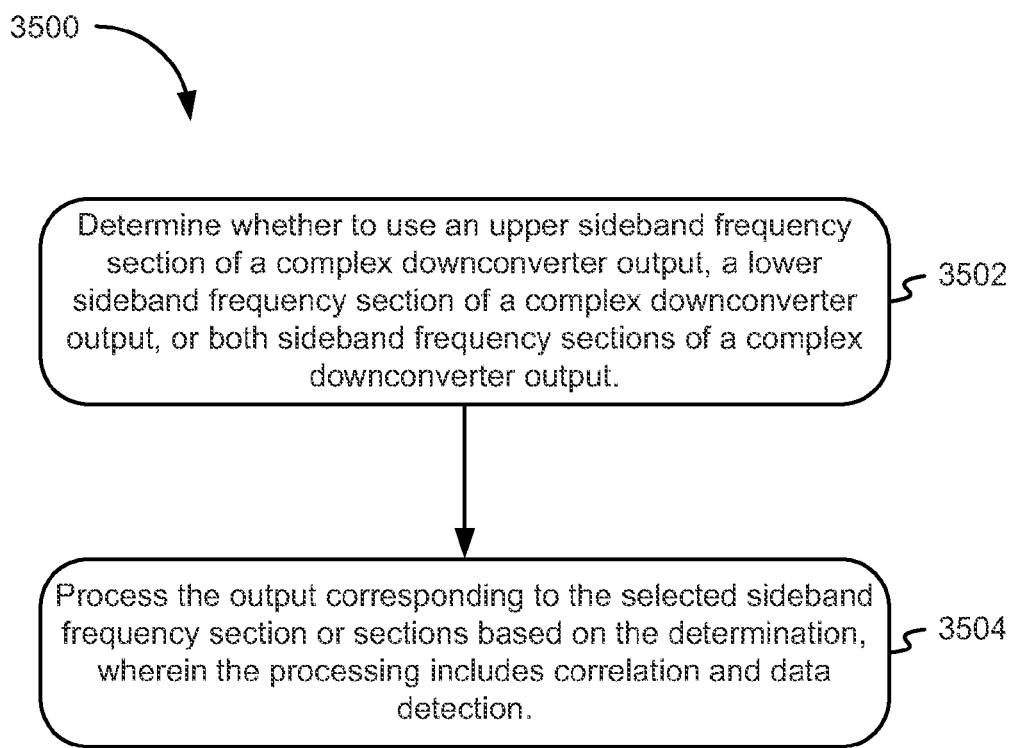
FIG. 35 depicts a process flow for a method for subcarrier downconversion and data detection, according to one general embodiment.

FIG. 35 depicts a process flow for a method 3500 for subcarrier downconversion and data detection, according to one general embodiment. Such methodology 3500 may be implemented in logic such as hardware, software, combinations thereof, etc. Moreover, the method 3500 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 35, a determination is made as to whether to use an upper sideband frequency section of a complex downconverter output, a lower sideband frequency section of the complex downconverter output, or both sideband frequency sections of the complex downconverter output. See operation 3502. In one approach, the determination to use the output of the upper sideband section or the lower sideband section is made to avoid interference. In another approach, a determination to use the outputs of both the upper sideband section and the lower sideband section is made to improve the sensitivity, e.g., to allow recovery of lower signal strengths than could be recovered using only one of the outputs.

In operation 3504, the output corresponding to the selected sideband frequency section or sections is processed based on the determination, where the processing includes correlation and data detection.

In one embodiment, the determination may be to use outputs of both sideband sections, where each sideband section includes a correlator, and where the outputs of the correlators are combined after magnitude detection and before data slicing. In one approach, each correlator includes a series of windowed integrators that are configurable for different lengths. Further, each of the windowed integrators may be a half symbol integrator correlator. As an option, correlator variable delay modules may provide a delay into one, two or more of the windowed integrators, while no delay is introduced into another one, two, or more of the windowed integrators.

Referring again to the illustrative embodiment described above with respect to FIG. 4, the complex subcarrier downconverter in some embodiments can be selected to use either the upper or lower subcarrier sideband to avoid interference, or it can use and coherently combine both sidebands while avoiding any zero beat distortion caused by Doppler frequency shifts from moving tags. Combining both sidebands in a coherent manner after the correlator improves demodulation performance by, e.g., up to 3 dB, while avoiding the zero beat problem.

In another embodiment, two derotators may be provided, e.g., one that derotates the positive subcarrier signal down and another that derotates the negative subcarrier signal up. The correlator module 414 of FIGS. 4 and 14 has two complete paths, one for each of the positive and negative subcarrier baseband signals from the derotator modules, which may have been scaled in the preintegrator module prior to reaching the correlator module. The outputs of the paths are combined after the complex to magnitude conversion. This dual path arrangement adds about 2-3 dB of sensitivity. The circuitry after the outputs of the correlator module may be as otherwise described herein, and need not be duplicated.

Variable Rate Preamble Delimiter Detection Using Ratiometric Methods

FIG. 36 depicts a process flow for a method 3600 for detecting a pattern in a signal, according to one general embodiment. Such methodology 3600 may be implemented in logic such as hardware, software, combinations thereof, etc. Moreover, the method 3600 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 36, a time between symbol transitions in a signal derived from a radio frequency signal is determined. See operation 3602. As an option, a sign of each ratio may be determined based on a direction of the transition.

In operation 3604, ratios of relational times between consecutive symbol transitions are determined.

In operation 3606, a sequence of the ratios is compared to a target pattern for determining whether the sequence corresponds to the target pattern. In one approach, the target pattern corresponds to a preamble delimiter in a signal derived from a radio frequency signal.

The comparing the sequence of the ratios to the target pattern in one embodiment includes assigning a value to each ratio based on the ratio fatting within a range corresponding to the value, and comparing a resulting sequence of values to the target pattern. In one approach, each ratio corresponds to more than one value. The target pattern may include a plurality of allowable values for each position in the sequence.

In one embodiment, the method 3600 is performed without input from a clock recovery section. In another embodiment, a detect signal is output upon determining that the sequence corresponds to the target pattern. The detect signal may be used, for example, to indicate a time to jam set a clock section.

The method 3600 may be implemented in any type of system, such as a radio frequency identification reader and/or an RFID tag.

The preamble delimiter pattern is preferably detected prior to data clock recovery to establish the framing of the signal data bits and of the entire packet of data. Where preamble delimiter detection is done prior to data clock recovery, the delimiter detector is preferably capable of detecting the pattern with large frequency errors without the aid of the clock recovery loop. This is accomplished in one embodiment by using a ratiometric method which determines the time between each underlying symbol transition (e.g., zero crossing), determines the ratios of relational (e.g., consecutive) times between symbol transitions, and matches the sequence of ratios to a target pattern.

At the beginning of a transaction, the system does not know much about the incoming signal: the clock is not yet running; the system does not know where the start of frame is, where the edge of each symbol is; etc. Moreover, the tag can have a high 4%) frequency error. In addition, a preferred embodiment of the system can handle two orders of magnitude of data rates. All of this would be expected to make it very difficult to detect the particular pattern that occurs at or in the preamble delimiter.

Referring again to the illustrative embodiment described above with respect to FIG. 4, to overcome these obstacles, the system according to some embodiments looks at ratios. In one approach, the system takes timing measurements, generates ratios of adjacent timings, and looks for a particular pattern of ratios. To illustrate assume that the output of the correlator 414 of FIG. 4 goes into a slicer and filter 416, and the filtered data looks like the pattern 3701 shown in FIG. 37. Timing measurements are made between transitions, and ratios of the timing measurements are created. As shown in this example, the time measurements between transitions for the sample 3701 shown in FIG. 37 are 1, 1.5, 1, 2, 1, and 1.5. The ratios of adjacent measurements in are +1.5/1, −1/1.5, +2/1, −1/2, and +1.5/1, which correlate to +1.5, −2/3, +2, −1/2, and +1.5, and where the optional +/− is dependent upon the transition direction. If this pattern of ratios matches the preamble delimiter pattern, the preamble delimiter detection module outputs a signal indicating that the preamble delimiter has been detected.

Because of noise, the system may not get an exact pattern of ratios, even though it should have. Therefore, it may be preferable to create ranges into which the ratios may be expected to fall. Then a value may be assigned to each ratio based on the ratio falling within a range corresponding to the value. For example, a table 3802 of values may be used, as in FIG. 38. If a ratio falls into one of the ranges, the value (e.g., B, C, etc.) associated with that range is assigned to the ratio. Then, the sequence, e.g., of ABCs is compared to the target preamble delimiter pattern to determine if they correspond to each other, e.g., the sequence of ABCs matches the target pattern. In the example of FIG. 37, the pattern from the incoming signal is +B−D+A−E+B. Assuming this sequence is the delimiter pattern, the preamble delimiter detector module outputs a signal denoting that the preamble delimiter pattern has been found.

The system may also use a fuzzy logic approach in the pattern matching to improve the probability of detection, especially in low signal to noise ratio (SNR) conditions. In such approach, a given ratio may correspond to more than one value, and so any of the potential values that match the appropriate position in the delimiter pattern would be used to determine a match.

Figure 39:
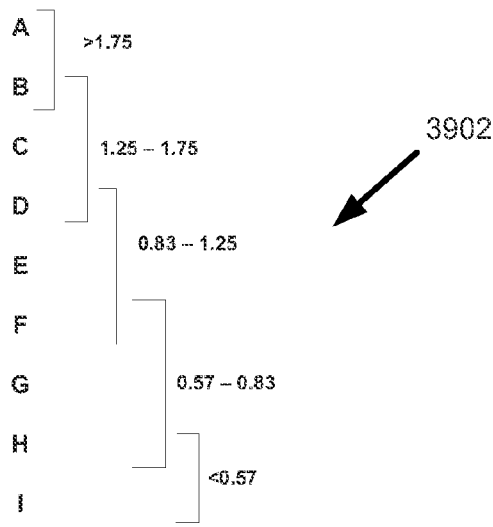
FIG. 39 is a graphical depiction of an illustrative relational table usable in a fuzzy logic approach according to one embodiment.

In one illustrative embodiment using fuzzy logic, assume the relational table 3902 is as shown in FIG. 39. For example the ratio 1.5 from the example of FIG. 37 can be B, C or D. Assuming the first value of the delimiter pattern is D, then the first value would be considered a match.

The fuzzy boundaries allow for noise in the signal. Moreover, where the +/− signs are determined and used, the signs may be definitive.

This fuzzy logic ratiometric approach may enable delimiter detection at all rates without needing any configuration parameters to handle the various rates.

FIG. 18 shows a preamble niter detection circuit that can be used in one embodiment.

Note that the variable rate preamble delimiter detection using ratiometric methods may be implemented in an RFID tag, as well as in a reader. Similar logic and/or circuitry may be used in the tag.

Moreover, the foregoing logic and/or methodology may be used to detect any kind of pattern (e.g., delimiter), even in the presence of large frequency errors and without input from the dock recovery section, e.g., clock recovery loop.

End of Modulation Detection

The end of signal modulation is ideally detected in various situations, such as where a read command does not specify the amount of words to read but instead commands the tag to backscatter all the memory contents from a pointer to the end of the memory bank. The reader does not know when the message is complete and so continues to accept bits until told that the message is done. By determining when modulation ends, the system knows it can go on to other operations (e.g., communicating with another tag). No a priori knowledge of the number of bits a tag will send is needed.

The end of signal detector according to one embodiment uses a ratio of fast vs. stow averages of the signal magnitude. This is independent of data rate and BLF and works down to very low SNRs. In operation, the fast average goes up and down fluster than the slow average. Based on the moving relationship of the fast and stow averages, the system can discern the end of modulation.

Figure 40:
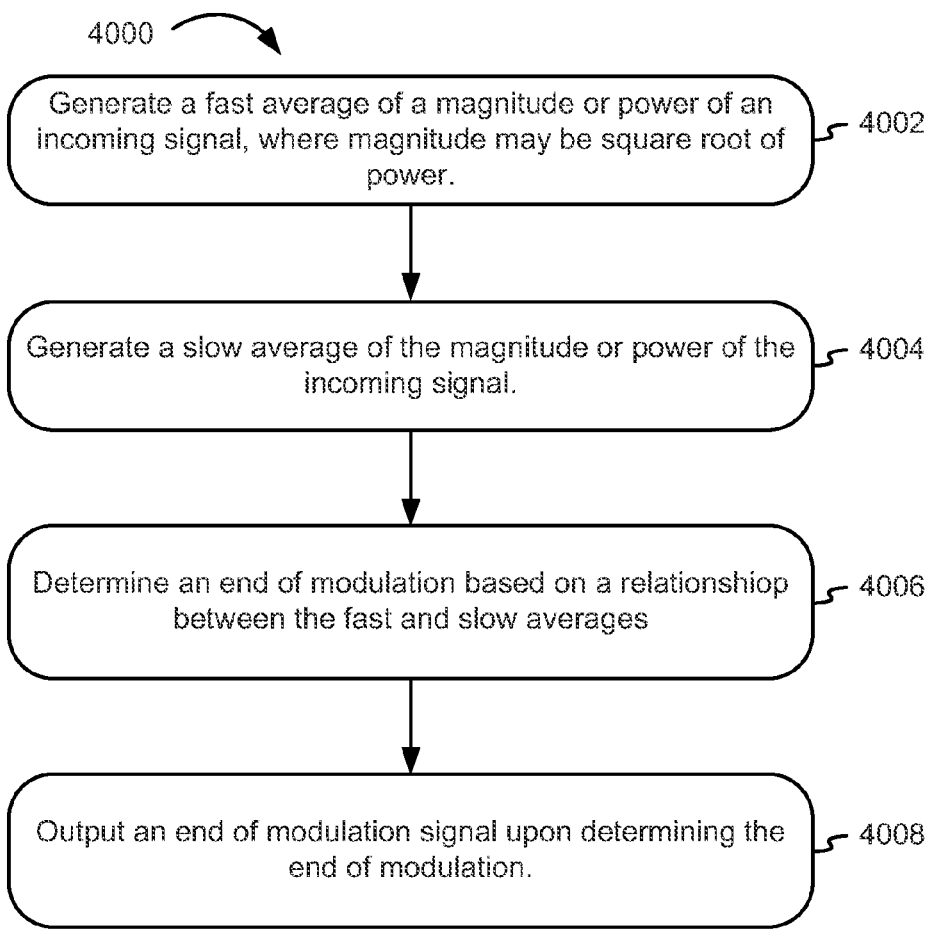
FIG. 40 depicts a process flow for a method for detecting an end of modulation in a backscattered radio frequency signal, according to one general embodiment.

FIG. 40 depicts a process flow for a method 4000 for detecting an end of modulation in a backscattered radio frequency signal, according to one general embodiment. Such methodology 4000 may be implemented in logic such as hardware, software, combinations thereof etc. Moreover, the method 4000 may be performed in conjunction with any of the illustrative systems and/or components noted herein, with other types of systems and/or logic as would be known and understood by one skilled in the art upon reading the present disclosure, and combinations thereof. By way of example and not imitation, an illustrative hardware and/or software configuration for performing the method is presented below.

With continued reference to FIG. 40, a fast average of a magnitude or power of an incoming signal is generated in operation 4002. In one approach, the incoming signal is a correlator magnitude signal output by a correlator module. Magnitude may be some value derived from the signal power, such as a square root of the power, etc. A window integrator is used to generate the fast average in one approach.

In operation 4004, a slow average of the magnitude or power of the incoming signal is generated. A leaky integrator is used to generate the slow average in one approach.

In operation 4006, an end of modulation is determined based on a relationship between the fast and slow averages. In one approach, the fast and slow averages are moving averages, and the end of modulation is determined upon the fast moving average crossing below the slow moving average.

In operation 4008, an end of modulation signal is output upon determining the end of modulation.

FIG. 23 shows an end of modulation detection circuit 422 that may be used in one embodiment. As shown, a correlator magnitude signal is received from the correlator module 414 (FIG. 4). The correlator magnitude signal generally represents the magnitude of the incoming data, and tends to settle to a fairly consistent level across the signal.

Two different filters are applied to the correlator magnitude signal: one responding faster than the other. Preferably, the signals are fast and slow averages of the correlator magnitude signal. Because the fast moving average goes up faster, upon the start of modulation, it will move up faster and remain higher than the slow average during the modulation period. When the modulation stops, the fast moving average will come down more quickly than the slow moving average. When the fast moving average crosses the slow moving average, the end of modulation signal goes high (or low), indicating the end of modulation. In the end of modulation detection circuit 422, the fast averager 2302 may be a 3-point window integrator and the slow averager 2304 may be a leaky integrator.

Receive Signal Strength Indicator (RSSI) Estimate on Variable Length Correlator Output Information on the strength of the signal returning from the tag has many uses including indication of distance and debugging. The RSSI uses the output of the variable length correlator to obtain the best sensitivity for measuring the signal level at all data rates.

Figure 41:
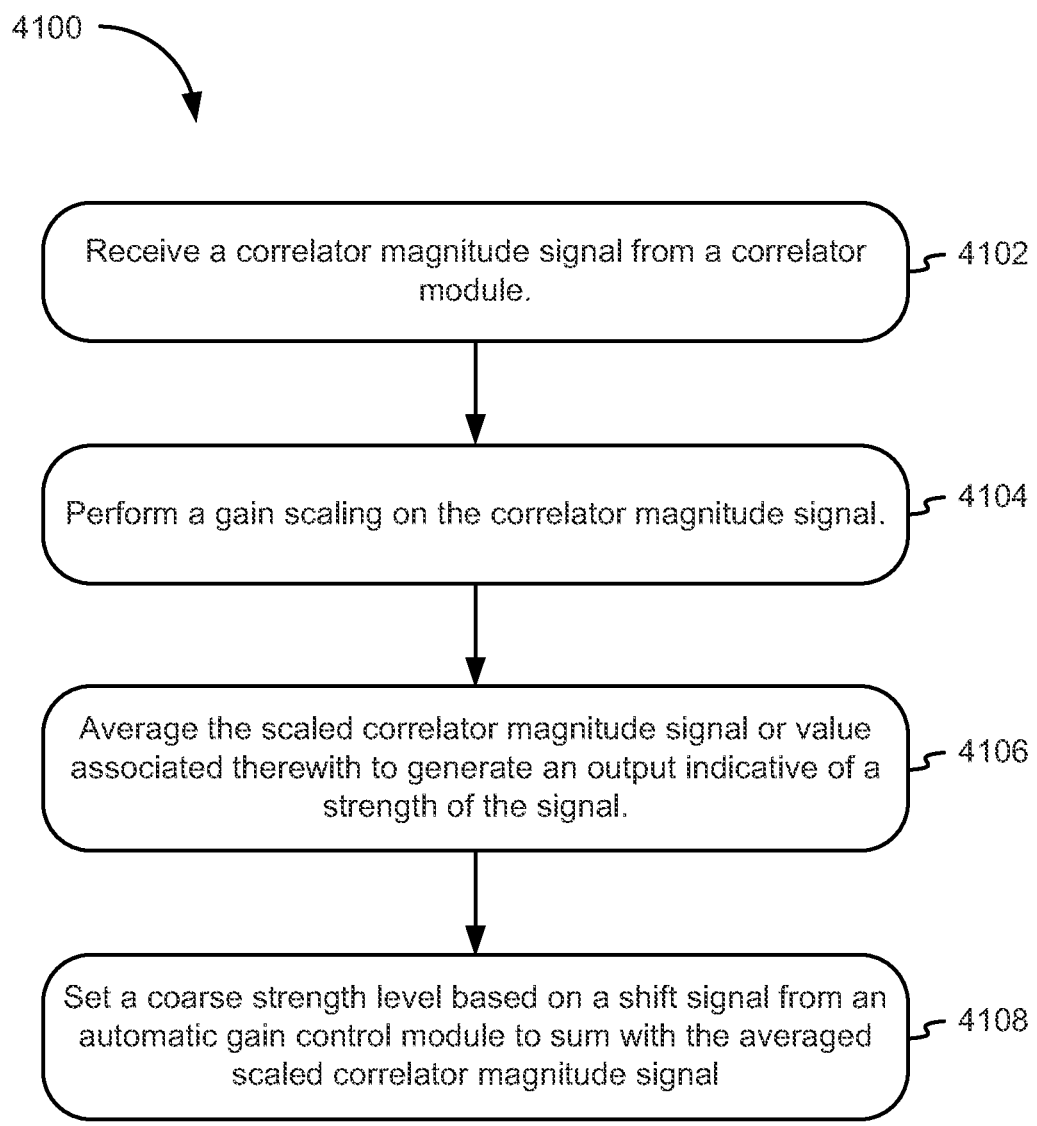
FIG. 41 depicts a process flow for a method for estimating a strength of a radio frequency signal, according to one general embodiment.

FIG. 41 depicts a process flow for a method 4100 for estimating a strength of a radio frequency signal, according to one general embodiment. Such methodology 4100 may be implemented in logic such as hardware, software, combinations thereof etc. Moreover, the method 4100 may be performed in conjunction with any of the illustrative systems and/or components noted herein, with other types of systems and/or logic as would be known and understood by one skilled in the art upon reading the present disclosure, and combinations thereof. By way of example and not limitation, an illustrative hardware and/or software configuration for performing the method is presented below.

With continued reference to FIG. 41, a correlator magnitude signal is received from a correlator module in operation 4102. In one approach, the correlator module has a variable effective length which is changeable based on a data rate of the signal. The variable effective length may affect an offset used to generate the output indicative of a strength of the signal.

The correlator may receive output from a preintegrator, where the preintegrator has a variable effective length which is changeable based on a data rate of the signal. The variable effective length may affect an offset used to generate the output indicative of a strength of the signal.

In operation 4104, a gain scaling is performed on the correlator magnitude signal.

In operation 4106, the scaled correlator magnitude signal or value associated therewith is averaged to generate an output indicative of a strength of the signal.

In optional operation 4108, a coarse strength level may be set based on a shift signal from an automatic gain control module to sum with the averaged scaled correlator magnitude signal.

In one mode of use, the output indicative of a strength of the signal may be used to estimate a distance between an antenna and a tag, e.g., by comparing the output to a table or scale correlating strength to distance, performing a calculation using the output, etc.

In another mode of use, the output indicative of a strength of the signal may be used to estimate a density of an object between an antenna and a tag, e.g., by comparing the output to a table or scale correlating the strength to density, performing a calculation using the output, etc.

Referring again to the illustrative embodiment described above with respect to FIG. 4, as noted above, an AGC attempts to determine a coarse gain setting in one embodiment. On top of that, the system may perform a fine RSSI estimate which is based on a loop. The RSSI module 426 (FIGS. 4 and 27) receives the correlator magnitude signal, and does a gain scaling on it in a gain scaling section 2702, depending on what the level of the signal is. The goal is to minimize it to a fairly narrow range. The signal then goes into a lookup table 2704, which may be a log function (e.g. 10, 20, etc. log function). This limits the number of lookup elements needed. The signal then goes into a loop 2706 which integrates and averages the RSSI, producing a very fine estimate of the RSSI because of the tong filtering (averaging) performed on it.

FIG. 15 shows an illustrative output of the RSSI module 424 in the bottom chart 1508. As shown, the RSSI signal comes to a close estimate with the coarse set, then tracks to get a good estimate of RSSI.

The RSSI output can be used for a variety of purposes. For example, it is indicative of how strong the signal coming in is, which can in turn be used to determine how difficult it wilt be to get the signal. If tag is far away but has line of sight to the system, the RSSI output can be used to determine how far away the tag is. If the tag is behind something so the RF signal has to travel through the object, the RSSI output can be used to determine how dense the object is, (The amount of absorption of signal through the object in and back out affects the signal strength.)

By basing the RSSI output off of the correlator magnitude signal, the system obtains the full benefit of the filtering all the way down to the data rate. Thus, if the system is using the narrowest data rate, e.g., 1.25 kHz, filtering is obtained down to that point. Thus, the RSSI module 426 is able to produce an accurate receive signal strength indication all the way down to sensitivity at the lowest data rates.

In an alternate method, the system performs RSSI on the input signal. However, because there is no filtering on it, it is difficult to determine signal strength below a certain level. Moreover, the first method is about 20 dB more sensitive.

Dynamic Signal Detection Threshold

The receive noise level at the A/D inputs vary significantly with a number of factors: antenna return loss, hop channel center frequency (some frequencies have higher noise levels than others), carrier cancellation effectiveness, interference, etc. Additional factors may include the transmit power, the amount of reflection from the antenna generally corresponding to its reflection coefficient, the amount of reflection from objects in front of the antenna that reflect signal back. Such noise appears in the subcarrier band from which the signal is expected. This makes effective signal detection in the subcarrier detector module 408 (FIG. 4) very difficult, as it is looking for energy in a certain bandwidth about the subcarrier. Energy outside this bandwidth can be filtered to some extent, making it less likely to obtain a false detection. However, within this bandwidth, which includes the backscatter frequency, the subcarrier detector module looks for some energy. The detection threshold has to be above the noise floor. However, the problem is that the noise floor varies with a number of factors, including those above.

The best signal detection threshold is one just above the noise floor. Because the noise level changes from hop to hop and with interference, the threshold in one embodiment is adjusted dynamically to get the best possible sensitivity at any given time. To enable this, the system obtains a measure of the noise floor and sets the signal detection threshold just above the noise floor. The setting of the signal detection threshold may be performed in real time (dynamically), once before the transaction (e.g., during the preamble period, after each frequency hop, etc.), periodically or continuously during a communication, etc.

Figure 42:
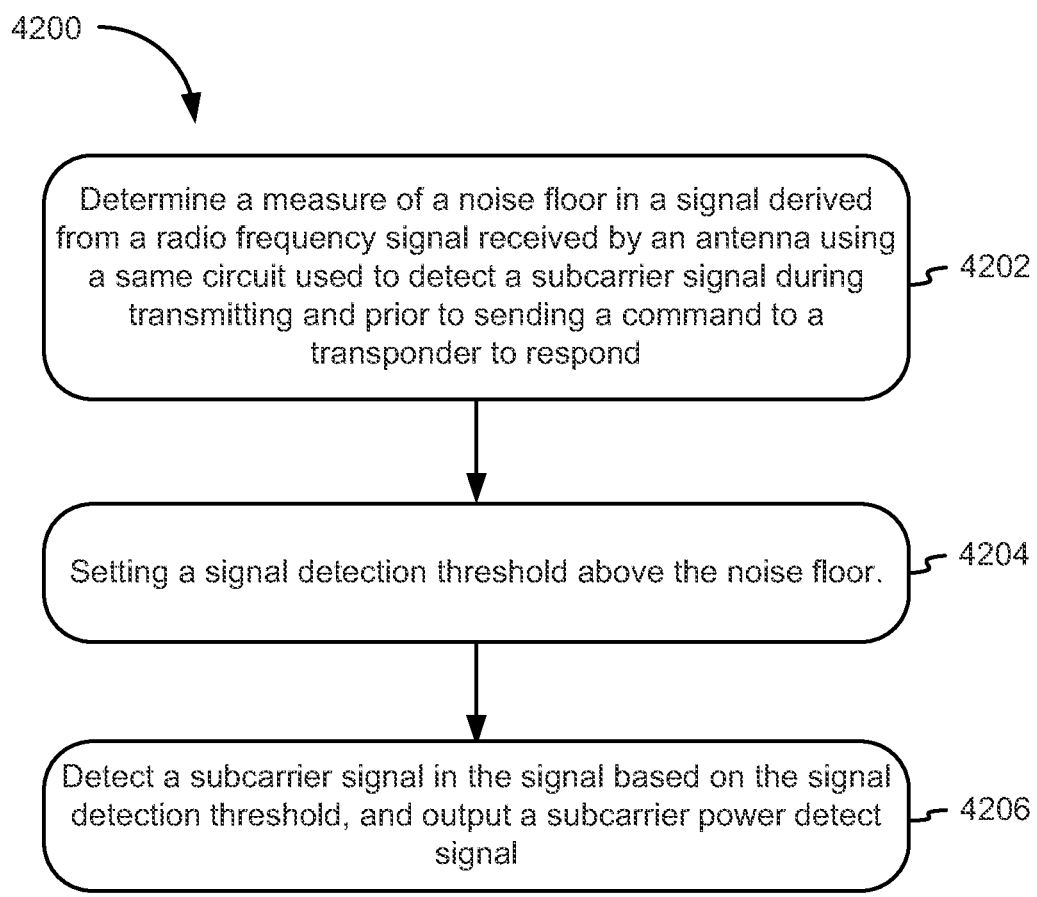
FIG. 42 depicts a process flow for a method for setting a signal detection threshold, according to one general embodiment.

FIG. 42 depicts a process flow for a method 4200 for setting a signal detection threshold, according to one general embodiment. Such methodology 4200 may be implemented logic such as hardware, software, combinations thereof etc. Moreover, the method 4200 may be performed in conjunction with any of the illustrative systems and/or components noted herein, with other types of systems and/or logic as would be known and understood by one skilled in the art upon reading the present disclosure, and combinations thereof.

With continued reference to FIG. 42, a measure of a noise floor in a signal derived from a radio frequency signal received by an antenna is determined using a same circuit used to detect a subcarrier signal during transmitting and prior to sending a command to a transponder to respond. See operation 4202. This ensures that the tag will not be talking, so that the noise can be determined.

In operation 4204, a signal detection threshold is set above the noise floor.

Operations 4202 and 4204 may be performed continuously, or at any desired time, such as after each frequency hop, periodically, etc.

In optional operation 4206, a subcarrier signal in the signal is detected based on the signal detection threshold, and a subcarrier power detect signal is output. The subcarrier signal may be derived, e.g., from a sideband portion of a backscattered signal. In one approach, a sub carrier detect module detects the subcarrier signal and outputs the subcarrier power detect signal. An illustrative subcarrier detect module includes: a scaler module for scaling baseband signals; a complex to magnitude module receiving output from the scaler; a leaky integrator receiving output from the complex to magnitude module; and a subcarrier power detect signal output coupled to the leaky integrator.

To enhance the method 4200, carrier cancellation of any type, e.g., known in the art, may be performed prior to determining the measure of the noise floor. In such case, the residual noise is measured.

While much of the foregoing has been described in terms of use with RFID systems, it is again stressed that the various embodiments may be used in conjunction with other types of RF devices, such as receive-only RF devices, 1- and 2-way radios, boards and/or circuits for RF devices, etc.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of discrete systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies.

For example, the methods described herein may be implemented in software running on a computer system, and/or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Moreover, any of the devices described herein, including an RFID reader, may be considered a "computer."

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for demodulating a data signal, the method comprising:
    processing baseband signals using multiple complex correlators each having a half-Tbit length, wherein Tbit is the length of data bit;
    summing outputs of the multiple complex correlators for a first data state; and
    differencing outputs of the multiple complex correlators for a second data state.

2. The method of claim 1, wherein each of the complex correlators includes a delayed integrator and a nondelayed integrator.

3. The method of claim 1, wherein the summed outputs are kept separate until after outputs of complex-to-magnitude modules.

4. The method of claim 1, wherein each of the complex correlators includes a series of windowed integrators that are configurable for different lengths.

5. The method of claim 1, further comprising generating a correlator magnitude signal, and further comprising using the correlator magnitude signal to determine an end of a signal modulation.

6. The method of claim 1, further comprising generating a correlator magnitude signal, and further comprising using the correlator magnitude signal to adjust an automatic gain control setting.

7. The method of claim 1, further comprising generating a correlator magnitude signal, and further comprising using the correlator magnitude signal to derive a received signal strength indicator estimate.

8. The method of claim 1, wherein the baseband signals are derived from a Miller modulated signal or a signal having bi-phase-space (FM0) encoding.

9. The method of claim 1, wherein the first data state corresponds to a data 1, wherein the second data state corresponds to a data 0.

10. The method of claim 1, wherein the first data state corresponds to a data 0, wherein the second data state corresponds to a data 1.

11. A system for demodulating a data signal, the system comprising:
    a correlator configured to:
        process baseband signals using multiple complex correlators each having a half-Tbit length, wherein Tbit is the length of data bit;
        sum outputs of the multiple complex correlators for a first data state; and
        difference outputs of the multiple complex correlators for a second data state.

12. The system of claim 11, wherein each of the complex correlators includes a delayed integrator and a nondelayed integrator.

13. The system of claim 11, wherein the summed outputs are kept separate until after outputs of complex-to-magnitude modules.

14. The system of claim 11, wherein each of the complex correlators includes a series of windowed integrators that are configurable for different lengths.

15. The system of claim 11, further comprising generating a correlator magnitude signal, and further comprising logic for using the correlator magnitude signal to determine an end of a signal modulation.

16. The system of claim 11, wherein the baseband signals are derived from a Miller modulated signal or a signal having FM0 encoding.

17. The system of claim 11, further comprising at least one antenna for receiving a radio frequency signal from which the baseband signals are derived.

18. The system of claim 11, further comprising logic for generating a correlator magnitude signal, and further comprising logic for using the correlator magnitude signal to adjust an automatic gain control setting.

19. The system of claim 11, further comprising logic for generating a correlator magnitude signal, and further comprising logic for using the correlator magnitude signal to derive a received signal strength indicator estimate.

20. The system of claim 11, wherein the first data state corresponds to a data 1, wherein the second data state corresponds to a data 0.

21. The system of claim 11, wherein the first data state corresponds to a data 0, wherein the second data state corresponds to a data 1.

* * * * *